(12) United States Patent
Ikegami

(10) Patent No.: US 7,197,694 B2
(45) Date of Patent: Mar. 27, 2007

(54) IMAGE DISPLAY SYSTEM, IMAGE REGISTRATION TERMINAL DEVICE AND IMAGE READING TERMINAL DEVICE USED IN THE IMAGE DISPLAY SYSTEM

(75) Inventor: Katsumi Ikegami, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 985 days.

(21) Appl. No.: 09/810,481

(22) Filed: Mar. 19, 2001

(65) Prior Publication Data

US 2001/0026377 A1    Oct. 4, 2001

(30) Foreign Application Priority Data

Mar. 21, 2000 (JP) ............................. 2000/078236
Sep. 6, 2000 (JP) ............................. 2000/270764
Sep. 22, 2000 (JP) ............................. 2000/288449

(51) Int. Cl.
*G06N 3/00* (2006.01)

(52) U.S. Cl. ..................................... 715/500

(58) Field of Classification Search ................ 713/513, 713/517, 176; 382/173; 348/309; 715/513, 715/517, 523, 530, 500
See application file for complete search history.

(56) References Cited

U.S. PATENT DOCUMENTS 6,532,541 B1 * 3/2003 Chang et al. ............... 713/176
6,614,914 B1 * 9/2003 Rhoads et al. .............. 382/100
6,778,678 B1 * 8/2004 Podilchuk et al. .......... 382/100
6,879,701 B1 * 4/2005 Rhoads ....................... 382/100

2001/0046307 A1 * 11/2001 Wong .......................... 382/100

OTHER PUBLICATIONS

Ernst, Warren, "Using Netscape," 1995, Roland Elgey, pp. 41-59, 414-149, 259-270, 283, 326.*
Hahn, Harley, "Student Guide to Unix, Second Edition," 1996, WCB/McGraw-Hill, pp. 24-30, 618-622.*

* cited by examiner

*Primary Examiner*—Stephen Hong
*Assistant Examiner*—Kyle R. Stork
(74) *Attorney, Agent, or Firm*—Rabin & Berdo P.C.

(57) ABSTRACT

An image display system which improves the ease of use provided to an operator when an alteration is detected in image data that is to be displayed. An electronic watermark detecting section and forwarding request section are appended to a personal computer connected to a disk cache storing image data. The electronic watermark detecting section has a function of checking for alterations in the image data in the disk cache, and an interface to the forwarding request section is also appended thereto. A transmission section is appended to a personal computer connected to an optical disk device storing original image data. The forwarding request section has the function of sending a request from the electronic watermark detecting section to the transmission section, and the function of transferring the image data transmitted form the transmission section, to the electronic watermark detecting section. The transmission section has the function of obtaining corresponding original image data from the optical disk device, in response to requests from the forwarding request section, and transmitting same to the forwarding request section. This image display system is suitable for use in a document management system comprising an image registration terminal, a reading terminal, and a server.

6 Claims, 50 Drawing Sheets

FIG.6

| Field | Value |
|---|---|
| Date | January 31, 1999 — 1609 / 1610 |
| Authentication number | 0123456789 |
| Name | YAMADA TARO |
| Name | YAMADA TARO |
| Gender | Male |
| Date of Birth | January 1, Showa 35 |
| Address | Tokyo-to, Tokyo-shi, Tokyo-machi 1-15 |
| Address | Tokyo-to, Tokyo-shi, Tokyo-machi 1-15 |
| Telephone number | 0123-45-6789 |
| Ailment | Cold |
| Start of treatment | January 10, Showa 64 |
| Amount | 10000 Yen |
| Remarks | |

FIG. 7

| File Name | Image001.bmp |
|---|---|
| Alteration Detection Block Number | (8,4)(9,4)(10,4)(11,4) |

| File Name | Image001.bmp |
|---|---|
| Request Block Number | (8,4)(9,4)(10,4)(11,4) |

| Date | January 31, 1999 |
|------|------------------|
| Authentication number | 0123456789 |
| Name | YAMADA TARO |
| Name | YAMADA TARO |
| Gender | Male |
| Date of Birth | January 1, Showa 35 |
| Address | Tokyo-to, Tokyo-shi, Tokyo-machi 1-15 |
| Address | Tokyo-to, Tokyo-shi, Tokyo-machi 1-15 |
| Telephone number | 0123-45-6789 |
| Ailment | Cold |
| Start of treatment | January 10, Showa 64 |
| Amount | 10000 Yen |
| Remarks | |

| | | | | 1609 | | | |
|---|---|---|---|---|---|---|---|

| Date | January 31, 1999 | |
|---|---|---|
| Authentication number | 0123456789 | ←1618 |
| Name | YAMADA TARO | |
| | YAMADA TARO | |
| Gender | Male | |
| Date of Birth | January 1, Showa 35 | ←1619 |
| Address | Tokyo-to, Tokyo-shi, Tokyo-machi 1-15 | |
| | Tokyo-to, Tokyo-shi, Tokyo-machi 1-15 | |
| Telephone number | 0123-45-6789 | |
| Ailment | Cold | |
| Start of treatment | January 10, Showa 64 | |
| Amount | 10000 Yen | |
| Remarks | | |

| Date | January 31, 1999 | — 1712 |

| Authentication number | 0123456789 | — 1712 |
| Name | YAMADA TARO | — 1712 |
| | YAMADA TARO | — 1712 |
| Gender | Male | — 712 |
| Date of Birth | January 1, Showa 35 | — 1712 |
| Address | Tokyo-to, Tokyo-shi, Tokyo-machi 1-15 | — 1712 |
| | Tokyo-to, Tokyo-shi, Tokyo-machi 1-15 | — 1712 |
| Telephone number | 0123-45-6789 | — 1712 |

| Ailment | Cold | — 1712 |
| Start of treatment | January 10, Showa 64 | — 1712 |
| Amount | 10000 Yen | — 1712 |

| Remarks | | |

FIG. 13

| Region 1 | $X_{11}, Y_{11}, X_{21}, Y_{21}$ |
|----------|----------------------------------|
| Region 2 | $X_{12}, Y_{12}, X_{22}, Y_{22}$ |
| ⋮ | ⋮ |
| Region n | $X_{1n}, Y_{1n}, X_{2n}, Y_{2n}$ |

| File Name | Image 001.bmp |
|-----------|---------------|
| Alteration Detection Text Region | Region2 |

| File Name | Image 001.bmp |
|-----------|---------------|
| Request Text Region Number | Region2 |

| Date | January31,1999 |
|---|---|

| Authentication number | //////0123456789////// | —1712a |
|---|---|---|

| Name | YAMADA TARO |
|---|---|
|  | YAMADA TARO |

| Gender | Male |
|---|---|

| Date of Birth | January1,Showa35 |
|---|---|

| Address | Tokyo-to,Tokyo-shi,Tokyo-machi1-15 |
|---|---|
|  | Tokyo-to,Tokyo-shi,Tokyo-machi1-15 |

| Telephone number | 0123-45-6789 |
|---|---|

| Ailment | Cold |
|---|---|
| Start of treatment | January10,Showa64 |
| Amount | 10000Yen |

| Remarks | |
|---|---|
|  | |

FIG.20

1907 — January 31, 1999
1907 — 0123456789
1907 — YAMADA TARO
1907 — YAMADA TARO
— Male
1907 — January 1, Showa35
1907 — Tokyo-to, Tokyo-shi, Tokyo-machi 1-15
1907 — Tokyo-to, Tokyo-shi, Tokyo-machi 1-15
1907 — 0123-45-6789
1907 — Cold
1907 — January 10, Showa64
1907 — 1000Yen

1908

- Date
- Authentication number
- Name
- Gender
- Date of Birth
- Address
- Telephone number
- Ailment
- Start of treatment
- Amount
- Remarks

```xml
<?xml version="1.0" encoding="Shift_JIS"?>
<Pages>
<Page>1<Background>¥Image¥Image113</Background>
  <Regions>
    <Regions X="X11" Y="Y11" Width="X12" Height="Y12"> ¥Image¥Image101</Region>
    <Regions X="X21" Y="Y21" Width="X22" Height="Y22"> ¥Image¥Image102</Region>
    <Regions X="X31" Y="Y31" Width="X32" Height="Y32"> ¥Image¥Image103</Region>

<Region X="X121" Y="Y121" Width="X122 Height="Y122"> ¥Image¥Image112</Region>
  </Regions>
</Page>
</Pages>
```

| File Name | Image1.xml |
|---|---|
| Alteration Detection Image Information | ￥Image￥Image102.bmp |

| File Name | Image1.xml |
|---|---|
| Request Image Region Number | ￥Image￥Image102.bmp |

↑
                         1915

```
<Data>
    <Keyword>
        <Category>Receipt</Category>
        <Date>20000630</Date>
        <Madeby>YAMADA TARO</Madeby>
    </Keyword>
    <Image ref="#Image/Image.jpg"/>
</Data>
```

```
<Data>
  <Keyword>
    <Category>Receipt</Category>
    <Date>20000630</Date>
    <Madeby>YAMADA TARO</Madeby>
  </Keyword>
  <Image ref="#Image/Image.jpg">
    <Regions>
      <Region no="1" x="10" y="30" width="150" height="15"/>
      <Region no="2" x="100" y="100" width="80" height="15"/>
    <Regions>
  </Image>
</Data>
```

FIG. 38

```
<Data>
  <Keyword>
    <Category>Receipt</Category>
    <Date>20000630</Date>
    <Madeby>YAMADA TARO</Madeby>
  </Keyword>
  <Image ref="#Image/Image.jpg"/>      ) — 274
  <Regions>
    <Region no="1" x="10"  y="30"  width="150" height="15" ref="Image/region 1.jpg"/>
    <Region no="2" x="100" y="100" width="80"  height="15" ref="Image/region 2.jpg"/>
  </Regions>
  </Image>
</Data>
```

272 — Regions block
334 — outer data block
336 — region reference block

FIG. 42

```
<LEVEL_DATA>
   <Group Level="1" View="Display all">
      <List>Addressee</List>
      <List>Amount</List>
      <List>Date</List>
      <List>Title</List>
      <List>Proviso</List>
      <List>Issuing party</List>
   </Group>                    ⌒―――25
   <Group Level="2" View="Display part">
      <List>Amount</List>
      <List>Date</List>
      <List>Title</List>
      <List>Proviso</List>
   </Group>                    ⌒―――25
   <Group Level="3" View="Minimize display">
      <List>Title</List>
      <List>Proviso</List>
   </Group>              ⌒ 25
<LEVEL_DATA>
```

FIG. 45

```
<Data>
  <Keyword>
    <Category>Receipt</Category>
    <Date>20000630</Date>
    <Madeby>YAMADA TARO</Madeby>
  </Keyword>
  <Image ref="#Image/Image.jpg">          ← 420
    <Regions>                              ← 422
      <Region no="1" x="120" y="120" width="160" height="50"   name="Addressee"/>
      <Region no="2" x="300" y="300" width="160" height="40"   name="Issuing part"/>
      <Region no="3" x="85"  y="50"  width="100" height="30"   name="Title"/>
      <Region no="4" x="265" y="60"  width="200" height="30"   name="Date"/>
      <Region no="5" x="200" y="200" width="140" height="40"   name="Amount"/>
      <Region no="6" x="160" y="240" width="150" height="40"   name="Proviso"/>
    </Regions>                                                  ↑
  </Image>                                                     424
</Data>
```

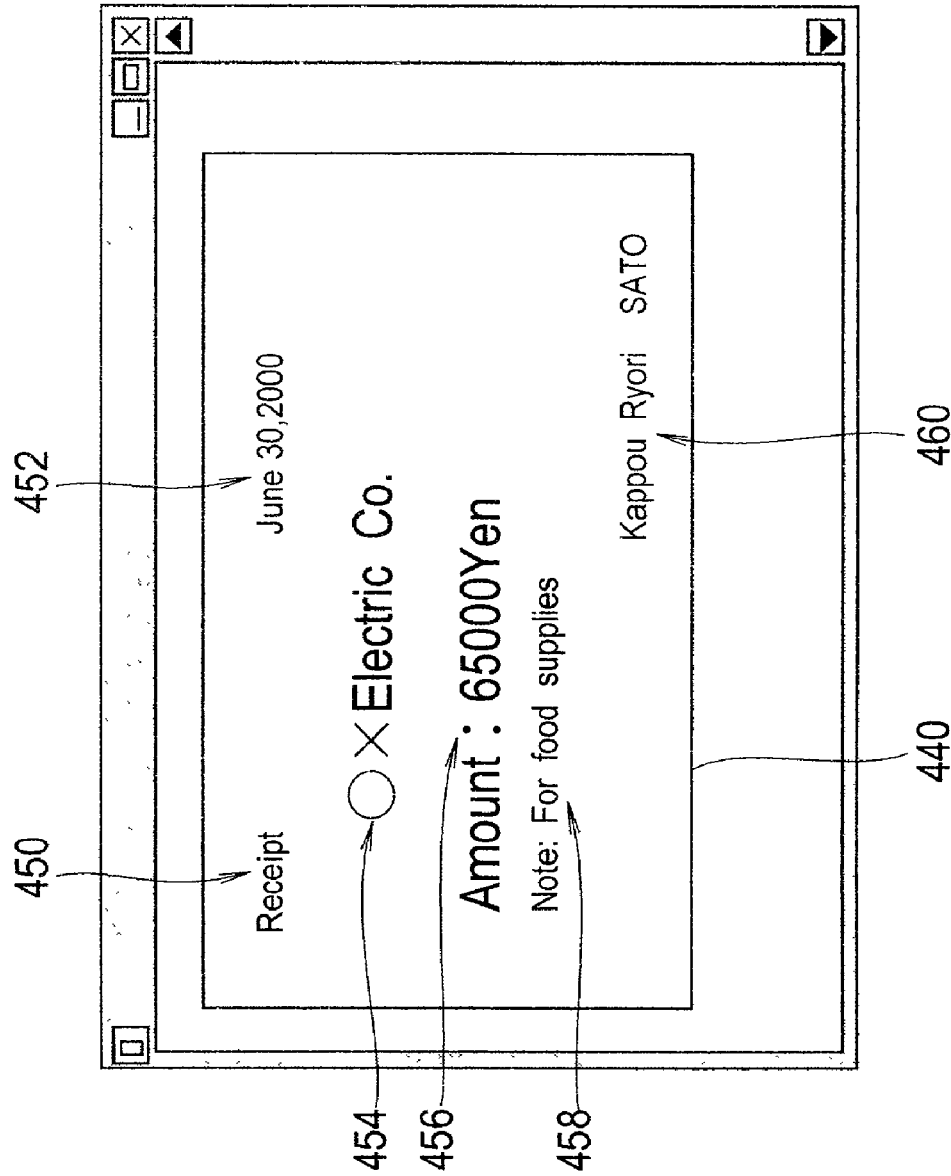

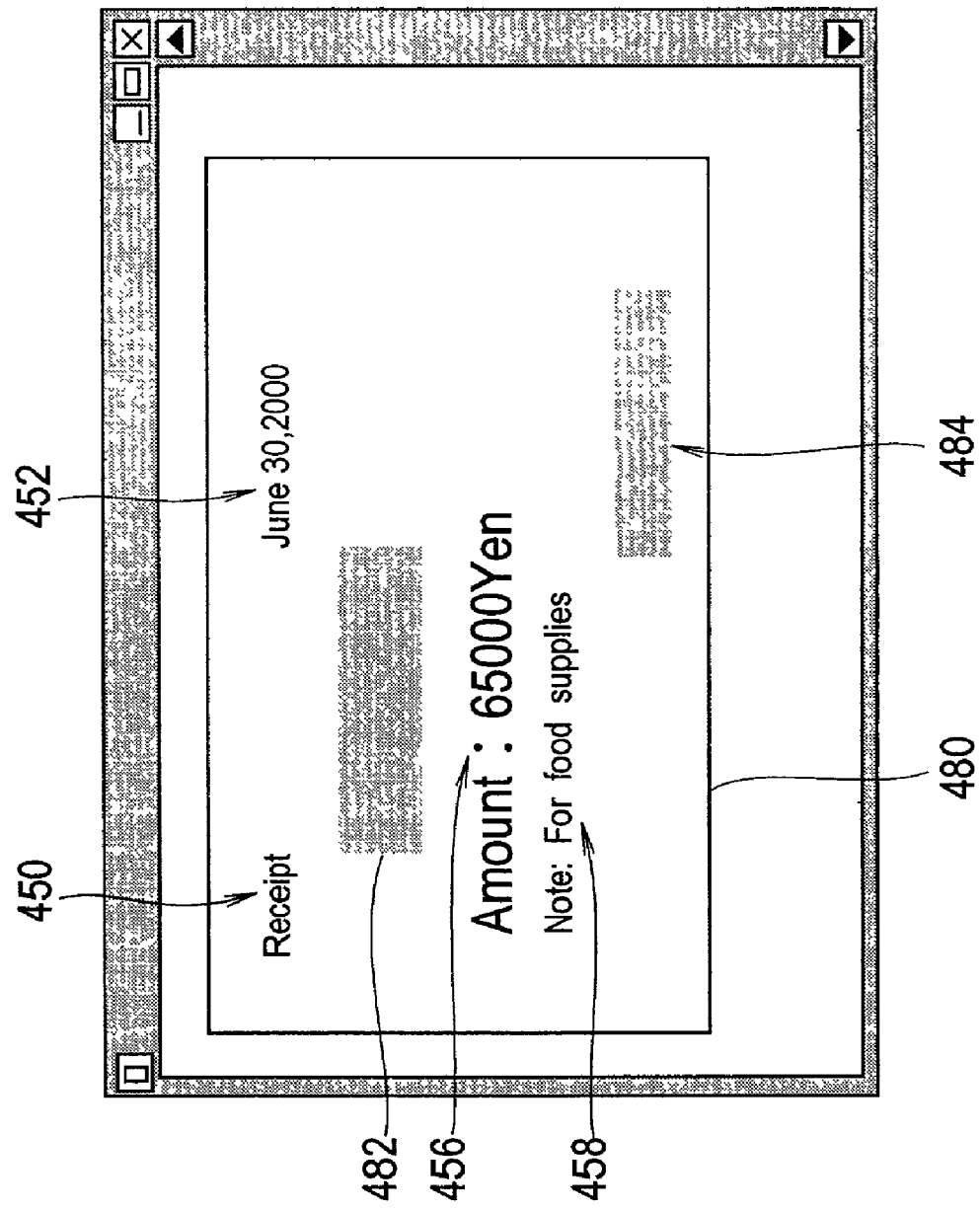

FIG. 49

```
<Data>
  <Keyword>
    <Category>Receipt</Category>
    <Date>20000630</Date>
    <Madeby>YAMADA TARO</Madeby>
  </Keyword>
  <Image ref="#Image/Image.jpg">
    <Regions>
      <Region no="1" x="120" y="120" width="160" height="50"  ref="Image/region1.jpg" name="Addressee"/>
      <Region no="2" x="300" y="300" width="160" height="40"  ref="Image/region2.jpg" name="Issuing party"/>
      <Region no="3" x="85"  y="50"  width="100" height="30"  ref="Image/region3.jpg" name="Title"/>
      <Region no="4" x="265" y="60"  width="200" height="30"  ref="Image/region4.jpg" name="Date"/>
      <Region no="5" x="200" y="200" width="140" height="40"  ref="Image/region5.jpg" name="Amount"/>
      <Region no="6" x="160" y="240" width="150" height="40"  ref="Image/region6.jpg" name="Proviso"/>
    </Regions>
  </Image>
</Data>
```

```
<VIEW_LINK>
  <Persons>
      <Person Level="3">YAMADA TARO</Person>
      <Person Level="3">SATO HANAKO</Person>
      <Person Level="1">SUZUKI ZIRO</Person>
      <Person Level="1">MAINITI HAGEMI</Person>
      <Person Level="2">YOGOTO TUTOMU</Person>
  </Persons>
  <Group>
      <Sections Level="3">Information Department No.1</Sections>
      <Sections Level="3">Information Department No.2</Sections>
      <Sections Level="2">Administration</Sections>
      <Sections Level="1">Accounts</Sections>
      <Sections Level="1">Secretariat</Sections>
  </Group>
<VIEW_LINK>
```

40

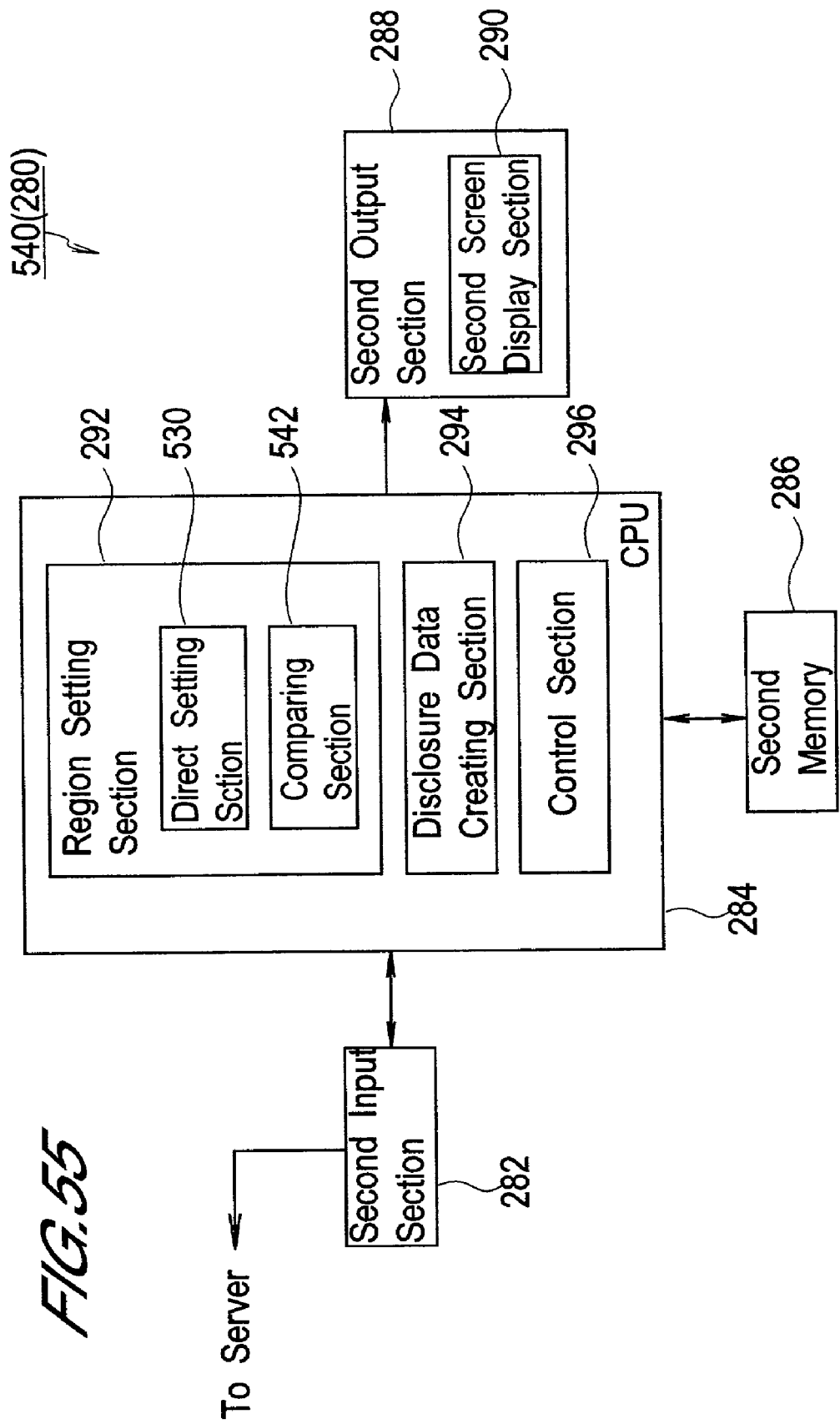

FIG.56

```
<VIEW_LINK>
 <Persons>
  <Person Level="3" Password="123456">YAMADA TARO</Person>
  <Person Level="3" Password="abcdef">SATO HANAKO</Person>
  <Person Level="1" Password="0a1b2c">SUZUKI ZIRO</Person>
  <Person Level="1" Password="tgbnhyujm">MAINITI HAGEMI</Person>
  <Person Level="2" Password="aaaaaa">YOGOTO TUTOMU</Person>
 </Persons>
 <Group>
  <Sections Level="3" Password="111111">Information Department No.1</Sections>
  <Sections Level="3" Password="987654">Information Department No.2</Sections>
  <Sections Level="2" Password="qazwsx">Administration</Sections>
  <Sections Level="1" Password="a!b"c#d$">Accounts</Sections>
  <Sections Level="1" Password="zzzzzzz">Secretariat</Sections>
 </Group>
</VIEW_LINK>
```
— 560

IMAGE DISPLAY SYSTEM, IMAGE REGISTRATION TERMINAL DEVICE AND IMAGE READING TERMINAL DEVICE USED IN THE IMAGE DISPLAY SYSTEM

BACKGROUND OF THE INVENTION

1. Field of the Invention

The present invention relates to an image display system for displaying image data, and more particularly, to an image display system whereby, even when image data has been altered, an unaltered image is displayed.

Moreover, the present invention relates to an image display system suitable for use in a document management system, and to an image registration terminal device and reading terminal device constituting this system.

2. Description of Related Art

Conventionally, various types of documents are issued by government offices, banks, insurance companies, private businesses, stores, and the like. In general, these documents are represented by text (or characters), diagrams (or graphic symbols), figures (or numerals), symbols (or Japanese-style stamped mark), and the like. In order to issue or refer to such documents, or to publish same for official use, image data for a document is first stored in a host computer or server, and then the image data is read out to a terminal by operations performed at the terminal. Examples of such documents include, for example, residence cards, seal registration certificates, insurance certificates, bank books, receipts, and the like. The image data is also displayed when it is registered in the host computer or server.

In conventional image display systems, image data read in by means of an image scanner, or the like, is stored in a storage device capable of holding a large volume of data, such as an optical disk device, or the like. The image data can be displayed by a display device connected to the storage device by means of a LAN (local area network), or the like. Image data stored on paper, or the like, is read in by an image scanner and converted to a digital image. This digital image is then embedded with an electronic watermark by a program for inserting electronic watermarks implemented by a personal computer, thereby yielding an electronically watermarked digital image. The electronically watermarked digital image is stored in the optical disk device. This electronically watermarked digital image is also transmitted to a display device and is stored in a disk cache connected to the display device.

When displaying image data, generally, a digital image stored in a disk cache is read in, and it is checked whether or not there are any alterations in the digital image. If no alteration is detected, then the image is displayed on the display device, and if an alteration is detected, then information indicating the location of the alteration is displayed on the display device along with the image. By means of this display method, the operator can recognize if there have been any alterations to the digital image, and can take measures, such as reading out unaltered image data from the optical disk device.

However, in a conventional image display system as described above, if an alteration is detected in the image data, then the operator of the display device must separately read out unaltered image data from the optical disk device, and hence ease of operation is poor.

On the other hand, conventionally, image display systems used in document management systems for disclosure of documents have been employed.

FIG. 24 is a diagram showing constituent elements of a document management system and the connection relations for same, in order to describe one example of a conventional image display system for disclosing documents. In this system 100, an image registration terminal (simply called 'registration terminal') 102, a document management server 104, and a reading terminal device (simply called a 'reading terminal') 106 are mutually linked by means of a network 108. As commonly known, the registration terminal 102, document management server 104 and reading terminal 106 respectively comprise basic constituent elements, such as a computer processing section, image display section, memory, input section, output section, drive section, and the like. As the input section for the registration terminal 102, an image scanner 110 is provided for reading in the documents and converting same to image data. Furthermore, the reading terminal 106 comprises a printer 112 which is enabled to read in documents that are to be disclosed.

In order to aid understanding of this invention, firstly, a simple description is given of the operation of the image display system for document management according to the prior art.

FIG. 25 shows one example of information for disclosure, in other words, a document (also called 'original') that is to be disclosed, according to the prior art. The paper information shown on the original document 120 that is to be disclosed comprises, for example, information such as 'Receipt' as the title of the original document, 'Jun. 30, 2000' as the date of issue, 'OX Electric Co.' as the addressee, 'Amount: 65000 Yen' as the amount, 'Note: For food supplies' as the proviso, 'Kappou Ryori SATO' as the name of the issuing party, and so on. Here, an example is described where the amount and the name of the issuing party are information contents which are not to be disclosed.

The information in paper form is converted to image data (electronic data) by means of the image scanner 110 of the registration terminal 102. On the other hand, index data is created consisting of an indexing keywords which are input by means of a keyboard, or the like, of the input section, and reference attributes (REF attributes) for identifying the correlation thereof with the relevant image data. The image data is stored in the memory of the registration terminal 102 along with the index data.

One example of conventional index data is shown in FIG. 26. The format used to express this index data 122 is the document description language XML (extensible Markup Language). In FIG. 26, of the expressions <XX>, <XX□□/ "OO"/>, and the like, XX is a 'tag' name, the □□ after the tag is an 'attribute' name, and the OO shown inside " "and marked by = following the 'attribute' name is the 'attribute value' corresponding to the 'attribute' name.

The indexing keywords contain information indicating that disclosure is acceptable and information indicating that disclosure is not acceptable. In the present example, information that can be disclosed is selected by the indexing keywords, these indexes being 'Receipt', '20000630' and 'YAMADA TARO'. The 'YAMADA TARO' following the 'Madeby' tag is not indicated on the receipt, but it is the name of the party providing the receipt.

The attribute value of the attribute (ref =) of the 'Image' tag is '#Image/Image.jpg', and this forms index data which is associated with the image data.

FIG. 27 shows one example of a file composition for representing index data. Here, the lowest levels of the 'Current directory' 1 of the file are 'Image directory' 2 and 'Index.xml' 3. Moreover, the lower level of the 'Image directory' is 'Image.jpg' 4.

Image data and index data are stored in the document management server 104 by means of the network 108.

On the other hand, a party seeking disclosure of the document makes an application for disclosure thereof to the operator of a reading terminal device 106. The operator is acknowledged by the party disclosing the information that information suitable for disclosure has been selected; this party is also called the information disclosing party. On the basis of the aforementioned application, the operator accesses the server 104 by operating the input section of the reading terminal 106, searches for index data for the original document corresponding to the disclosure application, as previously registered in the document management server, reads out the image data associated with this index data, and stores this image data in the memory of the reading device, whilst also displaying same on the screen display section of the reading device.

Supposing that the original document to be disclosed has the contents illustrated in FIG. 25, the whole contents of the original document are contained in the image data displayed on the screen display section of the reading terminal 106, as shown in FIG. 28. Here, it is assumed that of the information in the image data region shown as the image data information, the regions of contents 'OX Electric Co.' surrounded by the dotted frame 132 and the contents 'Kappou Ryori SATO' surrounded by the dotted frame 134 are non-disclosed regions, and the information in these respective regions is taken as information that is not to be disclosed to the applicant (also called 'non-disclosed information').

In this case, the operator controls the input section of the reading terminal 106 whilst observing the displayed image, to perform amendment of the image data by selecting the non-disclosed regions and processing the images inside these regions (known as 'image data processing'). By performing this data amendment, these regions are blacked out so that they assume a state where they cannot be read on the screen at any time, and index data is created indicating this state, the amended image data and the index data corresponding to same being stored in a memory. The image data after amendment is shown by 140 in FIG. 29. Furthermore, the blacked out section 142 is a region corresponding to the non-disclosed region 132 in FIG. 28, whilst the blacked out section 144 is a region corresponding to the non-disclosed region 134 in FIG. 28.

The image data obtained in this manner is read out from the memory and supplied to the output section. The output section performs direct processing of the corresponding image data, thereby creating data of the kind illustrated in FIG. 29, and according to requirements, it is output to a printer 112 to create a printed document, forming a document which can be provided to the applicant.

In a conventional image display system for document management of this kind, at the image registration terminal device, no decisions are made, and furthermore, no suggestions are provided, with regard to which of the contents of a document that is to be disclosed should be designated as non-disclosed information, apart from those contents which are previously designated as being suitable for disclosure. Therefore, the image data and corresponding index data read out from the document management server by the reading terminal device contains no data which designates or suggests regions of the image data that are not to be disclosed. Consequently, unless amendment processing of some kind is carried out with respect to this image data, the whole of the document information, including information that should be non-disclosed information, will be presented to the applicant in a readable state.

Therefore, conventionally, the operator on the reading side (party disclosing the information) sets the non-disclosed regions of the image data regions according to his or her own wishes, and must perform amendment processing in such a manner that these regions cannot be read.

Therefore, in a conventional image display system, the operation from receiving a request for disclosure of information until creating a document to be provided to the applicant which includes the contents that are to be disclosed, is inefficient.

Furthermore, there is a risk that each time that an application for disclosure of information is made, the designation of information contents that are not to be disclosed will be different, thereby undermining the credibility of the information contents that are disclosed.

SUMMARY OF THE INVENTION

It is a first object of the present invention to provide an image display system whereby unaltered image data can be read out and displayed, even if alterations have been made to the image data.

It is a second object of the present invention to provide an image display system having good operability.

It is a third object of the present invention to provide an image display system, whereby the efficiency of the information disclosure operation is improved, and moreover, the reliability of disclosed information content can be improved.

It is a fourth object of the present invention to provide an image display system, whereby the speed of the information disclosure operation is increased, and moreover, leaking of information can be avoided.

It is a fifth object of the present invention to provide an image display system whereby non-disclosed information contents can be specified in correspondence with respective applicants for disclosure of information.

Furthermore, it is a sixth object of the present invention to provide an image registration terminal device for use in the aforementioned system.

It is a seventh object of the present invention to provide a reading terminal device for use in the aforementioned system.

In order to achieve the first and second objects described above, the image display system according to the present invention has the following composition. Namely, the present image display system comprises original image holding device for holding original image data and an image display device connected to the original image holding device. This image display device reads out and displays image data from storing device storing image data, and comprises the function of detecting alterations in the image data when the image data is read out. The image display device comprises a function for requesting transmission of original image data from the original image holding device, when an alteration is detected in the image data, the original image holding device is provided with a function for transferring original image data to the image display device in response to original image data transfer requests from the image display device, and the image display device comprises a function for displaying the original image data transferred thereto.

According to the foregoing composition, even if there is an alteration to image data that is to be displayed, it is possible to read out and display unaltered image data automatically, without the operator having to perform separate read-out operations. Therefore, according to the image display system according to this invention, it is possible to display correct image data whilst providing easy operation.

Moreover, by providing the function of displaying an indication that original image data has been obtained since there has been an alteration to the image data, along with displaying the original image data transferred thereto, it is possible for the operator to recognise that there is no problem with the image data displayed, despite the fact that there has been an alteration to the image data.

As a further method for achieving the objects of the invention, it is also possible to adopt a composition wherein the image data comprises a plurality of regions; the image display device detects alterations to the image data for each of the regions, and if an alteration to the image data is detected, then it sends (or transfers) information relating to the region where the alteration was detected to the original image storing device, along with the original image data transfer request; the original image storing device sends original image data for the corresponding region to the image display device, on the basis of the information relating to the region where the alteration was detected; and the image display device synthesizes the received original image data for the region with the image data for the other regions. By adopting this composition, it is possible to transfer only the original image data for the region where an alteration has been detected from the original image storing device to the image display device, and therefore the image data transfer time is shortened and ease of operation is improved.

As a result of repeated research and experimentation, the present inventors also confirmed that all or a part of the aforementioned objects can be achieved by adopting an image display system for document management wherein, on the registration terminal device side, prospective non-disclosed regions are set within the image data region of the document (original document) that is to be disclosed, and this image data and index data specifying the prospective non-disclosed regions is previously registered in a server, whilst on the reading terminal device side, the prospective non-disclosed regions are read out from the server and set finally as non-disclosed regions, a document (provision document) being disclosed wherein the contents, such as text, and the like, in the specified non-disclosed regions are processed to assume a non-readable state.

Image Display System for a First Document Management System

According to the first image display system according to the present invention, there are provided: a server, a first image reading terminal device, and a first reading terminal device having the following composition, mutually linked by a network.

Essentially, the first image registration terminal device comprises: a first input section for converting original image data for a document that is to be disclosed, into image data; and a first screen display section capable of displaying the image data, and set regions specified as prospective non-disclosure regions within the image data region of the image data.

Moreover, according to a specific composition, this first image registration terminal device comprises: a first input section for converting original image data for a document (original document) that is to be disclosed, into image data; prospective non-disclosure region setting device for setting prospective non-disclosed regions within the image data region of the obtained image data, and creating setting data for the specified set regions; a first memory for storing the image data and setting data in a readable fashion; and a first output section for reading out the image data and setting data from the first memory and outputting same to the server. Moreover, the first output section comprises a first screen display section capable of displaying the read out image data and the set regions.

The server has a composition capable of obtaining and storing image data and setting data for the set regions from the image data registration terminal device.

Moreover, essentially, the first reading terminal device comprises: a second screen display section capable of displaying: image data corresponding to original image data for a document that is to be disclosed as previously registered in the server; set regions specified as prospective non-disclosure regions in the image data region; and non-disclosure decided regions within the image data region.

Moreover, desirably, the first reading terminal device also comprises a second input section for reading out image data and setting data from the server; and a region deciding section for deciding disclosed regions and non-disclosed regions with respect to the set region in the image data region.

Moreover, according to a further specific composition, the first reading terminal device comprises: a second input section for reading out, from the server, the image data corresponding to the original image data for the document (original document) that is to be disclosed, and setting data respectively identifying the image data and set regions specified as prospective non-disclosure regions within the image data region, this data being respectively registered beforehand in the server; a region deciding section for deciding disclosed regions and non-disclosed regions with respect to the set regions in the image data region; a disclosure data creating section for converting image data within the non-disclosure decided regions to non-readable data, converting image data within the disclosed regions to readable data, and creating disclosure data consisting of the non-readable and readable data; a second output section for converting the disclosure data to a disclosure document having perceivable contents; and a second memory for storing, in a readable fashion, the image data, the setting data, the readable and non-readable data, and the disclosure data. The second output section contains a second screen display section capable of displaying the image data, set regions, and the non-disclosure decided regions within the image data region.

In this way, according to the image display system according to the first document management system, on the image registration terminal device side (hereinafter, may simply be called registration terminal device or registration terminal), it is possible to specify prospective non-disclosed regions in the image data region of the original document, with respect to contents of the original document that are not to be disclosed, and to create specification data for specifying these set regions, this data being registered previously in the server.

On the reading terminal device side (hereinafter, may simply be called reading terminal device), the image data and specification data are read out from the server on the basis of a reading application, and when these data elements are synthesized, a display is achieved on the second screen display section comprising a display of the image data and set regions forming prospective non-disclosed regions specified within the image region (may also be called image data region). After confirming that the information contents in the set regions is information that is not to be disclosed, these set regions are set as non-disclosed regions, and the remaining portions of the image data region are set as disclosed regions. After changing the image data in the non-disclosure decided regions and the disclosed regions respectively to non-readable data and readable data, it is possible to provide a disclosure document, in other words, a provision document, having perceivable contents, to the applicant.

In this way, according to the image display system for the first document management system, on the reading terminal device side, it is possible to avoid setting operations for disclosed regions and non-disclosed regions within the image data region, and therefore the efficiency of the information disclosure operation can be improved compared to the prior art.

Moreover, according to the image display system for the first document management system, at the reading terminal device, the regions given as prospective non-disclosure regions should simply be confirmed, without having to be set as non-disclosed regions anew, and hence the incorrect setting of non-disclosed regions in this operation is avoided and it is possible to provide a disclosure document of higher reliability than in the prior art.

According to a preferred embodiment of this image display system for a first document management system, it is possible to adopt a composition wherein the prospective non-disclosure region setting device comprises a region analysing section for detecting region information relating to the position and size of the set regions which are to be specified within the image data region, and the region information constitutes a portion of the setting data.

According to a further preferred embodiment of this image display system for a first document management system, it is possible to adopt a composition wherein the prospective non-disclosure region setting device comprises first region setting device for specifying the set regions in response to a setting command from an input section.

According to a further preferred embodiment of this image display system for a first document management system, it is possible to adopt a composition wherein the prospective non-disclosure region setting device comprises an index data creating section for creating index data relating to the image data and to the set regions, as a portion of the setting data. In this case, desirably, the index data relating to the image data comprises indexing keywords, and image data tag names and attribute names; and the index data relating to the set regions comprises a region number, two-dimensional co-ordinate values, region width and region height for the set regions.

According to a further preferred embodiment of this image display system for a first document management system, it is possible to adopt a composition wherein the setting of the prospective non-disclosure regions is performed by specifying the set regions, by means of a setting display consisting of either a frame display surrounding the set regions, a colored display of the set regions, or a background display relating to the set regions, within the image data region displayed by the first screen display section.

According to a further preferred embodiment of this image display system for a first document management system, it is possible to adopt a composition wherein first selection information for instructing display of the set regions is previously stored, in a readable fashion, in the second memory.

Moreover, the region deciding section performs the following processing. Namely, the region deciding section:

a) reads out the first selection information from the second memory in response to a confirmation command from the second input section and causes the information to be displayed on the second screen display section, during the setting operation;

b) causes the image data to be displayed on the second screen display section by means of selection of the displayed first selection information in response to commands from the second input section;

c) specifies the set regions by means of a setting display consisting of either a frame display surrounding the set regions, a colored display of the set regions, or a background display relating to the set regions, within the displayed image data region, on the basis of the setting data; and d) designates the specified set regions as non-disclosure decided regions, if there is no error in the specification of the set regions, or alternatively, cancels the specification of the set regions and changes same to disclosed regions, if there is an error in the specification of the set regions.

Moreover, according to yet a further preferred embodiment of the image display system for the first document management system, second selection information for changing the non-disclosure decided regions to non-readable data is stored in a readable fashion in the second memory.

Furthermore, the disclosure data creating section performs the following processing. Namely, the disclosure data creating section:

a) reads out the second selection information from the second memory and displays same on the second screen display section, in response to readable/non-readable commands from the second input section; and b) converts the specified non-disclosure decided regions to non-readable data consisting of either black information, blank information or deleted information, by selecting the displayed second selection information in response to selection commands from the second input section, whilst also performing processing for converting the remaining image data region to readable data.

Image Display System for a Second Document Management System

According to the second image display system according to the present invention, there are provided: a server, a second image reading terminal device, and a second reading terminal device having the following composition, mutually linked by a network.

Firstly, the second registration terminal device essentially comprises: a first input section for converting original image data for a document that is to be disclosed, into image data; and a first screen display section capable of displaying the image data, set regions specified as prospective non-disclosure regions within the image data region of the image data, and structured image data created from the image data and the setting data.

According to a specific example, this second image registration terminal device comprises: a first input section for converting original image data for a document (original document) that is to be disclosed, into image data; non-disclosure region setting device for setting prospective non-disclosure regions within the image data region of the obtained image data and creating setting data for the set regions thus specified; a structured image data creating section for creating structured image data from the image data and the setting data; a reference data creating section for creating reference data referencing the set regions within the structured image data; a first memory for storing the image data, the structured image data, the setting data and the reference data, in a readable fashion; and a first output section for reading out the structured image data, the setting data and the reference data from the first memory and outputting same to the server. Furthermore, the first output section contains a first screen display section capable of displaying the image data, set regions and structured image data.

Moreover, the server is composed in such a fashion that it obtains and stores image data, setting data for set regions, and structured image data, from the image data registration terminal device.

On the other hand, the second reading terminal device essentially comprises a second screen display section capable of displaying: image data corresponding to original image data for a document that is to be disclosed as previously registered in the server; set regions specified as prospective non-disclosure regions in the structured image data of the image data; non-disclosure decided regions within the image data region; and disclosure data consisting of non-readable data and readable data created by converting the image data in the disclosed regions to readable data.

Moreover, desirably, this second reading terminal device also comprises a second input section for reading out the structured image data and the setting data from the server.

Moreover, according to a specific composition, the second reading terminal device comprises: a second input section for reading out, from the server, the structured image data of the image data corresponding to corresponding to the original image data for a document (original document) that is to be disclosed, setting data respectively identifying set regions specified as prospective non-disclosed regions in the structured image data, and reference data for referencing the image data portions of these set regions, these data elements being respectively registered beforehand in the server; a region deciding section for creating the image data on the basis of the structured image data, the setting data and the reference data, and then setting disclosed regions and non-disclosed regions with respect to the set regions in the image data region of the image data; a disclosure data creating section for converting image data within the non-disclosure decided regions to non-readable data, converting image data within the disclosed regions to readable data, and creating disclosure data consisting of the non-readable and readable data; a second output section for converting the disclosure data to a disclosure document having perceivable contents (provision document); and a second memory for storing, in a readable fashion, the image data, the setting data, the readable and non-readable data, and the disclosure data. Furthermore, the second output section comprises a second screen display section capable of displaying the image data, set regions, non-disclosure decided regions in the image data regions, and the disclosure data.

According to this image display system for a second document management system, it is possible to achieve similar beneficial effects to those of the first document management system.

Moreover, in this image display system for a second document management system, the image data is structured, and this structured image data, setting data identifying set regions within the structured image data, and reference data referencing the image data portions of these set regions, are previously stored in the server.

At the second reading terminal device, when the structured image data, setting data and reference data are read out from the server and synthesized, image data wherein the non-disclosed regions are identified can be displayed, and hence the process of setting (or deciding) non-disclosed regions is simple and quick to perform. Consequently, the processing time taken from application until provision of the final disclosure document is shortened (in other words, the process is speeded up).

Moreover, since structuring of image data is achieved, the non-disclosed information is stored separately in the server, and therefore even if illegal external access is made, it is possible to avoid leaking of information, as far as possible.

According to a preferred embodiment of the image display system for the second document management system relating to the present invention, it is possible to adopt a composition, wherein the prospective non-disclosure region setting device comprises a region analysing section for detecting region information relating to the position and size of the set regions which are to be specified within the image data region, and the region information constitutes a portion of the setting data.

According to a further preferred embodiment of the image display system for the second document management system relating to the present invention, it is possible to adopt a composition, wherein the prospective non-disclosure region setting device comprises a first region deciding (or setting) section for specifying set regions in response to a setting command from the first input section.

Moreover, according to a further preferred embodiment of the image display system for the second document management system relating to the present invention, it is possible to adopt a composition, wherein the prospective non-disclosure region setting device comprises an index data creating section for creating index data relating to the image data and to the set regions, as a portion of the setting data.

Furthermore, this index data creating section may incorporate the reference data creating section as a portion thereof. In this case, desirably, the index data relating to the image data comprises indexing keywords, and image data tag names and attribute names; and the index data relating to the set regions comprises a region number, two-dimensional co-ordinate values, region width and region height for the set regions, and reference data.

Moreover, according to a further preferred embodiment of the image display system for the second document management system relating to the present invention, it is possible to adopt a composition, wherein the setting of the prospective non-disclosure regions is performed by specifying the set regions, by means of a setting display consisting of either a frame display surrounding the set regions, a colored display of the set regions, or a background display relating to the set regions, within the image data region displayed by the first screen display section.

Moreover, according to a further preferred embodiment of the image display system for the second document management system relating to the present invention, it is possible to adopt a composition, wherein the structured image data is divided into a first layer wherein the set regions within the image data region are set to a non-readable state, and a second layer consisting of the image data portions for the set regions.

According to a further preferred embodiment of the image display system for the second document management system relating to the present invention, it is possible to adopt a composition, wherein first selection information instructing display of the set regions is stored in a readable fashion in the second memory; and the region deciding section performs the following processing.

Namely, the region deciding section:

a) reads out the first selection information from the second memory in response to a confirmation command from the second input section and causes the information to be displayed on the second screen display section, during the setting operation;

b) causes the image data to be displayed on the second screen display section by means of selection of the displayed first selection information in response to commands from the second input section;

c) specifies the set regions by means of a setting display consisting of either a frame display surrounding the set regions, a colored display of the set regions, or a background display relating to the set regions, within the displayed image data region, on the basis of the setting data; and d) designates the specified set regions as non-disclosure decided regions, if there is no error in the specification of the set regions, or alternatively, cancels the specification of the set regions and changes same to disclosed region, if there is an error in the specification of the set regions.

Furthermore, according to a further preferred embodiment of the image display system for the second document management system relating to the present invention, second selection information for converting the non-disclosure decided region into non-readable data is stored in the second memory in a readable fashion, and the disclosure data creating section performs the following processes. Namely, a) processing for converting the specified non-disclosure decided regions to non-readable data consisting of either black information, blank information or deleted information, in response to readable/non-readable commands from the second input section; and b) processing for converting the remaining image data region to readable data.

Image Display System for a Third Document Management System

According to the third image display system for a document management system according to the present invention, there are provided: a server, a third image reading terminal device, and a third reading terminal device having the following composition, mutually linked by a network.

Essentially, the third image registration terminal device comprises:

a first input section for converting original image data for a document that is to be disclosed, into image data; and a first screen display section capable of displaying the image data, and set regions specified as prospective non-disclosure regions within the image data region of the image data.

According to a specific composition, this third image registration terminal device comprises: a first input section for converting original image data for a document (original document) that is to be disclosed, into image data; prospective non-disclosed region setting device for specifying prospective non-disclosed regions within the image data region of the obtained image data and creating setting data for these specified set regions; a first memory for storing the image data and setting data, in a readable fashion; and a first output section for reading out the image data and setting data from the first memory, in order to store same in the server.

Moreover, the first output section contains a first screen display section capable of displaying the image data and set regions.

Moreover, the prospective non-disclosure region setting device comprises an index data creating section for creating index data relating to the image data and to the set regions, as a portion of the setting data.

The index data relating to the image data comprises indexing keywords, and image data tag names and attribute names.

Furthermore, the index data relating to the set regions comprising a region number, two-dimensional co-ordinate values, region width and region height for the set regions, and name attributes indicating the item names relating to the set regions.

Moreover, the server previously registers reading authorization level correspondence data and item name correspondence data relating to the reading authorization levels, and it also obtains and stores the image data and setting data from the image registration terminal device.

On the other hand, essentially, third reading terminal device comprises a second screen display section capable of displaying the image data corresponding to the original image data for the document that is to be disclosed, as previously registered in the server, the set regions specified as prospective non-disclosed regions in the image data region, readable item names and non-disclosure decided regions within the image data region.

Moreover, desirably, the third reading terminal device comprises a second input section for reading out, from the server, the image data, setting data, reading authorization level correspondence data, and item name correspondence data relating to the reading authorization levels.

Moreover, according to a specific composition, the third reading terminal device comprises: a second input section for reading out, from the server, the image data, setting data, reading authorization level correspondence data, and item name correspondence data relating to the reading authorization levels stored in the server; a region deciding section for specifying disclosed regions and non-disclosed regions by selecting item names by specifying a read out reading authorization level, and specifying set regions corresponding to the selected item names in the image data region, on the basis of item name correspondence data corresponding to the selected item names; a disclosure data creating section for converting image data within the non-disclosure decided regions to non-readable data, converting image data within the disclosed regions to readable data, and creating disclosure data consisting of the non-readable and readable data; a second output section for converting the disclosure data to a disclosure document having perceivable contents (provision document); and a second memory for storing, in a readable fashion, the image data, the setting data, the readable and non-readable data, the disclosure data, the reading authorization level correspondence data and item name correspondence data.

The second output section comprises a second screen display section capable of displaying the image data, readable item names, set regions, and the non-disclosure decided regions within the image data region.

According to the image display system for this third document management system, it is possible to achieve similar beneficial effects to those of the first and second document management system.

Moreover, according to the image display system for this third document management system, reading authorization level correspondence data determining the range of information to be disclosed and item name correspondence data relating to same are specified, and stored previously in a server. At the reading terminal device side, by selectively synthesizing the reading authorization level correspondence data and item name correspondence data read out from the server, in accordance with each person applying for disclosure of information, it is possible to specify information contents that are not to be disclosed, in a more accurate manner. Therefore, it is possible to provide a disclosure document containing an amount of information which corresponds to the applicant.

Moreover, according to a preferred embodiment of the image display system for this third document management system, a composition can be adopted wherein the prospective non-disclosure region setting device comprises a region analysing section for detecting region information relating to the position and size of the set regions within the image data region, and this region information constitutes a portion of the setting data.

Furthermore, according to a preferred embodiment of the image display system for this third document management system relating to the present invention, a composition can be adopted wherein the prospective non-disclosure region setting device comprises a first region deciding section for specifying set regions in response to a setting command from the first input section.

Furthermore, according to a further preferred embodiment of the image display system for this third document management system relating to the present invention, a composition can be adopted wherein the second memory stores reading authorization level setting data for setting the reading authorization levels, and the selection of the reading authorization level is carried out on a displayed screen of the reading authorization setting data, which is displayed on the second screen display section.

Moreover, according to a further preferred embodiment of the image display system for this third document management system relating to the present invention, a composition can be adopted wherein the set regions designated as non-disclosed regions are displayed on the second screen display section together with a setting display consisting of either a frame display surrounding the set regions, a colored display of the set regions, or a background display relating to the set regions.

Furthermore, according to a further preferred embodiment of the image display system for this third document management system relating to the present invention, second selection information for changing the non-disclosure decided regions to non-readable data is stored in a readable fashion in the second memory.

Moreover, the disclosure data creating section is capable of performing the following processing.

Namely, the disclosure data creating section:

a) reads out the second selection information from the second memory and displays same on the second screen display section, in response to readable/non-readable commands from the second input section; and b) converts the specified non-disclosure decided regions to non-readable data consisting of either black information, blank information or deleted information, by selecting the displayed second selection information in response to selection commands from the second input section, whilst also performing processing for converting the remaining image data region to readable data.

Image Display System for a Fourth Document Management System

According to the image display system for a fourth document management system according to the present invention, there are provided: a server, a fourth image reading terminal device, and a fourth reading terminal device having the following composition, mutually linked by a network.

Essentially, the fourth image registration terminal device comprises: a first input section for converting original image data for a document that is to be disclosed, into image data; and a first screen display section capable of displaying the image data, set regions specified as prospective non-disclosure regions within the region of the image data, and structured image data created from the image data and the setting data.

According to a more specific composition, the fourth registration terminal device comprises: a first input section for converting original image data for a document (original document) that is to be disclosed, into image data; a prospective non-disclosure region setting device for setting prospective non-disclosure regions within the image data region of the obtained image data and creating setting data for the set regions thus specified; a structured image data creating section for creating structured image data from the image data and the setting data; a reference data creating section for creating reference data referencing the set regions within the structured image data; a first memory for storing the image data, the structured image data, the setting data and the reference data, in a readable fashion; and a first output section for reading out the structured image data, the setting data and the reference data from the first memory and outputting same to the server.

Furthermore, the first output section contains a first screen display section capable of displaying the image data, set regions and structured image data.

Moreover, the prospective non-disclosure region setting device comprises an index data creating section for creating index data relating to the image data and to the set regions, as a portion of the setting data.

Furthermore, this index data creating section may incorporate the reference data creating section as a portion thereof.

The index data relating to the image data comprises indexing keywords, and image data tag names and attribute names.

Furthermore, the index data relating to the set regions comprising a region number, two-dimensional co-ordinate values, region width and region height for the set regions, reference data, and name attributes indicating the item names relating to the set regions.

Moreover, the server previously registers reading authorization level correspondence data and item name correspondence data relating to the reading authorization levels, and it also stores the structured image data, the setting data and the reference data, from the image registration terminal device.

Essentially, the fourth reading terminal device comprises: a second screen display section capable of displaying: image data corresponding to original image data for a document that is to be disclosed as previously registered in the server; set regions specified as prospective non-disclosure regions in the structured image data of the image data; readable reading authorization levels; readable item names; non-disclosure decided regions within the image data region; and disclosure data consisting of non-readable data and readable data created by converting the image data in the disclosed regions to readable data.

Moreover, desirably, this fourth reading terminal device also comprises a second input section for reading out the structured image data, the setting data, the reading authorization level correspondence data and the item name correspondence data, from the server.

According to a specific composition, the fourth reading terminal device comprises: a second input section for reading out the structured image data, setting data and reference data stored in the server, respectively; a non-dislosure deciding section for specifying disclosed regions and non-disclosed regions by selecting item names by specifying a read out reading authorization level, and specifying set regions corresponding to the selected item names in the image data region of the image data, from the structured image data, the setting data and the reference data, on the basis of item name correspondence data corresponding to the selected item names; a disclosure data creating section for creating the disclosure data by converting image data within the non-disclosure decided regions to the non-readable data, in addition, and converting image data in the disclosed regions to the readable data conversion; a second output section for converting the disclosure data to a disclosure document having perceivable contents; and a second memory for storing, in a readable fashion, the image data, the setting data, the readable and non-readable data, the disclosure data, the reading authorization level correspondence data and the item name correspondence data.

Moreover, the second output section comprises a second screen display section capable of displaying the image data, the readable item names, the set regions, the non-disclosure decided regions within said image data region, and the disclosure data.

In this case also, similarly to the case of the image display system for the third document management system described above, the beneficial effects of the first and second document management systems are achieved. Moreover, in addition to this, reading authorization level correspondence data determining the range of information to be disclosed and item name correspondence data relating to same are specified, and stored previously in a server. At the reading terminal device side, by selectively synthesizing the reading authorization level correspondence data and item name correspondence data read out from the server, in accordance with each person applying for disclosure of information, it is possible to specify information contents that are not to be disclosed, in a more accurate manner. Therefore, it is possible to provide a disclosure document containing an amount of information which corresponds to the applicant.

Furthermore, according to a preferred embodiment of the image display system for the fourth document management system relating to the present invention, a composition can be adopted wherein the prospective non-disclosure region setting device comprises a region analysing section for detecting region information relating to the position and size of the set regions within the image data region, and this region information constitutes a portion of the setting data.

According to a further preferred embodiment of the image display system for the fourth document management system relating to the present invention, a composition can be adopted wherein the prospective non-disclosure region setting device comprises a first region deciding (or setting) section for specifying set regions in response to a setting command from the first input section.

Furthermore, according to a further preferred embodiment of the image display system for the fourth document management system relating to the present invention, a composition can be adopted wherein the setting of the prospective non-disclosure regions is performed by specifying the set regions, by means of a setting display consisting of either a frame display surrounding the set regions, a colored display of the set regions, or a background display relating to the set regions, within the image data region displayed by the first screen display section.

According to a further preferred embodiment of the image display system for the fourth document management system relating to the present invention, a composition can be adopted wherein the second memory stores reading authorization level setting data for setting the reading authorization levels, and the selection of the reading authorization level is carried out on a display screen of the reading authorization setting data, which is displayed on the second screen display section.

According to a further preferred embodiment of the image display system for the fourth document management system relating to the present invention, a composition can be adopted wherein the set regions designated as non-disclosed regions are displayed on the second screen display section together with a setting display consisting of either a frame display surrounding the set regions, a colored display of the set regions, or a background display relating to the set regions.

Moreover, according to a further preferred embodiment of the image display system for the fourth document management system relating to the present invention, a composition can be adopted wherein second selection information for changing the non-disclosure decided regions to non-readable data is stored in a readable fashion in the second memory.

The disclosure data creating section is capable of performing the following processing.

Namely, the disclosure data creating section performs:

a) processing for reading out second selection information from the second memory and displaying same on the second screen display section, in response to readable/non-readable commands from the second input section; and b) processing for converting the specified non-disclosure decided regions to non-readable data consisting of either black information, blank information or deleted information, by selecting the displayed second selection information in response to selection commands from the second input section; and processing for converting the remaining image data region to readable data.

Image Display System for a Fifth Document Management System

Moreover, according to the image display system for a fifth document management system relating to the present invention, in addition to the first to fourth document management systems described above, the following compositional elements are provided. Namely, in cases where reader level data, for specifying reader levels in relation to particular setting data elements of the setting data, is previously registered in the server, the region deciding section comprises a direct setting (or deciding) section which decides disclosed regions and non-disclosed regions within the image data region, directly, by specifying a reader level in the reader level data read out from the server by the second input section.

In this case, desirably, the reader level data is data which is structured with respect to the reader level, reader name and the department title of the respective reader.

According to this image display system for a fifth document management system, since it is additionally possible to set non-disclosed regions in accordance with a reader level, directly and swiftly, operational efficiency is improved, and the reliability of the disclosed information can also be enhanced.

Image Display System for a Sixth Document Management System

Moreover, according to the image display system for a sixth document management system relating to the present invention, in cases where a user name for the reader and a password for the reader are previously stored in the reader level data, as a registered user name and a registered password, the region deciding section comprises a comparing section for comparing the registered user name and the registered password read out from the server by the second input section with a user name and password input by the reader by means of the second input section; and if the comparison performed by the comparing section produces a match, then the direct setting section specifies the reader level for the matching reader name.

According to this image display system for a sixth document management system, in addition to achieving the same beneficial effects as those associated with the first to fifth document management systems, it is also possible to achieve a composition where reading is only possible when a match is made with a previously registered user name and password, and therefore it is not necessary to employ a party for disclosing the information, but rather the applicant becomes able to operate and use the system him or herself.

BRIEF DESCRIPTION OF THE DRAWINGS

FIG. 6 is a diagram illustrating image data according to the second embodiment of the present invention;

FIG. 7 is a diagram illustrating alteration detection information according to the second embodiment of the present invention;

FIG. 8 is a diagram illustrating retrieval information according to the second embodiment of the present invention;

FIG. 9 is a diagram illustrating image data according to the second embodiment of the present invention;

FIG. 10 is a diagram illustrating synthesis of image data according to the second embodiment of the present invention;

FIG. 12 is a diagram illustrating image data according to a third embodiment of the present invention;

FIG. 13 is a diagram illustrating the contents of a document format database according to this invention;

FIG. 14 is a diagram illustrating showing alteration detection information according to a third embodiment of the present invention;

FIG. 15 is a diagram illustrating retrieval information according to a third embodiment of the present invention;

FIG. 16 is a diagram illustrating image data according to a third embodiment of the present invention;

FIG. 20 is a diagram illustrating image data according to a fifth embodiment of the present invention;

FIG. 21 is a diagram illustrating structured information according to a fifth embodiment of the present invention;

FIG. 22 is a diagram illustrating alteration detection information according to a fifth embodiment of the present invention;

FIG. 23 is a diagram illustrating retrieval information according to a fifth embodiment of the present invention;

FIG. 34 is a diagram illustrating a compositional example of index data, for explaining an image registration terminal device according to the present invention;

FIG. 38 is a diagram illustrating a composition example of structuring index data, for explaining an image registration terminal device according to the present invention;

FIG. 42 is a diagram showing a pair comprising reading authorization level correspondence data and item name correspondence data, for explaining the present invention;

FIG. 45 is a diagram illustrating a composition example of index data comprising name attributes, for explaining an image registration terminal device according to the present invention;

FIG. 46 is a diagram illustrating an image data display screen (example of reading side prospective non-disclosed region screen), for explaining a reading terminal according to the present invention;

FIG. 48 is a diagram illustrating non-disclosed regions changed to a non-readable state (example of final display screen), for explaining a reading terminal device according to the present invention;

FIG. 49 is a diagram illustrating a compositional example of structuring index data comprising name attributes, for explaining an image reading terminal device according to the present invention;

FIG. 54 is a diagram illustrating reader level data for explaining the fifth reading terminal device according to the present invention;

FIG. 55 is a functional block diagram showing a sixth reading terminal device of an image display system for a sixth document management system according to the present invention;

FIG. 56 shows reader level data used in a sixth reading terminal device according to the present invention.

DESCRIPTION OF THE PREFERRED EMBODIMENTS

First Embodiment

Figure 1:
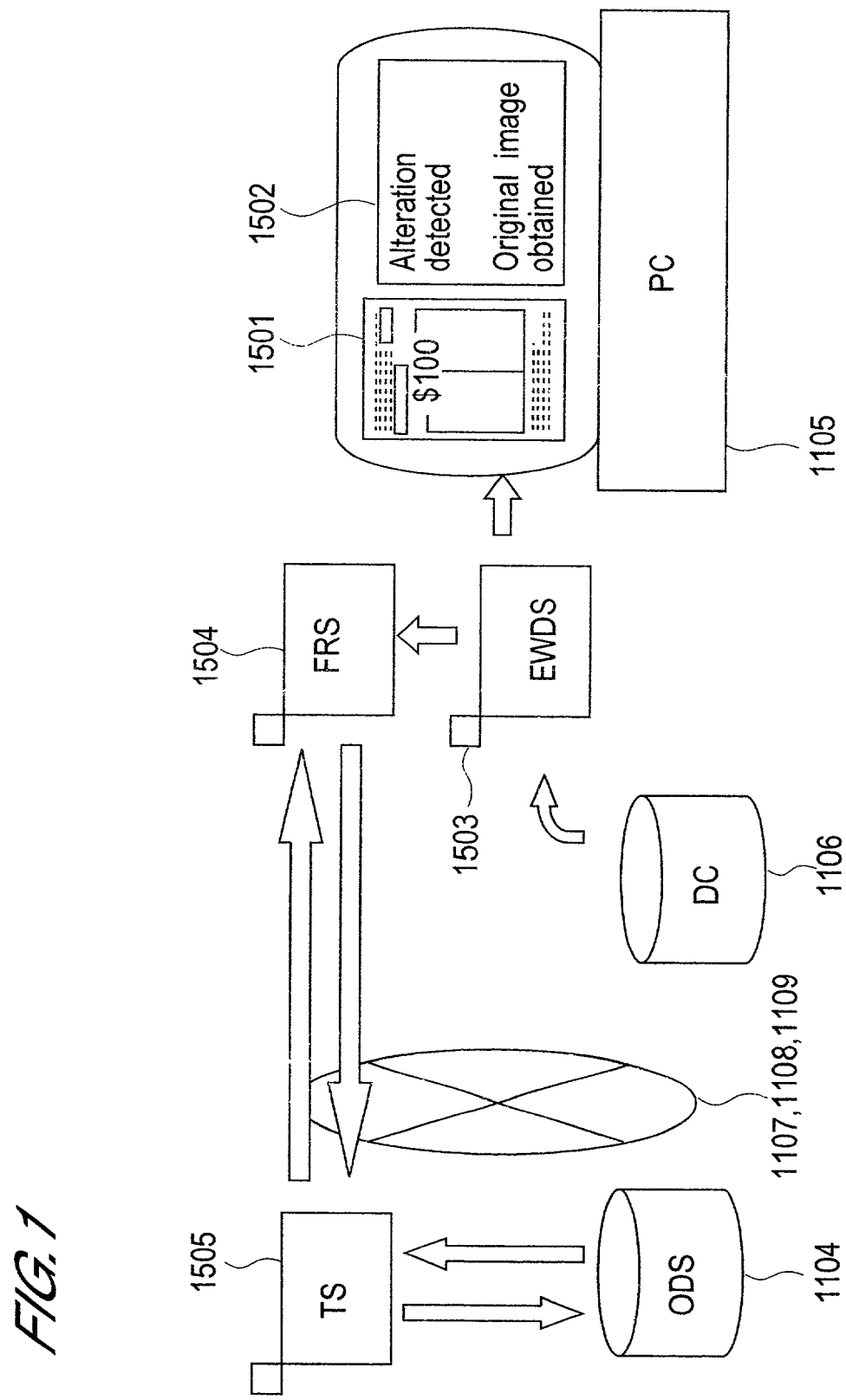
FIG. 1 is a system composition diagram showing an image display system according to a first embodiment of the present invention.
Figure 2:
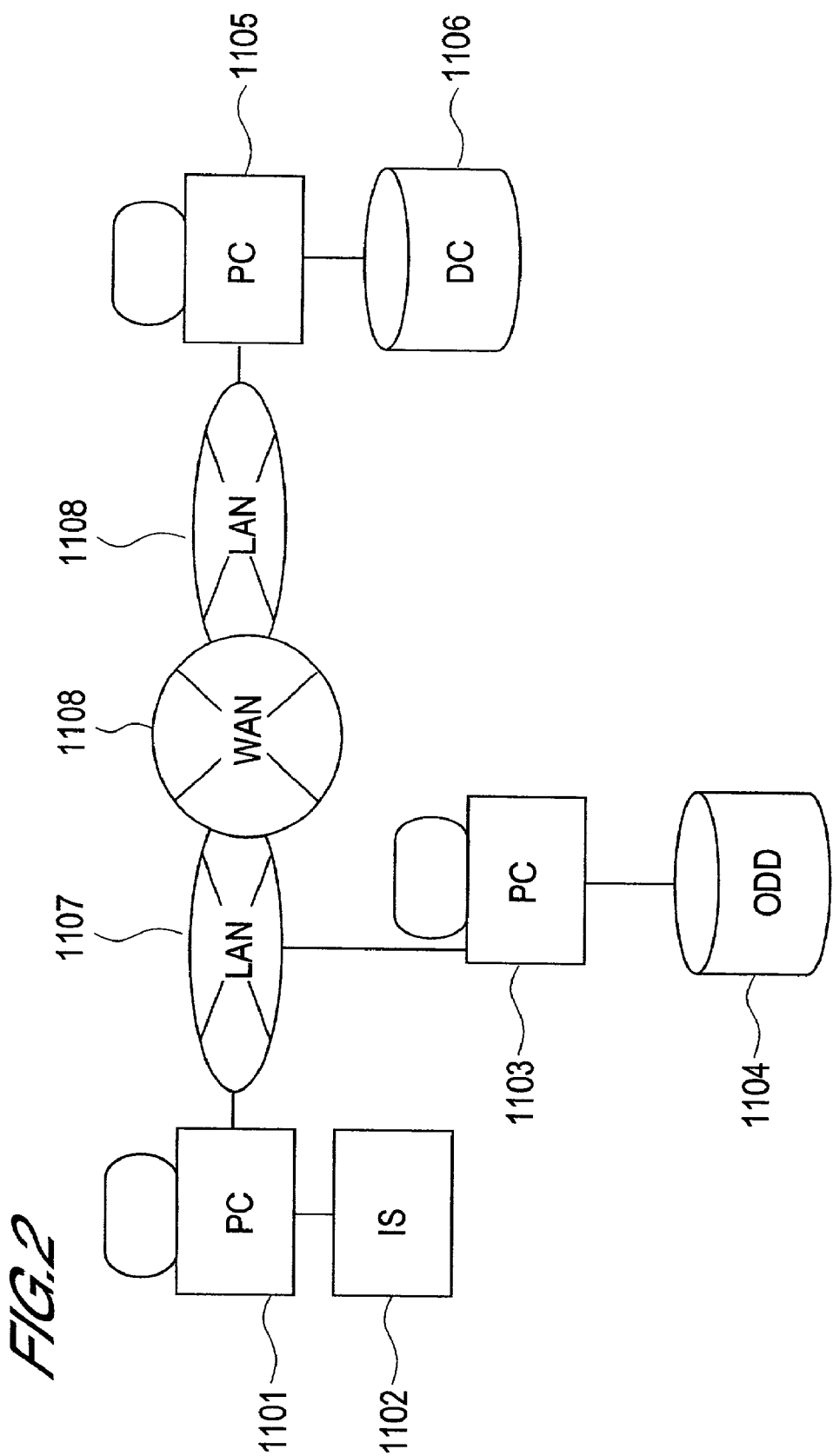
FIG. 2 is a system composition diagram showing the whole of an image display system according to a first embodiment of the present invention.

Below, embodiments of the present invention will be described with reference to the drawings. FIG. 1 is a system composition diagram showing an image display system according to a first embodiment, and FIG. 2 is a system composition diagram showing the whole of an image display system according to the first embodiment. Firstly, the overall system will be described with reference to FIG. 2.

In FIG. 2, the image scanner (IS) 1102 is connected to a personal computer (PC) 1101 and reads in an image printed on paper, or the like, as electronic data (image data). The personal computer 1101 is connected via a LAN 1107 to a personal computer (PC) 1103. An optical disk device (ODD) 1104 is connected to the personal computer 1103. The optical disk device 1104 is an image data server for storing image data and it is capable of saving a large volume of data.

The personal computers 1101 and 1103 are connected via the LAN 1107, wide area network (WAN) 1109, and LAN 1108, to a personal computer (PC) 1105. The personal computer 1105 is provided with a display 1105a, on which it displays image data read in from the image scanner 1102, and it is further connected to a disk cache (DC) 1106. The disk cache 1106 provides local storage of image data read in by the personal computer 1101.

In FIG. 1, an electronic watermark detecting section (EWDS) 1503 driven by an electronic watermark detecting program and a forwarding request section (FRS) 1504 driven by a forwarding request program are appended to the personal computer 1105. The electronic watermark detecting section 1503 is driven by the electronic watermark program, and in addition to providing a function of checking whether or not there has been any alteration to the image data inside the disk cache 1106, by determining the presence or absence or an electronic watermark, an interface to the forwarding request section 1504 is also appended to same. If there has been an alteration in the image data, the interface conveys this information to the forwarding request section 1504.

The forwarding request section (FRS) 1504 has the function of sending requests from the electronic watermark detecting section (EWDS) 1503 to a transmission section 1505 (described hereinafter), and the function of transferring image data transmitted from the transmission section (TS) 1505, to the electronic watermark detecting section 1503. The transmission section 1505 is driven by a transmission program.

Furthermore, the transmission section (TS) 1505 is appended to personal computer (PC) 1103. The transmission section 1505 has the function of obtaining corresponding original image data from the optical disk device (ODD) 1104 in accordance with requests from the forwarding request section (FRS) 1504, and transferring this image data to the forwarding request section 1504.

Figure 3:
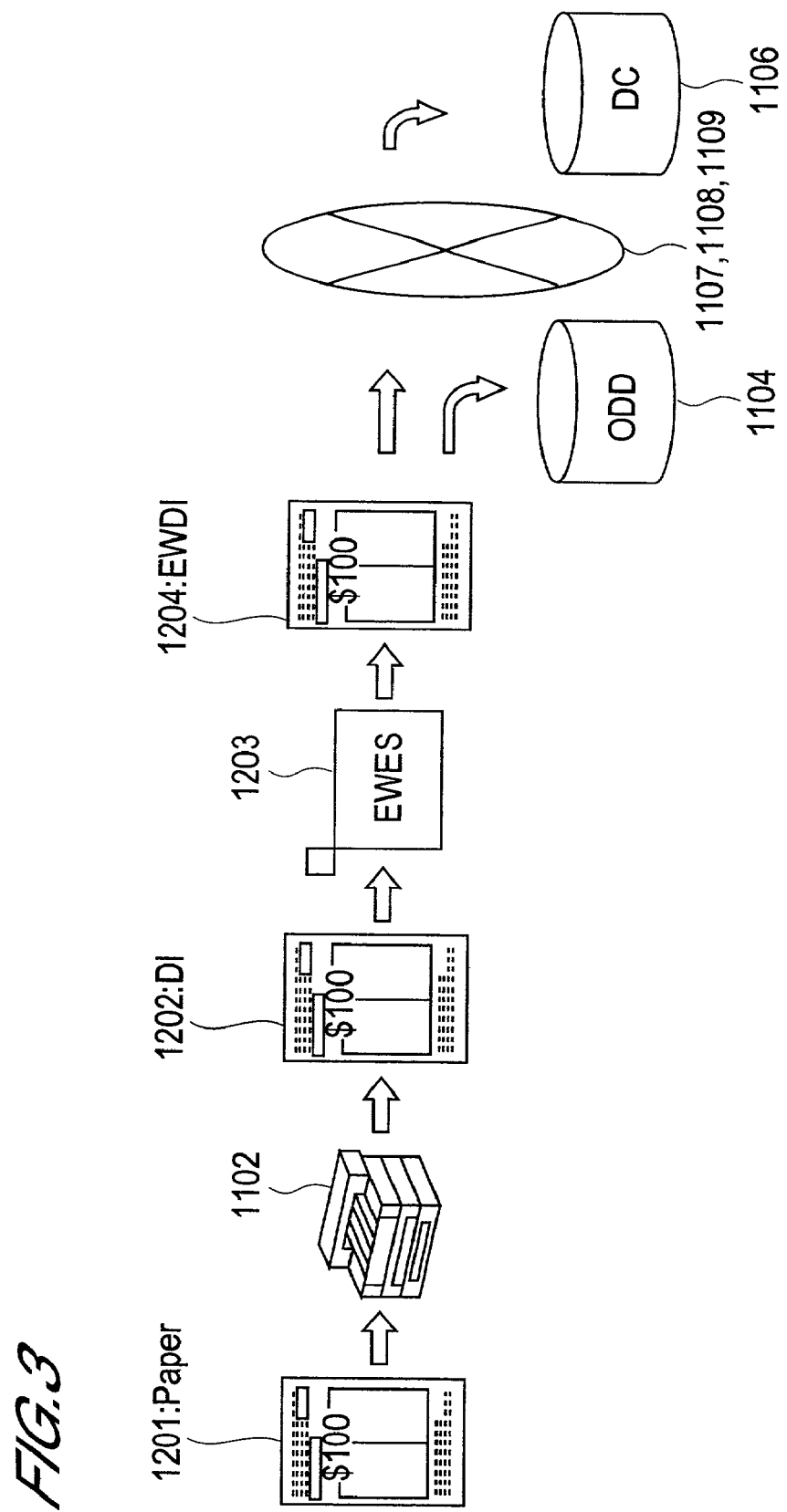
FIG. 3 is a diagram illustrating the operation of the first embodiment of the present invention.
Figure 4:
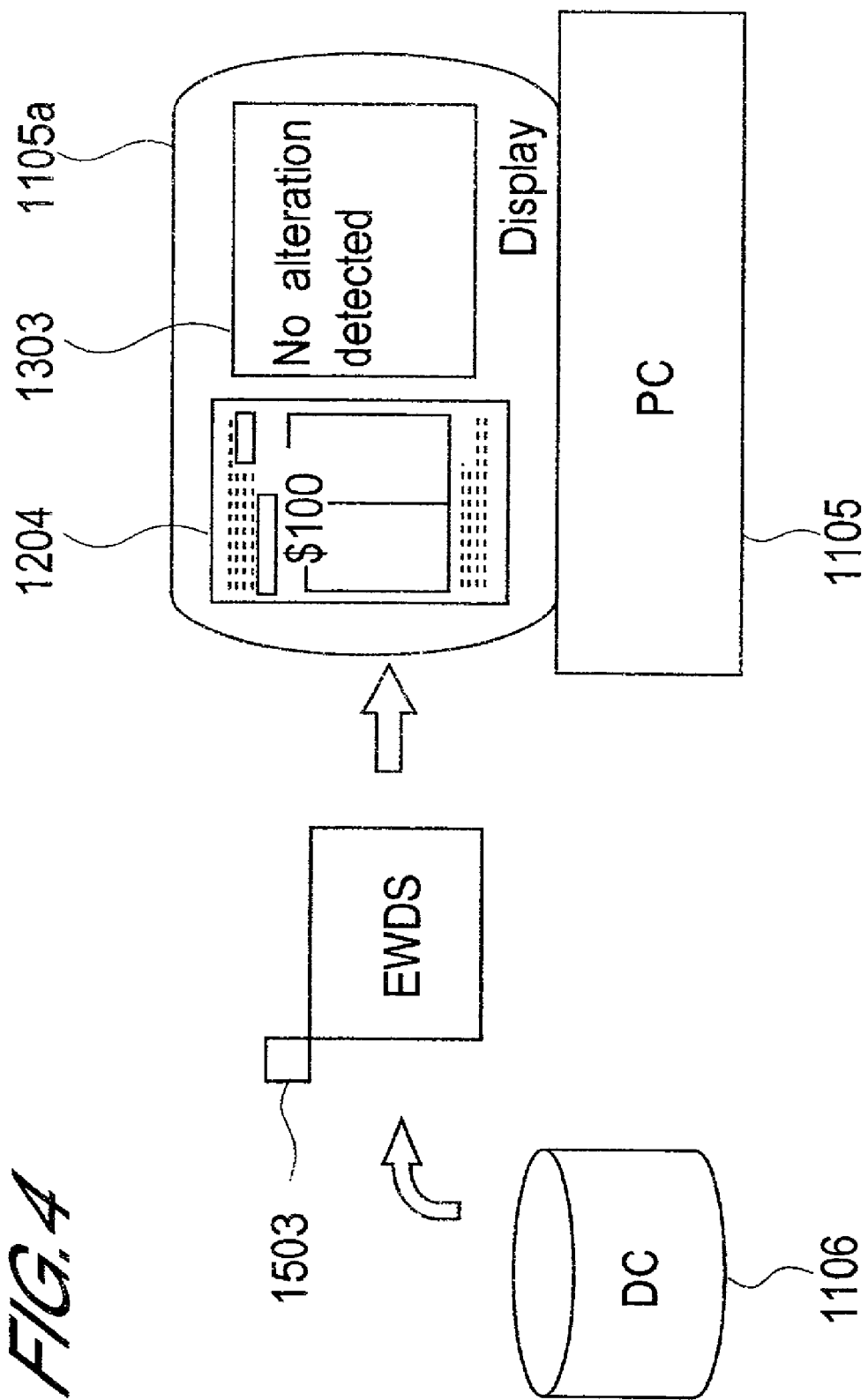
FIG. 4 is a diagram illustrating the operation of the first embodiment of the present invention.

Next, the operation of the first embodiment of the invention will be described. FIG. 3 and FIG. 4 are explanatory diagrams showing the operation of the first embodiment. Firstly, the process of obtaining image data is described with reference to FIG. 3. In FIG. 3, paper 1201 is an original document on which image data is printed, and from which image data is read in. The paper 1201 is read in by the image scanner 1102 to form a digital image (DI) 1202. This digital image 1202 then has an electronic watermark embedded therein by an electronic watermark embedding section 1203, in accordance with an electronic watermark embedding program operated by the personal computer 1101 illustrated in FIG. 2, thereby forming an electronically watermarked digital image (EWDI) 1204 (see FIG. 3).

Thereafter, the electronically watermarked digital image 1204 is transferred to the personal computer 1103, and stored in the optical disk device 1104. At the same time, this image is transmitted via LAN 1107, WAN 1109 and LAN 1108 to the personal computer 1105, where it is stored in the disk cache 1106. By storing the electronically watermarked digital image 1204 in the disk cache 1106, when a digital image 1204 is displayed by the display 1105*a* of the personal computer 1105, the image is displayed instantly (see FIG. 4).

Next, the operation of displaying image data on the display 1105*a* of the personal computer 1105 will be described. The personal computer 1105 reads in the digital image 1204 stored in the disk cache 1106 and checks whether or not there has been an alteration to the digital image data 1204 by means of the electronic watermark detecting section 1503.

If no alteration is detected at this stage, then as illustrated in FIG. 4, the digital image data 1204 is displayed on the display 1105*a* on the personal computer 1105, and information 1303 indicating that no alteration was detected is also displayed.

If an alteration is detected, then information indicating detection of an alteration is conveyed to the forwarding request section (FRS) 1504. At the same time, display of image data on the display 1105*a* is halted. Upon receiving a notification from the electronic watermark detecting section 1503, the forwarding request section 1504 requests transmission of image data from the transmission section (TS) 1505 of the personal computer 1103, by means of the LAN 1108, WAN 1109 and LAN 1107.

The transmission section 1505 reads out corresponding image data in accordance with the request, from the optical disk device 1104, and transmits this data, via the LAN 1107, WAN 1109 and LAN 1108, to the forwarding request section 1504. The forwarding request section 1504 transfers the received image data to the electronic watermark detecting section 1503.

The electronic watermark detecting section (EWDS) 1503 checks for the presence of alterations in the received image data, and if an alteration is not detected, then the received image data 1501 is displayed on the display 1105*a* along with information 1502 indicating that an alteration was detected but the original image data has been obtained. If an alteration is detected at this stage, then a further request for transmission of the original image data is made to the transmission section 1505. On the display 1105*a*, instead of the information 1502, it is possible to display information indicating that unaltered original image data is being displayed on the screen.

According to the first embodiment as described above, supposing that the image data stored in the disk cache 1106 has been altered, then when it is displayed, rather than the altered image data being displayed, the unaltered original image data is displayed automatically, thereby providing improved ease of operation to the user.

Second Embodiment

Figure 5:
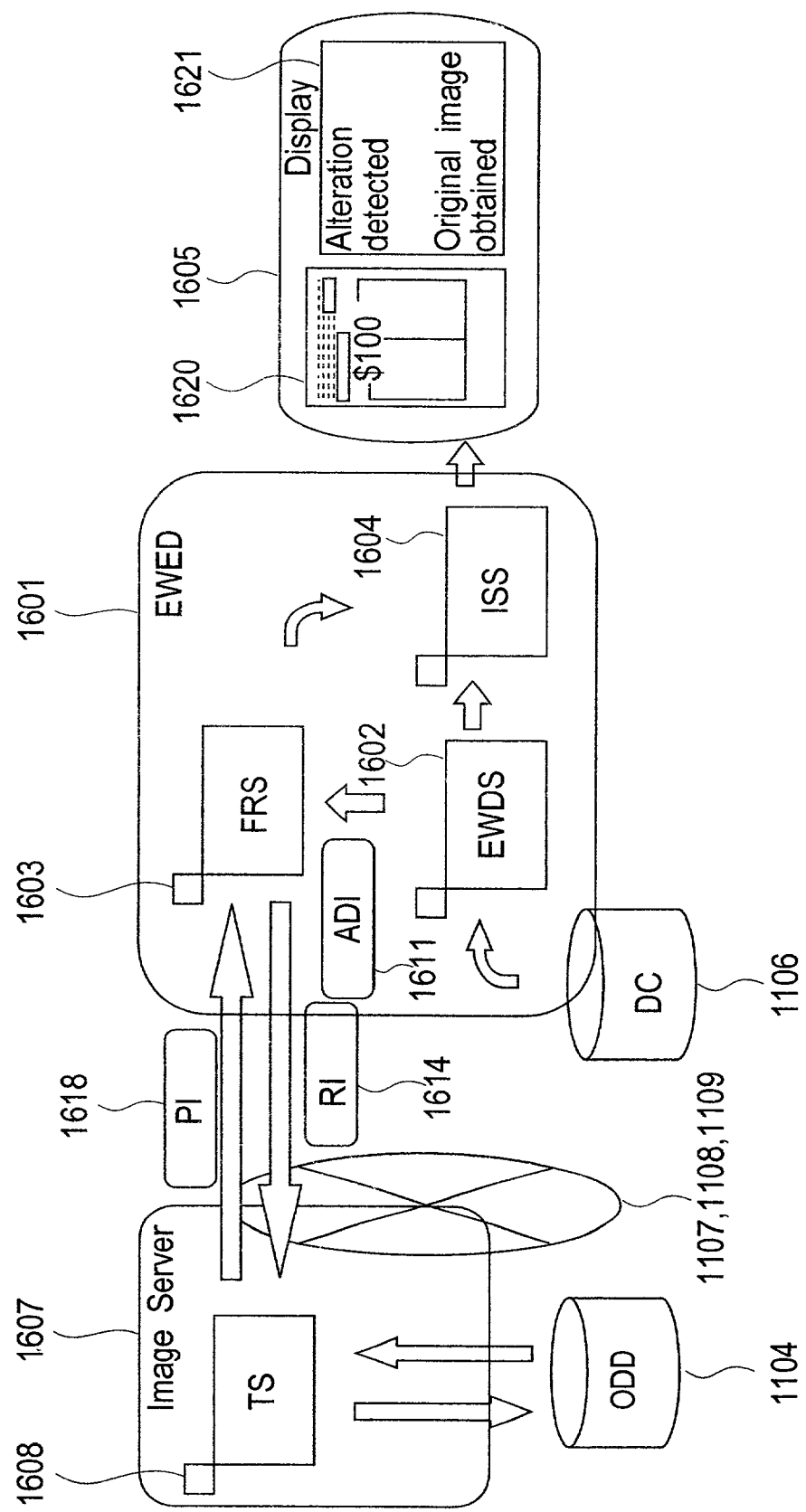
FIG. 5 is a system composition diagram showing the image display system according to a second embodiment of the present invention.

Next, the second embodiment of the invention is described. FIG. 5 is a system composition diagram showing an image display system according to a second embodiment. In FIG. 5, an electronic watermark extracting device (EWED) 1601 is constituted by a personal computer, and comprises an electronic watermark detecting section (EWDS) 1602 driven by an electronic watermark detection program, a forwarding request section (FRS) 1603 driven by a forwarding request program, an image synthesizing section (ISS) 1604 and a display 1605. The electronic watermark extracting device 1601 is connected to a disk cache 1106 where image data is stored.

The electronic watermark detecting section 1602 has the function of checking whether or not there has been an alteration to the image data in the disk cache 1106, by determining whether or not an electronic watermark is present, in addition to which an interface for the forwarding request section 1603 is appended thereto. If there has been an alteration in the image data, then the interface conveys this information to the forwarding request section 1603. The image synthesizing section 1604 performs synthesis of the image data.

The image server 1607 is constituted by a personal computer, to which a transmission section (TS) 1608 driven by a transmission program is appended. The transmission section 1608 has the function of obtaining appropriate original image data from the optical disk device 1104, in accordance with a request from the forwarding request section 1603, and transmitting this image data to the forwarding request section 1603.

In the second embodiment of the present invention, similarly to the first embodiment, an electronic watermark is embedded in the image data read in by the scanner, and as illustrated in FIG. 6, the electronic watermark is embedded into respective blocks 1610 obtained by dividing the image data 1609 into predetermined sizes. Therefore, the electronic watermark extracting device 1601 is capable of detecting alterations in respective block 1610 units. FIG. 6 is an explanatory diagram showing image data according to the second embodiment.

Next, the operation of the second embodiment will be described, but it is supposed that image data embedded with an electronic watermark has already been stored in the disk cache 1106 connected to the optical disk device 1104 and electronic watermark extracting device 1601, and here, the operation of displaying this data on the display 1605 is described.

Firstly, the electronic watermark extracting device 1601 reads in the digital image 1609 stored in the disk cache 1106, and performs a check for alterations in the digital image data 1609 by means of the electronic watermark detecting section 1602. Here, if no alteration is detected, then the digital image data 1609 is displayed on the display 1605, along with information indicating that no alteration was detected.

If an alteration is detected, then alteration detection information is conveyed to the forwarding request section 1603. As illustrated in FIG. 7, the alteration detection information 1611 consists of information (file name) 1612 identifying the image where the alteration was detected, and a block number 1613 where the alteration was detected. At the same time, display of the image data on the display 1605 is halted.

Upon receiving notification from the electronic watermark detecting section (EWDS) 1602, the forwarding request section (FRS) 1603 makes a request for forwarding of the corresponding image data, to the transmission section (TS) 1608 in the image server 1607, by means of the LAN 1108, WAN 1109 and LAN 1107, in addition to which it transmits retrieval information. As shown in FIG. 8, the retrieval information 1614 consists of information (file name) 1615 identifying the image where an alteration was detected, and the requesting block number 1616, and hence it has the same content as the alteration detection information 1611.

Upon receiving the retrieval information 1614, the transmission section (TS) 1608 of the image server 1607 searches the optical disk device 1104 for image data having a file name corresponding to the request. Thereupon, the image in the block specified by the requesting block number 1616 in the retrieval information 1614 is obtained from the corresponding image data, and it is transmitted via the LAN 1107, WAN 1109 and LAN 1108, to the forwarding request section 1603, in the form of a partial image 1618.

The alteration detection information 1611 and retrieval information 1614 shown in FIG. 7 and FIG. 8 illustrate a case where, for example, the portion 1617 of the image data 1609 shown in FIG. 9 has been altered. The image data transmitted from the image server 1607 to the forwarding request section 1603 is the image for this portion 1617.

The forwarding request section 1603 transfers the received image data 1618 for the portion 1617 to the image synthesizing section 1604. The image synthesizing section 1604, as illustrated in FIG. 10, synthesizes the received partial image data 1618 with the previously read out image data 1619 for the other portions, and displays same as image data 1620 on the display 1605, along with information indicating that an alteration has been detected but original image data has been obtained, in a similar manner to the first embodiment.

In this way, according to the second embodiment, similarly to the first embodiment, if the image data stored in the disk cache 1106 has been altered, then rather than displaying the altered image data, the unaltered original image data is displayed automatically, thereby providing improved ease of operation to the user. Moreover, when unaltered original image data is forwarded from the image server 1607, only image data for the block where an alteration was detected is transmitted, and hence transmission time is shortened, and ease of operation is further enhanced.

Third Embodiment

Figure 11:
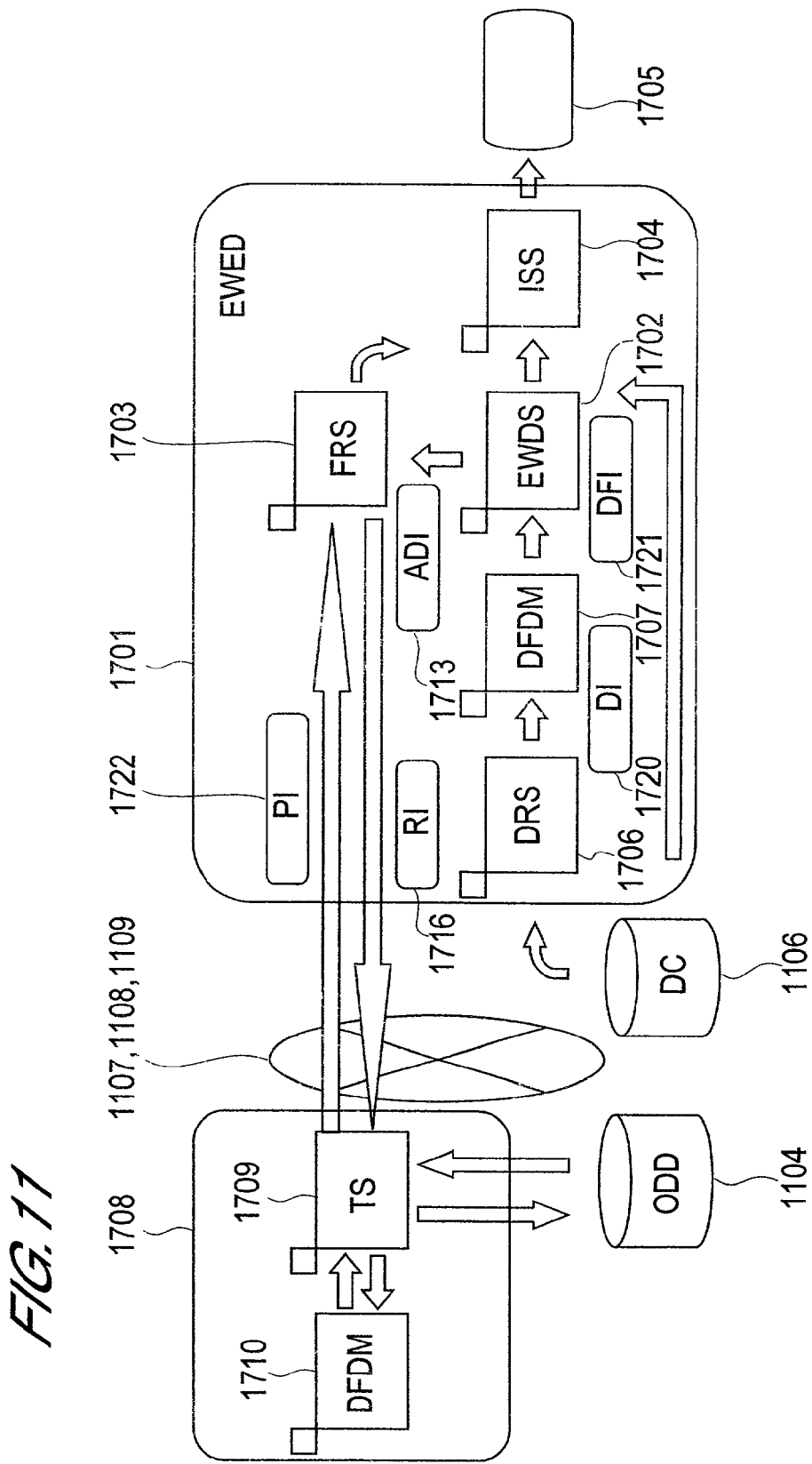
FIG. 11 is a system composition diagram showing an image display system according to a third embodiment of the present invention.

Next, a third embodiment of the present invention is described. FIG. 11 is a system composition diagram showing an image display system according to this third embodiment. In FIG. 11, the electronic watermark extracting device (EWED) 1701 is constituted by a personal computer, and comprises: an electronic watermark detecting section (EWDS) 1702 driven by an electronic watermark detecting program, a forwarding request section (FRS) 1703 driven by a forwarding request program, an image synthesizing section (ISS) 1704, display 1705, document recognition section (DRS) 1706, and document format database memory (DFDM) 1707. The electronic watermark extracting device 1701 is connected to a disk cache (DC) 1106 for storing image data.

The electronic watermark detecting section 1702, forwarding request section 1703, image synthesizing section 1704 and display 1705 are similar to those described in the second embodiment above. The document recognition section 1706 identifies the type of document. The document format database memory 1707 stores document format information for image data.

An image server 1708 is constituted by a personal computer, to which a transmission section (TS) 1709 driven by a transmission program and a document format database memory (DFDM) 1710 are appended. The transmission section 1709 has the function of obtaining corresponding original image data from the optical disk device 1104, in response to requests from the forwarding request section 1703, and transferring said data to the forwarding request section 1703. The document format database memory 1710 is similar to that in the electronic watermark extracting device 1701.

In the third embodiment, similarly to the previous embodiment, an electronic watermark is embedded in image data read in from a scanner, but as illustrated in FIG. 12, this electronic watermark in embedded for each respective text region 1712 in the image data 1711, on the basis of the document format database. Therefore, the electronic watermark extracting device 1701 is able to detect alterations in text region 1712 units. As shown in FIG. 13, for each text region 1712 in FIG. 12, co-ordinates for the document format database and image data 1711 are attached and stored. FIG. 13 is an explanatory diagram showing the contents of the document format database and image data.

Next, the operation of a third embodiment is described, but in this case, it is assumed that image data embedded with a watermark has already been stored in the disk cache 1106 connected to the optical disk device 1104 and the electronic watermark extracting device 1701. Here, the operation for showing images on the display 1705 is described.

Firstly, the electronic watermark extracting device 1701 reads in a digital image 1711 stored in the disk cache 1106, and the document type is identified by the document recognition section 1706, document information 1720 is sent to the document format database memory 1707, and document format information 1721 is appended by the document format database memory 1707. The electronic watermark detecting section 1702 checks each text region 1712 on the basis of the document format information 1721, for the presence of an alteration to the digital image data 1711.

If no alteration is detected, then the digital image data 1711 is displayed on the display 1705, along with information indicating that no alteration was detected.

If an alteration is detected, then alteration detection information 1713 is conveyed to the forwarding section request 1703. As shown in FIG. 14, this alteration detection information 1713 consists of information (file name) 1714 identifying the image where an alteration has been detected, and alteration detection text region information 1715 indicating where the alteration was detected. In this case, at the same time, the display of image data on the display 1705 is halted.

When the forwarding request section 1703 receives notification from the electronic watermark detecting section 1702, it requests transfer of the corresponding image data from the transmission section (TS) 1709 in the image server 1708, via the LAN 1108, WAN 1109 and LAN 1107, and it also transmits the alteration detection information as retrieval information 1716. As shown in FIG. 15, the retrieval information 1716 consists of information (file name) 1717 and a request text region number 1718 identifying the image where an alteration has been detected, and it has the same contents as the alteration detection information 1713. For example, if an alteration is detected in the text region 1712*a* shown in FIG. 16, then the content of the alteration detection text region information 1715 and the request text region number 1718 will be region 2.

In response to the request made, the transmission section 1709 of the image server 1708 receiving the aforementioned retrieval information 1716 firstly obtains the co-ordinates of the region corresponding to the text region number 1718 in the retrieval information 1716, from the document format database memory 1710. For example, if information relating to text region 1712*a* shown in FIG. 16 is received, then it obtains the co-ordinates of region 2. Next, it searches the optical disk device 1104 for image data having the file name 1717 contained in the retrieval information 1716.

Next, an image having the co-ordinates of the text region number 1718 (for example, image data for the text region 1712*a*) is obtained from the image data corresponding to the file name 1717, and the obtained image is transmitted, as a partial image 1722, to the forwarding request section 1703, via the LAN 1107, WAN 1109 and LAN 1108.

The forwarding request section 1703 transfers the received partial image data 1722 (for example, image data for the text region 1712*a*) to the image synthesizing section 1704. Similarly to the second embodiment, the image synthesizing section 1704 synthesizes the received partial image data 1722 with the previously read out image data for the other portions, and displays this image data on the display screen 1705, along with information indicating that an alteration has been detected but that original image data has been obtained.

According to the third embodiment described above, similarly to the first embodiment, if the image data stored in the disk cache 1106 has been altered, then the unaltered original image data is displayed automatically, rather than displaying the altered image data, thereby providing improved ease of operation to the user. Moreover, in cases where unaltered original image data is forwarded from the image server 1708, only the image data for text regions where an alteration has been detected will be transmitted, thereby shortening transmission time and further improving operational characteristics.

Fourth Embodiment

Figure 17:
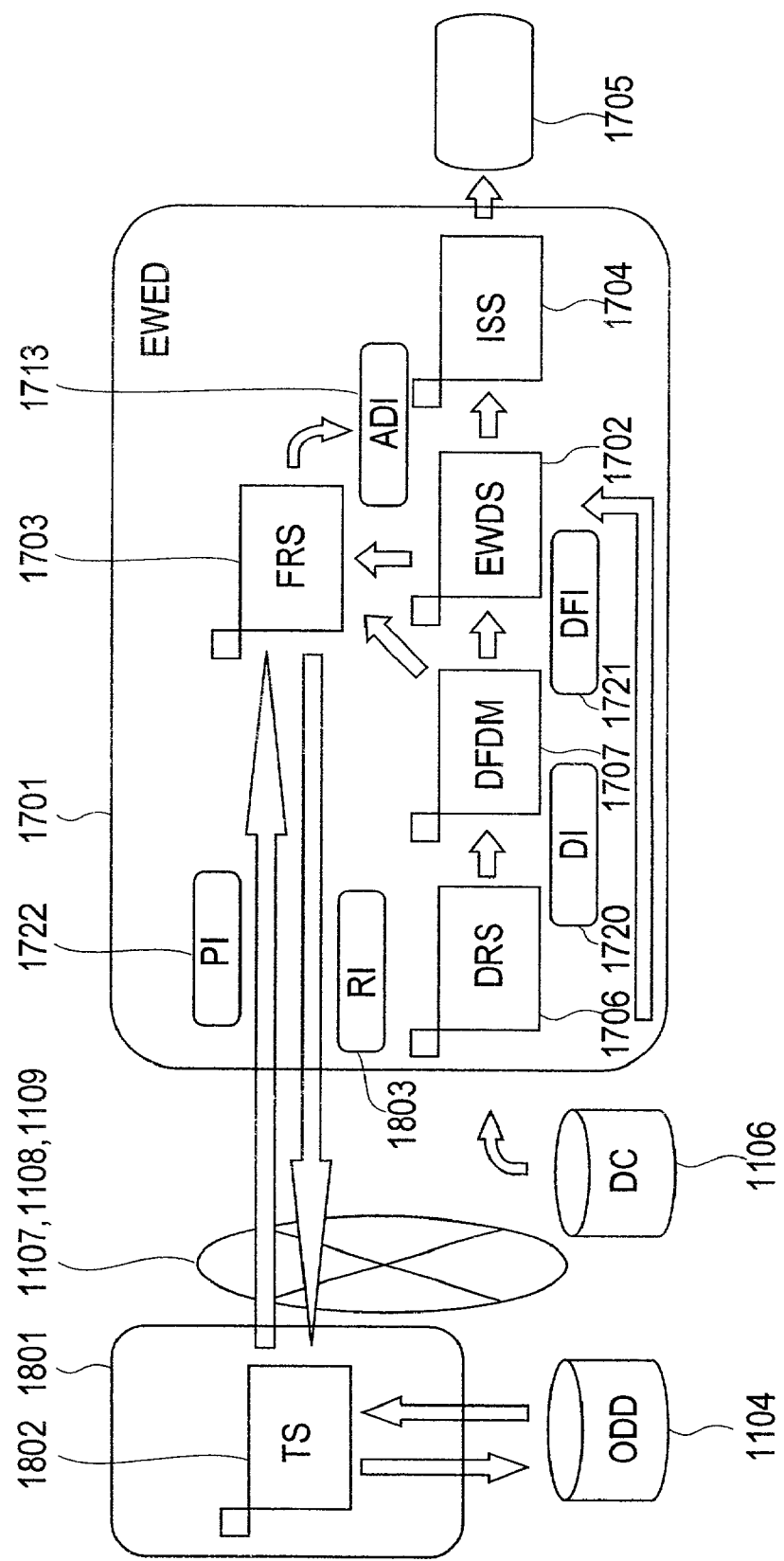
FIG. 17 is a system composition diagram showing an image display system according to a fourth embodiment of the present invention.

Next, a fourth embodiment of the invention will be described. FIG. 17 is a system composition diagram showing an image display system according to a fourth embodiment. In FIG. 17, similarly to the third embodiment described above, an electronic watermark extracting device 1701 is constituted by a personal computer and comprises an electronic watermark detecting section (EWDS) 1702, forwarding request section (FRS) 1703, image synthesizing section (ISS) 1704, display 1705, document recognition section (DRS) 1706 and a document format database memory (DFDM) 1707. The electronic watermark extracting device 1701 is connected to a disk cache (DC) 1106 which stores image data.

An image server 1801 is constituted by a personal computer, to which a transmission section (TS) 1802 driven by a transmission program is appended. The transmission section 1802 has the function of obtaining corresponding original image data from the optical disk device (ODD) 1104, in accordance with requests from the forwarding request section 1703, and transmitting this image data to the forwarding request section 1703. A document format database is not provided in the image server 1801.

In this fourth embodiment, similarly to the third embodiment described above, an electronic watermark is embedded in the image data 1711 on the basis of respective text regions 1712 based on the document format database, as illustrated in FIG. 12. Therefore, the electronic watermark extracting device 1701 is able to detect alterations in units of the respective text regions 1712.

Next, the operation of the fourth embodiment will be described, but it is assumed that image data embedded with an electronic watermark has already been stored in the disk cache 1106 connected to the optical disk device 1104 and electronic watermark extracting device 1701, and here, the operation of display images on the display 1705 is described.

Firstly, the electronic watermark extracting device 1701 reads in a digital image 1711 stored in the disk cache 1106, identifies the type of document by means of the document recognition section 1706, and sends document information 1720 to the document format database memory 1707, where document format information 1721 is appended by the document format database memory 1707. The electronic watermark detecting section 1702 checks each text region 1712 on the basis of the document format information 1721, for the presence of an alteration to the digital image data 1711.

If no alteration is detected here, then the digital image data 1711 is displayed on the display 1705, along with information indicating that no alteration has been detected.

Furthermore, if an alteration is detected, then alteration detection information 1713 is conveyed to the forwarding request section 1703. Similarly to the third embodiment, this alteration detection information 1713 consists of image identification information (file name) 1714 and alteration detection text region information 1715, as illustrated in FIG. 14. Moreover, at the same time as this operation, the display of image data on the display screen 1705 is halted.

Figure 18:
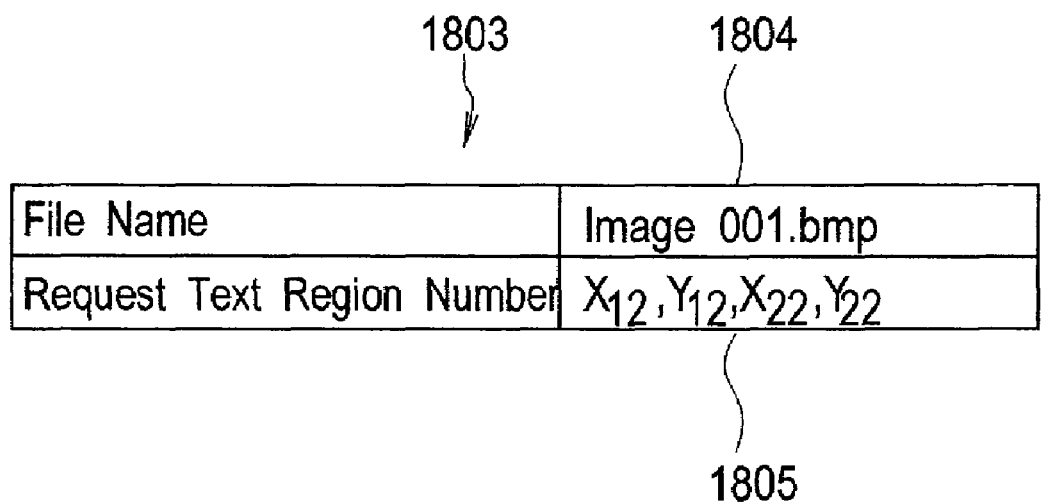
FIG. 18 is a diagram illustrating retrieval information according to a fourth embodiment of the present invention.

The forwarding request section 1703 obtains text region co-ordinates corresponding to the alteration detection text region information 1715 in the alteration detection information 1713, from the document format database memory 1707, and transmits the obtained co-ordinates information as retrieval information 1803 to the transmission section 1802 in the image server 1801. As illustrated in FIG. 18, the retrieval information 1803 is constituted by information (file name) 1804 identifying the image where an alteration has been detected and a request text region number 1805 containing co-ordinates information.

Upon receiving the retrieval information 1803, the transmission section 1802 of the image server 1801 searches the optical disk device 1104 for corresponding image data, on the basis of the co-ordinates for the region indicated by the request text region number 1805 in the retrieval information 1803. The obtained image is transmitted, as a partial image 1722, via the LAN 1107, WAN 1109, LAN 1108, to the forwarding request section 1703.

Similarly to the third embodiment, the forwarding request section 1703 transfers the received partial image data 1722 to the image synthesizing section 1704. The image synthesizing section 1704 synthesizes the received partial image data 1722 with the previously read out image data for the other portions, and displays this image data on the display screen 1705, along with information indicating that an alteration has been detected but original image data has been obtained.

According to the fourth embodiment described above, similarly to the first embodiment, in cases where image data stored in the disk cache 1106 has been altered, unaltered original image data is displayed automatically, rather than displaying the altered image data, thereby providing improved ease of operation to the user. Moreover, when unaltered original image data is forwarded from the image server 1801, only the image data for the text regions where alterations have been detected is transmitted, thereby shortening transmission time and further improving operating characteristics. Moreover, according to the fourth embodiment, when forwarding of image data is requested, the co-ordinates of the text region are transmitted, and hence it is not necessary to provide a document format database in the image server 1801, thereby simplifying the composition in comparison with the third embodiment.

Fifth Embodiment

Figure 19:
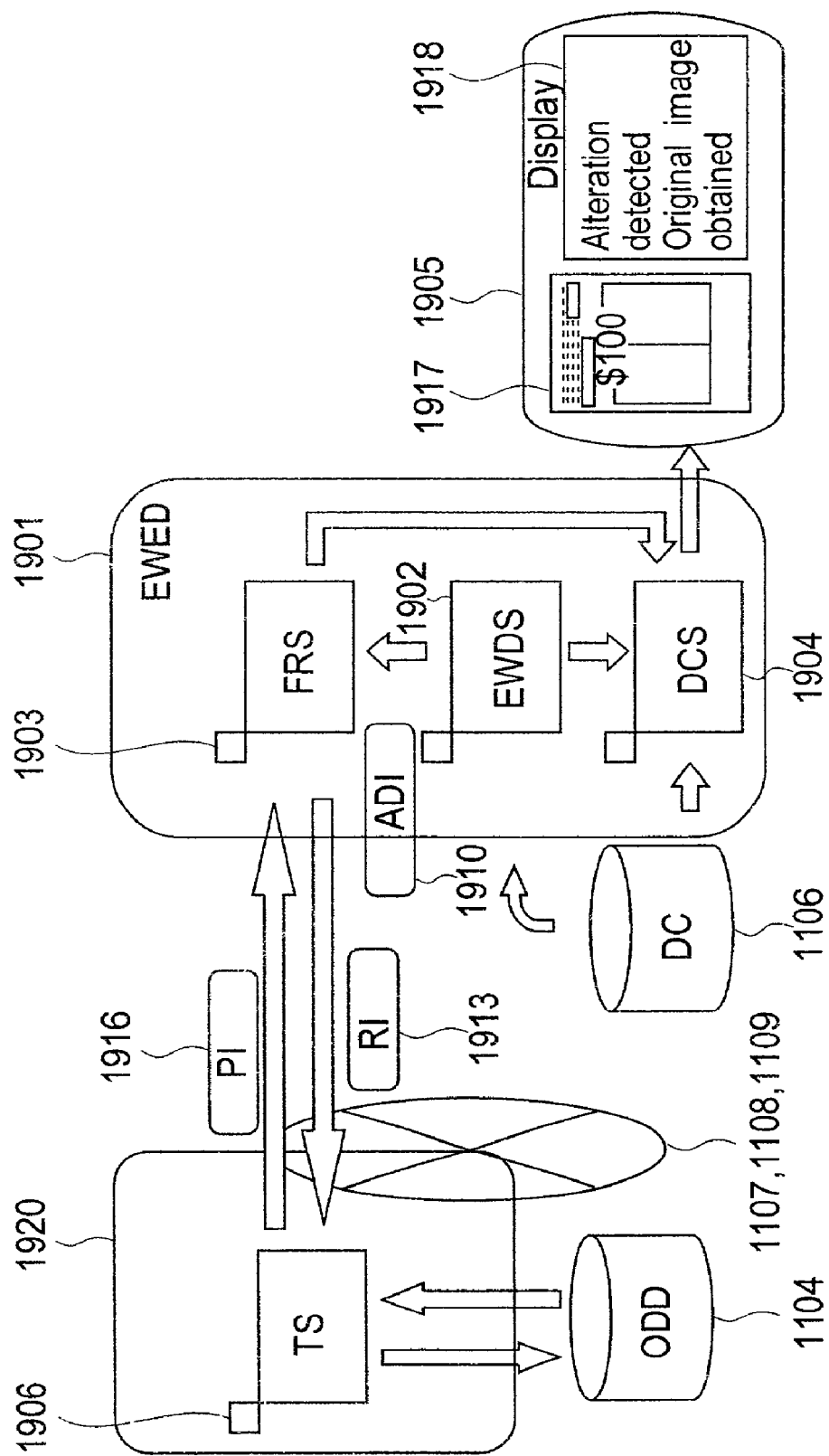
FIG. 19 is a system composition diagram showing an image display system according to a fifth embodiment of the present invention.

Next, a fifth embodiment of the present invention is described. FIG. 19 is a system composition diagram showing an image display system according to this fifth embodiment. In FIG. 19, an electronic watermark extracting device (EWED) 1901 is constituted by a personal computer, provided with a electronic watermark detecting section (EDDS) 1902 driven by an electronic watermark detecting program, a forwarding request section (FRS) 1903 driven by a forwarding request program, and a document composing section (DCS) 1904, and it is connected to a display 1905 and a disk cache (DC) 1106 in which image data is stored.

The electronic watermark detecting section 1902, forwarding request section 1903 and display 1905 are similar to those in the second embodiment described above. The document composing section 1904 composes a plurality of items of image data into a single item of image data.

The image server 1920 is constituted by a personal computer, to which a transmission section (TS) 1906 driven by a transmission program is appended. The transmission section 1906 has the function of obtaining corresponding original image data from the optical disk device (ODD) 1104, in accordance with a request from the forwarding request section 1903, and transmitting this image data to the forwarding request section 1903.

In the fifth embodiment, image data stored in a disk cache 1106 connected to the optical disk device 1104 and the electronic watermark extracting device 1901 is divided into a target region image 1907 and a remainder image 1908, as illustrated in FIG. 20, this image being managed in association with structuring information 1909 as illustrated in FIG. 21.

Describing the storage of image data in this case, digital image data read in by means of a scanner is identified with regard to document type by a document identification section (not illustrated), the image data is divided by means of a document structuring section (not illustrated), in accordance with a previously determined document format database, and structuring information as illustrated in FIG. 21 is created. The electronic watermark is embedded into the respective regional images 1907 illustrated in FIG. 20. The electronic watermark extracting device 1901 is able to detect alterations in units of the respective regional images 1907.

Next, the operation of the fifth embodiment of the present invention is described, it being assumed that image data embedded with an electronic watermark has already been stored in the disk cache 1106 connected to the optical disk device 1104 and electronic watermark extracting device 1901. Here, the operation of displaying images on the display screen 1905 is described.

Firstly, the electronic watermark detecting section 1902 of the electronic watermark extracting device 1901 reads in image data stored in the disk cache 1106, and checks for the presence of alterations in each of the items of image data, in accordance with the structuring information 1909 shown in FIG. 21. If no alteration is detected here, then the image data is displayed on the display screen 1905, along with information indicating that no alteration has been detected.

If an alteration has been detected, then alteration detection information 1910 is conveyed from the electronic watermark detecting section 1902 to the forwarding request section 1903. As illustrated in FIG. 22, this alteration detection information 1910 consists of information (file name) 1911 identifying the image where an alteration has been detected and alteration detection image information 1912 indicating where the alteration was detected. At the same time as this operation, display of image data on the display screen 1905 is halted.

Upon receiving the aforementioned notification from the electronic watermark detecting section 1902, the forwarding request section 1903 requests transfer of corresponding image data from the transmission section 1906 in the image server 1920, via the LAN 1108, WAN 1109 and LAN 1107, in addition to which it transmits alteration detection image information as retrieval information 1913. As shown in FIG. 23, the retrieval information 1913 consists of information (file name) 1914 identifying the image where an alteration has been detected and a request image region number 1915, and hence it has the same contents as the alteration detection information 1910.

Upon receiving the retrieval information 1913, the transmission section 1906 of the image server 1905 obtains image data corresponding to the file name 1914 and the request image region number 1915 in the retrieval information 1913, from the optical disk device 1104, and transmits the obtained image as a partial image 1916 to the forwarding request section 1903, by means of the LAN 1107, WAN 1109 and LAN 1108.

The forwarding request section 1903 transfers the received partial image data 1916 to the document composing section 1904. This document composing section 1904 combines the received partial image data 1916 with the previously read out image data for the remaining regions, and displays, on the display 1905, this combined data as image data 1917, along with information 1918 indicating that an alteration has been detected but original image data has been obtained.

According to the fifth embodiment described above, similarly to the first embodiment, if the image data stored in the disk cache 1106 has been altered, then rather than displaying the altered image, the unaltered original image data is displayed automatically, thereby providing improved ease of operation to the user. Moreover, in the case of structured documents, when forwarding unaltered original image data from the image server 1920, only the image data in the text region where an alteration has been detected is transmitted, and hence transmission time is shortened, and ease of operation is further enhanced.

In the descriptions relating to the second to fifth embodiments above, it was supposed that there was only one region where an alteration was detected, but even in cases where alterations are detected in more than one region, it is still possible for unaltered image data to be displayed automatically, by means of the processing described above.

In the first to fifth embodiments in the foregoing description, electronic watermark technology was described as an example of a method for detecting alterations to the image data, but it is also possible to use electronic authorship technology for detecting alterations. Moreover, in the foregoing embodiments, the image display system was described as a dedicated system, but the present invention may also be applied to a generic web-based image display system.

The image display system according to the present invention described in detail above provides: a function for requesting transfer of original image data from original image holding device when an alteration to image data has been detected, a function for transmitting original image data to the requesting source in accordance with the transfer request for original image data, and a function for displaying the received original image data, and therefore, even if there has been an alteration to image data that is to be displayed, unaltered image data is automatically read out and displayed, without requiring the operator to perform separate read-out operations, thereby providing improved ease of use to the operator.

Embodiments of Image Display System

With reference to the drawings, embodiments wherein an image display system is applied to a document management system will be described hereinbelow. In the following descriptions, embodiments of a document management system and an image registration terminal device and reading device forming constituent elements thereof will be described.

General Description of Document Management System

Figure 30:
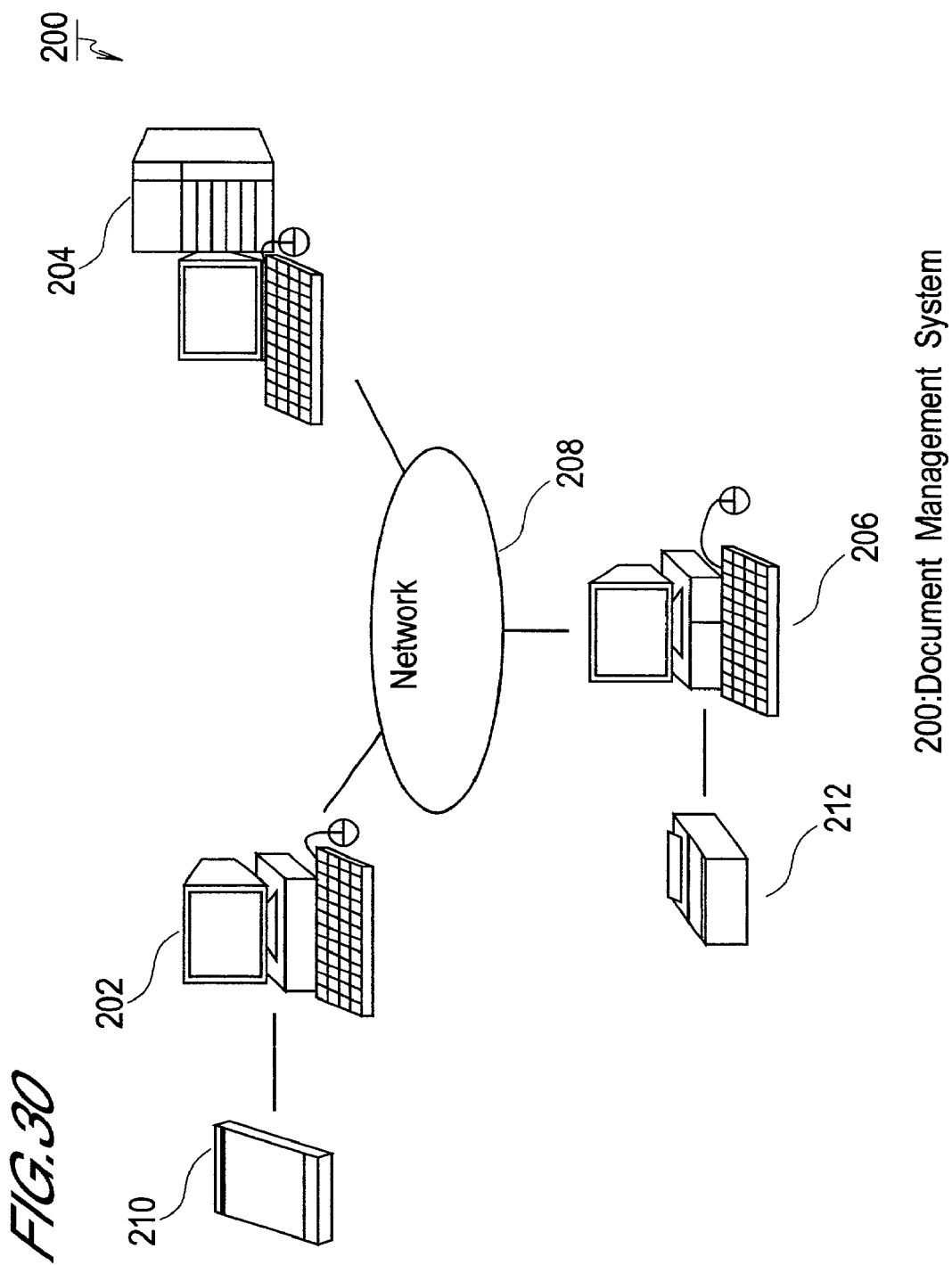
FIG. 30 is a diagram illustrating a compositional example of an image display system for a first and second document management system according to the present invention.

FIG. 30 is a diagram showing a compositional example of a document management system according to the present invention. The hardware composition of the document management system 200 according to this invention comprises an image registration terminal device 202, a server 204, and a reading terminal device 206, which are mutually linked by means of a network 208.

Figure 24:
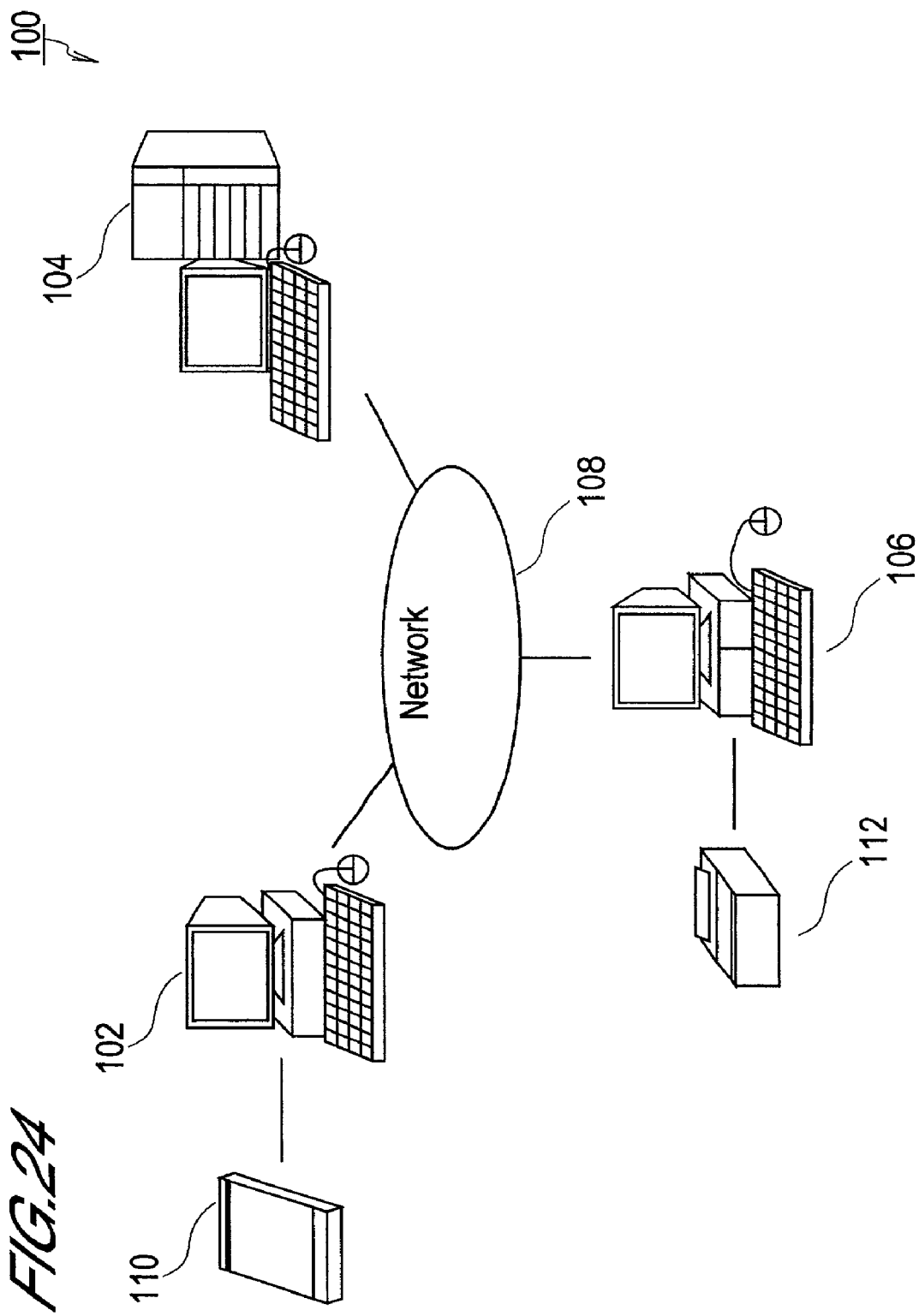
FIG. 24 is a diagram illustrating the constituent elements and connection relationships of a system for explaining one example of an image display system for a document management system for disclosing documents according to the prior art.

Moreover, the image registration terminal device (hereinafter, simply called the registration terminal device or registration terminal) 202, the reading terminal device (hereinafter, simply called the reading terminal) 206, and the server 204 are constituted by computers, and consequently the actual hardware composition is equivalent to that of the conventional document management system illustrated in FIG. 24, but the functions provided by the CPU (central processing unit) contained in the registration terminal device and reading terminal device are different from those in the conventional system. Similarly to the prior art, the server 204 should be composed in such a manner that it registers various types of information, such as data transmitted from the registration terminal device, externally input data, and the like, and allows this registered information to be read out in accordance with requests from the reading terminal device.

Moreover, information for controlling the registration terminal device, reading terminal device and server is previously stored in respective memories thereof, or alternatively, it is input as required from an external source, or generated internally.

The document management system 200 according to the present invention creates image data by reading in documents (original documents) which it is intended to be disclosed, by means of an image reader 210 constituting an input section, provided at the registration terminal device 202. This image data is displayed on the screen, and prospective (or candidate) non-disclosed regions are set in the displayed regions of the image data. Each of index data identifying (or specifying) the image data and the prospective non-disclosed regions, respectively, is created respectively inside the device according to an external command. The created index data and the corresponding image data are registered in the server 204.

In response to an application made by a party applying for disclosure of information, the reading terminal device 206 reads out image data and index data corresponding to the application, from the server 204. The read out image data is then displayed on a screen on the basis of the index data, in association with a display of the prospective non-disclosed regions, or specification of the prospective non-disclosed regions. If the prospective non-disclosed regions are displayed, then after confirmation, they are set as non-disclosed regions. In this way, the image data corresponding to the original document can be processed in such a manner that the contents of the regional portions of the image data which have been set as non-disclosed regions cannot be seen, whereupon the document is supplied as a disclosure document (provision document) via an output section, such as a printer 212, or the like.

Below, embodiments of a document management system relating to the image display system according to the present invention will be described, but since the substantial constituent elements thereof are the registration terminal device and the reading terminal device, the description will concentrate principally on these respective devices. Moreover, in the descriptions of the respective embodiments, repeated descriptions of common functions are omitted, except where further description is necessary, and furthermore, reference is made to the same common diagrams in the description (including diagrams used in the description of related art.)

Sixth Embodiment

In the first document management system, a method is adopted where all of the information regions in the image data region are displayed independently as prospective non-disclosed regions, and the actual non-disclosed regions, which are not to be disclosed, are determined from all of the prospective non-disclosed regions displayed.

This first document management system (hereinafter, may also be called simply 'the first system') 200 comprises a first image registration terminal 220 (corresponding to 202 in FIG. 30) and a first reading terminal device 240 (corresponding to 206 in FIG. 30).

Composition of First Registration Terminal Device

Figure 31:
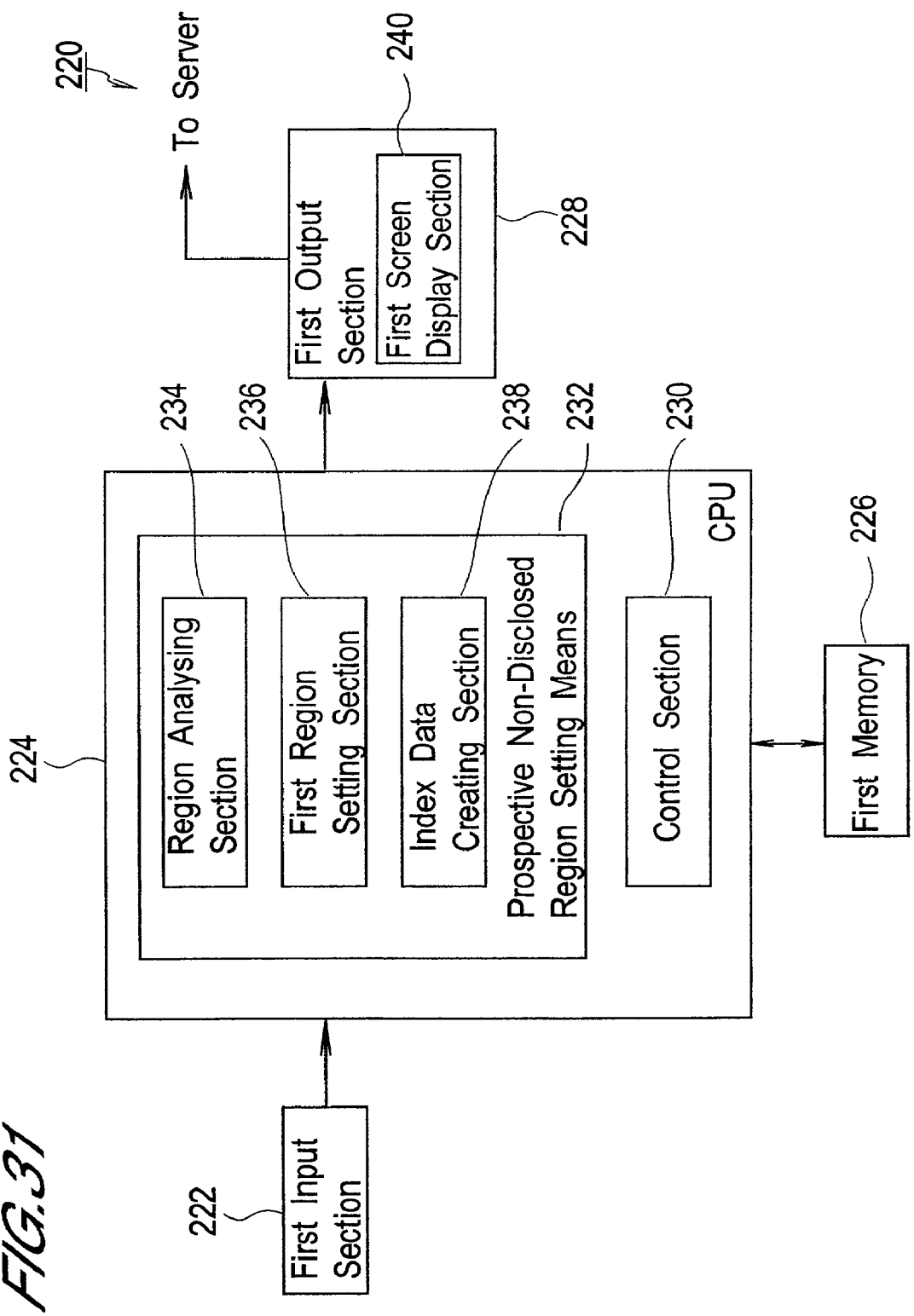
FIG. 31 is a functional block diagram for explaining a first and third image registration terminal device according to the present invention.

FIG. 31 is a functional block diagram giving an illustration of a first registration terminal device 220. This first registration terminal 220 comprises a first input section 222, CPU 224, first memory 226 and first output section 228.

The first input section 222 comprises an image reader for converting original image data for a document (original document) which it is intended to disclose into image data, and it also comprises various input device, such as a keyboard, mouse, signal input terminal, and the like, for inputting external control signals, such as prescribed commands, or the like. In the case of the present example, it is supposed that the original document is the paper-based information illustrated in FIG. 25. Similarly to the prior art, the obtained image data is transmitted to the CPU 224, together with two-dimensional co-ordinate values, and is stored in a first memory 226. Moreover, the party registering the data inputs the name of the provider of the original document, the item names in the document, and the date, as searchable keywords, by means of the first input section 222.

In this example, it is assumed that there is no objection to disclosure of these keyword data.

The first output section 228 is provided with a first screen display section 240 for displaying prescribed data, such as image data, and the like, and it is also equipped with a signal output terminal for outputting data to be registered in the server 204, a printer, and if necessary, sound output device. In this example, the server 204 is taken to be a document management server.

The first memory 226 previously stores data for controlling the various constituent parts of the first registration terminal 220, such as control signals, dictionaries, and the like. If necessary, the aforementioned image data or other data input from an external source, or alternatively, internally generated data, or the like, can be stored in the first memory 226 in a freely readable state.

The CPU 224 performs various processing with regard to its designated functions, whilst also controlling the processing performed by the other constituent elements. This CPU 224 comprises, as functional device, a control section 230 and prospective non-disclosed region setting device 232. The control section 230 establishes synchronism with the respective constituent elements and performs the aforementioned control of the CPU, by means of prescribed data stored in the first memory 226, and the like.

The prospective non-disclosed region setting device 232 sets prospective non-disclosed regions within the image data region of the image data obtained from the first input section 222, and creates setting data for the set regions accordingly.

The prospective non-disclosed region setting device 232 comprises a region analysing section 234, a first region deciding section 236, and an index data setting section 238.

Figure 32:
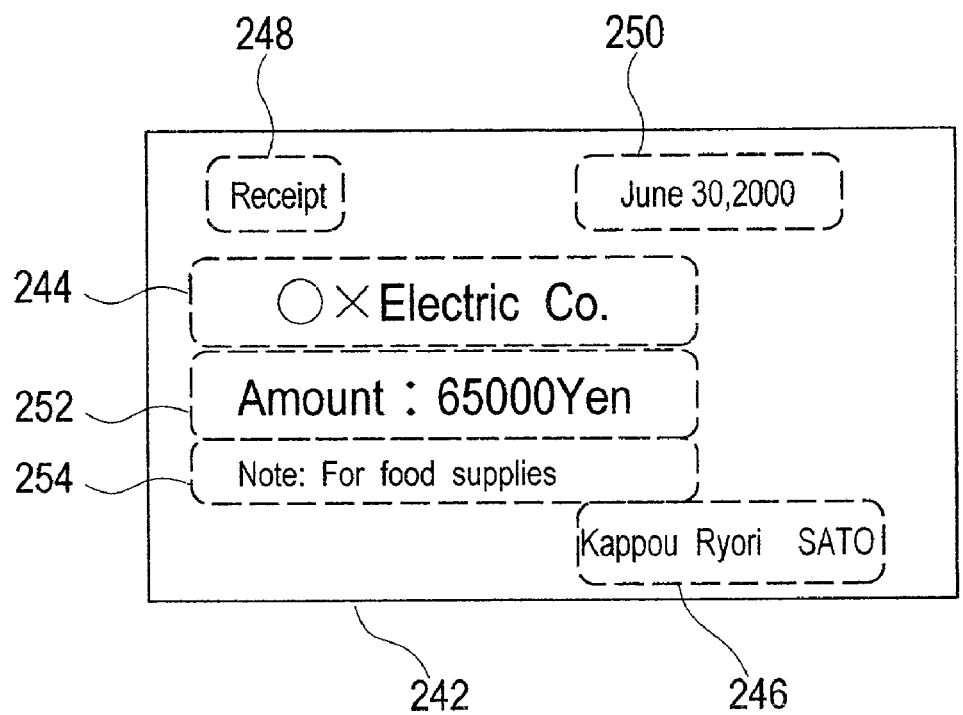
FIG. 32 is a diagram illustrating region analysed image data, for explaining an image registration terminal device according to the present invention.

The region analysing section 234 detects region information relating to the position and size of the prospective non-disclosed regions which are to be designated as set regions, on the basis of information relating to the co-ordinate values of the registered image data, the density of the image data, and the like, and a method for pattern matching with information relating to characters, symbols, numerals, and the like, previously registered in the first memory. This region information constitutes a portion of the setting data. In this region analysis operation, text information groups which have a single combined meaning are detected as candidate units. The detection results are set and displayed for each candidate unit. FIG. 32 is a diagram showing an example where the results of region analysis, in other words, image data which has completed region analysis, are displayed on the first screen display section. In this example, a dotted frame line is displayed surrounding all of the potential candidate regions, namely the prospective non-disclosed regions 244, 246, 248, 250, 252 and 254.

Figure 33:
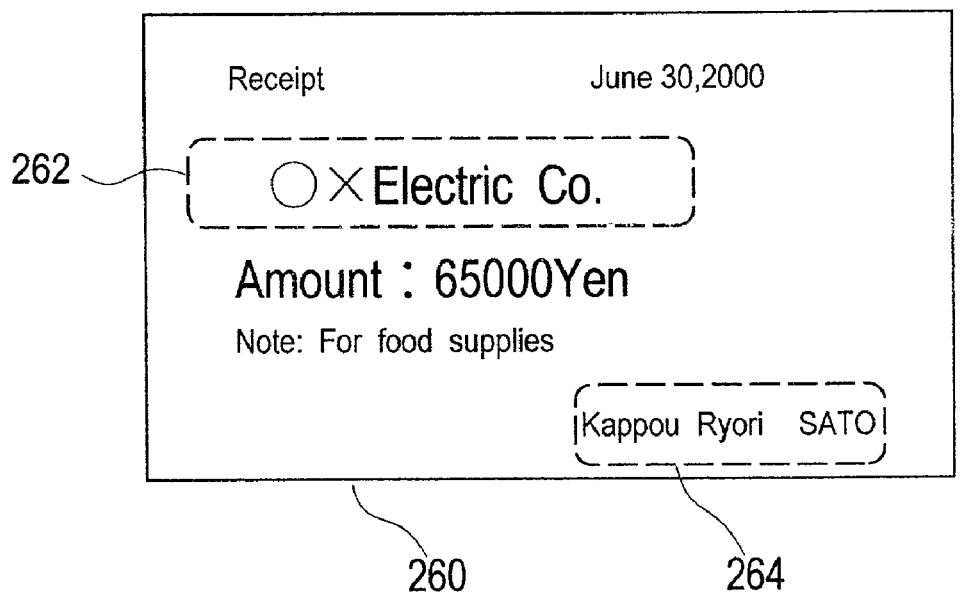
FIG. 33 is a diagram illustrating amended image data for explaining an image registration terminal device according to the present invention.

The first region deciding section 236 finally sets the non-disclosed regions within the image data region displayed on the first screen display section 240. This setting procedure is carried out by amending the prospective non-disclosed regions. For example, whilst looking at the analyzed image data 242 displayed, the registering party inputs setting commands via the first input section 222, and if there is a region which may be disclosed amongst all of the prospective non-disclosed regions 244, 246, 248, 250, 252, 254, that are displayed, then he or she cancels the non-disclosure setting for that region. By this cancellation process, the final non-disclosure decided regions are determined. FIG. 33 shows an example where the results of such regional amendment, in other words, the amended image data 260, is displayed on a first image display section 240. Furthermore, in this example, the final set regions are the region 262 containing the addressee "OX Electric Co." and the region 264 containing the issuing party "Kappou Ryori SATO".

The designation of the set regions in this case may be displayed on the screen of the first screen display section 240 by means other than the dotted frame lines described above, for example, by solid frame lines, or the like, and moreover, the set regions may be displayed in colour, or a background display may be applied to the set regions. This setting display data is previously stored in the first memory 226.

The first index data creating section 238 creates respective index data relating to the image data and the set regions, as part of the setting data. In the present example, the description format used for the index data is XML document mark-up language. This setting data of image data also contains the aforementioned indexing keywords. Moreover, the setting data for the set regions also contains the aforementioned region information and two-dimensional co-ordinate values relating to the position (region width) and size (region height).

Besides this, the index data relating to the image data also contains a tag name and attribute name for the image data. This index data serves to identify that the data is original document image data, and is created in the form <Image ref ="#Image/Image jpg">.

On the other hand, the index data relating to the set regions also comprises region numbers. For example, region numbers are created for the partial image data in set regions 262 and 264. These region numbers form a tag name and attribute name, and they are created respectively according to the number of set regions. In the current example, there are two set regions 262 and 264, and therefore <Region no="1"> is created for one region and <Region no="2"> is created for the other region.

This index data is stored together with the image data, in a readable fashion, in the first memory. Furthermore, FIG. 34 shows an example of the composition of the index data. In this diagram reference numeral 270 indicates the whole structure of the index data, reference numeral 272 indicates the index data relating to set regions 262 and 264, and reference numeral 274 indicates the index data relating to the image data. The index data 274 relating to the regions denotes, in addition to the region numbers, their corresponding co-ordinate values, width and height.

Composition of First Reading Terminal Device

Figure 35:
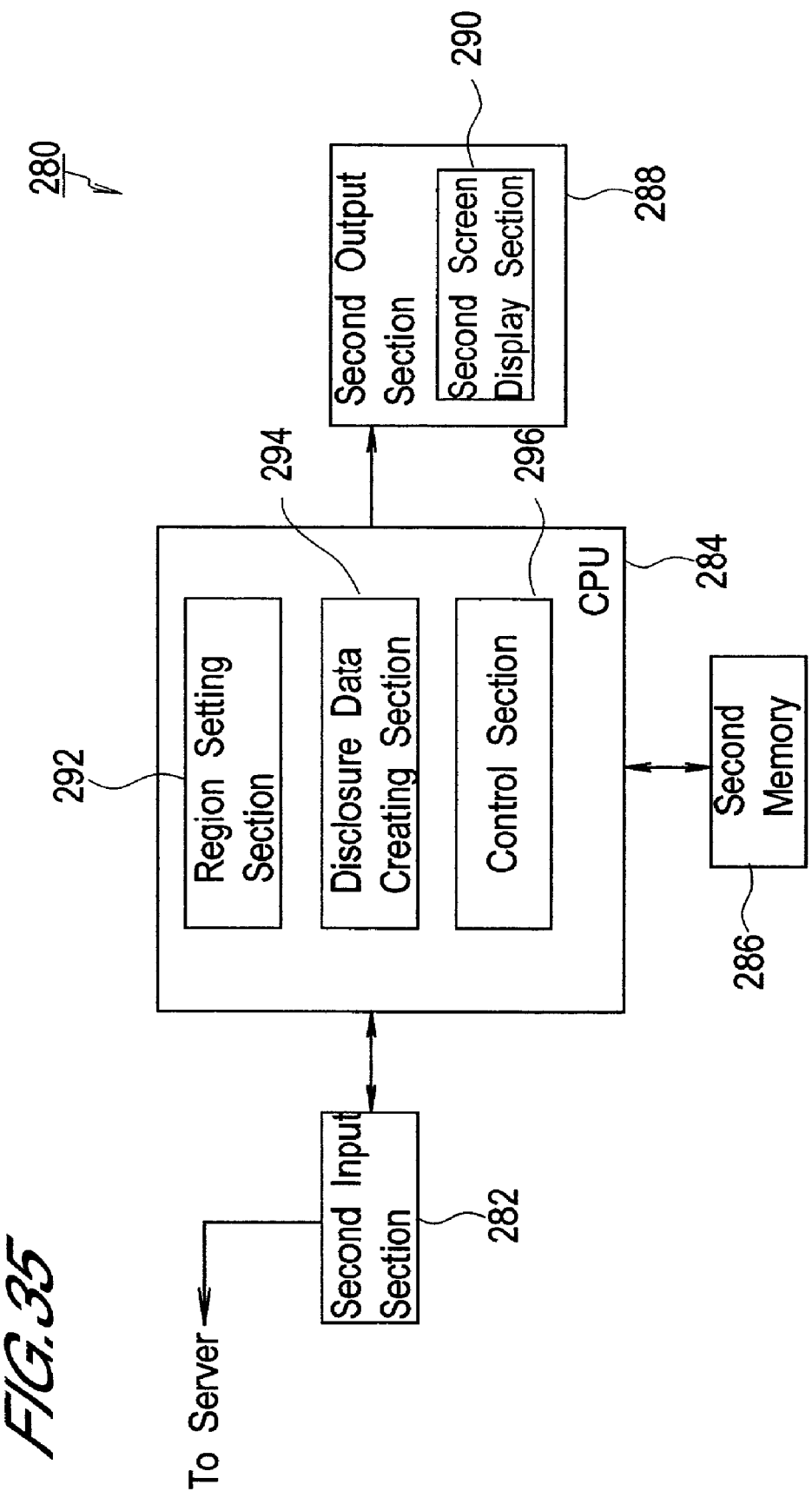
FIG. 35 is a functional block diagram for explaining the first to fourth reading terminal devices according to the present invention.

Next, a first reading terminal device corresponding to the first registration terminal device will be described. FIG. 35 is a functional block diagram giving an illustration of a first reading terminal device 280. This first reading terminal 280 comprises a second input section 282, CPU 284, second memory 286 and second output section 288.

The second input section 282 is linked, for example, to the document storage (or management) server 204 by means of a network (208 in FIG. 7), and it is also provided with a keyboard, mouse, and other suitable external input device. This second input section 282 reads out image data registered in the server 204 and setting data respectively identifying set regions which have been designated as prospective non-disclosed regions within this image data region. This image data and setting data is stored in the second memory 286, by means of the CPU 284.

Data for controlling the respective constituent elements of the first reading terminal 280, such as control information, dictionaries, and the like, is previously registered in the second memory 286. Moreover, if necessary, further data input from an external source, or alternatively, internally generated data, or the like, can be stored in the second memory 286 in a freely readable state.

The second output section 288 is provided with a second screen display section 290 for displaying prescribed data required in the processes for creating a provision document, such as image data of the disclosed document that is to be provided, and the like. It is also provided with a printer. Moreover, if necessary, the second output section 288 may also comprise a signal output terminal for outputting data relating to a provision document, or sound output device, image display device, or other suitable device.

The CPU 284 executes respective processing according to its designated functions, and also controls the processing performed by the other constituent elements. The CPU 284 comprises, as functional device, a region deciding (setting) section 292, disclosure data creating section 294, and control section 296. The control section 296 establishes synchronism with the respective constituent elements and performs the aforementioned control of the CPU 284, by means of prescribed data stored in the second memory 286, and the like.

The region deciding (setting) section 292 recognizes set regions within the image data region, and designates disclosed regions and non-disclosed regions.

Figure 36:
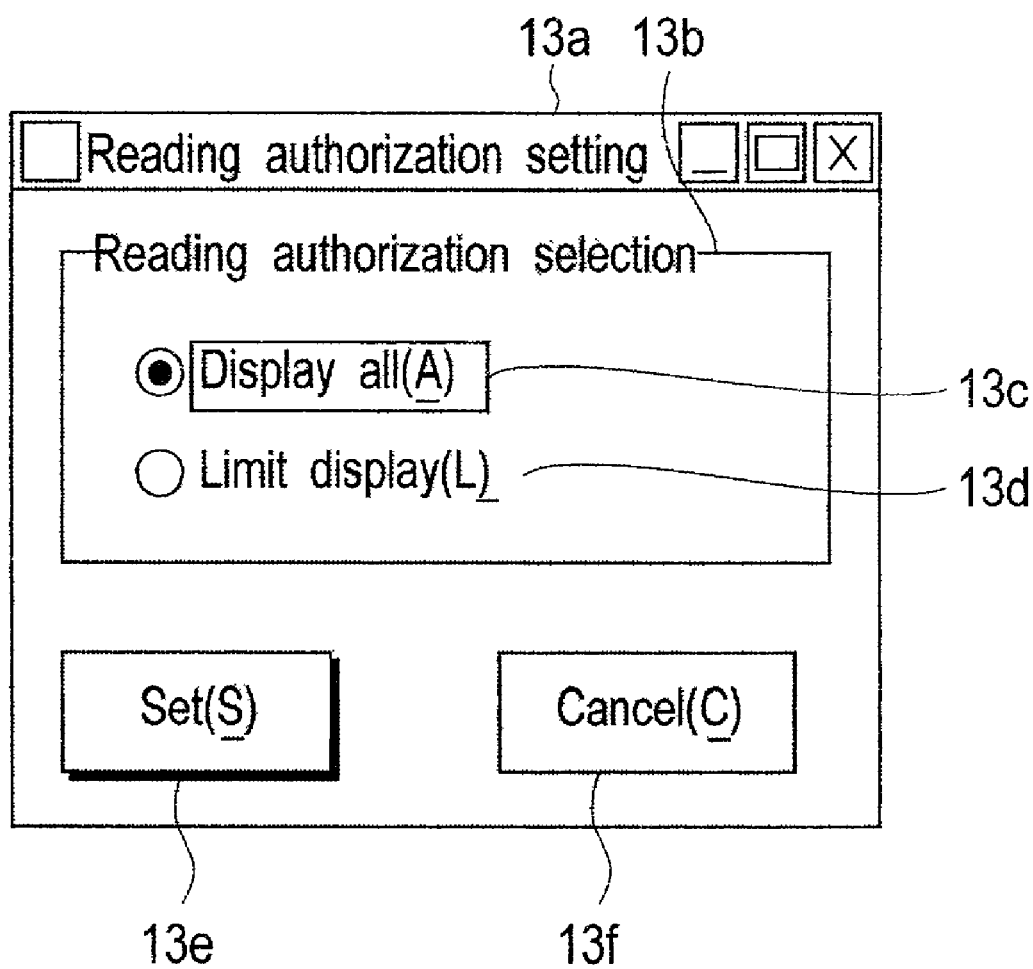
FIG. 36 is a diagram illustrating one example of a reading authorization setting screen for explaining a reading terminal device according to the present invention.

For this purpose, the second memory 286 previously stores reading authorization setting data containing first selection information for displaying the set regions which are prospective non-disclosed decided regions, and second selection information which is used to convert prospective non-disclosed regions into non-disclosed decided regions. This reading authorization setting data is read out from the second memory 286 and a reading authorization setting image (or information) 13a (FIG. 36) is displayed on the second screen display section 290. This display operation is performed after reading out image data and setting data from the server 204. FIG. 36 shows one example of a reading authorization setting image. On this reading authorization setting screen 13a, there is a reading authorization selecting box 13b, in which a selection item 13c, "Display all (A)", forming first selection information, and a selection item 13d, "Limit display (L)", forming second selection information, are displayed. Moreover, 13e is a "Set" box for selecting items and there is also a 'Cancel' box for cancelling the reading authorization setting screen 13a.

Firstly, if the "Display all" item 13c is set and the "Set" box 13e is selected, by confirmation commands implemented by the disclosing party by means of the second input section 282, then in response, image data identified by the setting data, in other words, the index data 274, is read out from the second memory 286 and displayed on the second screen display section 290. Thereupon, the regions within the displayed image data which are identified by a <Region> tag in the setting data, in other words, the index data 272 illustrated in FIG. 34, are designated and displayed accordingly on the second screen display section 290. The displayed image example shown is a displayed image similar to the FIG. 33. In other words, the regions 262 and 264 within the displayed image data region are displayed within a frame, for example. The framed regions 262 and 264 are regions which are set as prospective non-disclosed regions. The disclosing party confirms that the contents of the framed regions are contents that are not to be disclosed. When the disclosing party has approved that non-disclosure is appropriate, the prospective non-disclosed regions are designated as non-disclosure decided regions, and furthermore, all of the remaining image data region is designated as a disclosed region.

Besides surrounding the set regions with a frame, it is also possible to display these settings by means of a colour display, background display, or the like. Data relating to this setting display is also stored previously in the second memory 286, in a readable state, in such a manner that the display can be selected.

The disclosure data creating section 294 converts the image data in the non-disclosure decided regions determined by the above process into non-readable data. At the same time, it also converts image data for the disclosed region to readable data, and hence disclosure data consisting of non-readable data and readable data is created. This non-readable data and readable data is stored in the second memory 286.

For this purpose, the reading authorization setting image 13a is called up again and the second screen display section 290 is displayed, according to readable/non-readable commands input by the disclosing party via the second input section 282. Thereupon, the item 13d, namely, the second selection information "Limit display (L)" is selected by means of a selection command via the second input section 282. According to this selection operation, the regions 262 and 264 identified by the <Region> tag in the index data 272 are converted to non-readable data. In this example, they are converted to blacked-out images, for instance. The disclosed region other than these regions is converted to readable data. The image display corresponding to the converted data is a similar display to that illustrated in FIG. 29, and this data is stored in the second memory 286. Instead of using a blacked-out display, it is also possible to convert the images to a white (blank) display, or alternatively, to delete the regions 262 and 264 from the screen.

The respective commands, such as the aforementioned confirmation commands, selection commands, and the like, and the setting instructions or image call-up instructions, and the like, are performed according to the wishes of the disclosing party, by means of commands input via the second input section 282.

Figure 29:
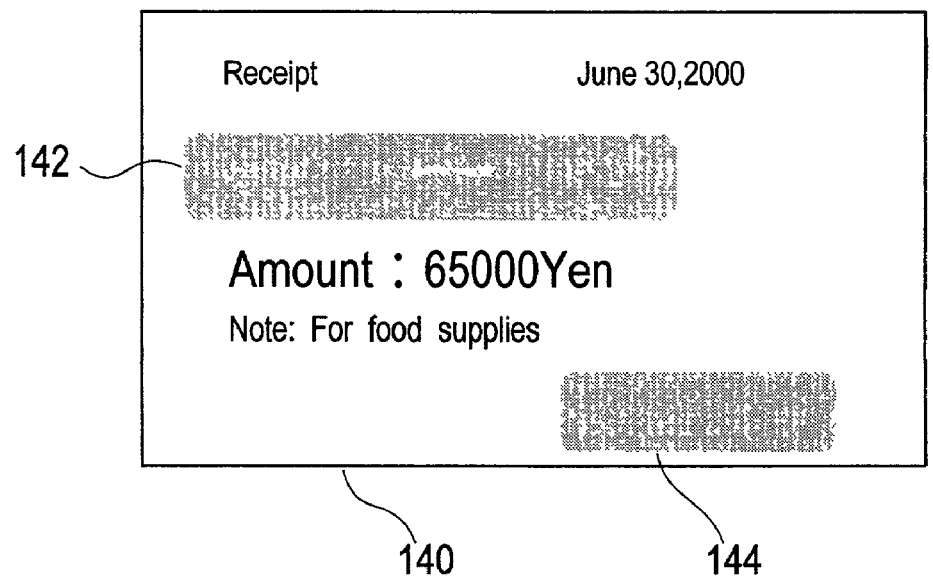
FIG. 29 is a diagram showing one example of a disclosure document (provision document) wherein non-disclosed regions have been blanked out, for explaining an image display system for a document management system according to the present invention and to the prior art.

Disclosure data created in this way is called up from the second memory by means of an output command from the second input section 282, and transmitted to the second output section 288, where it is converted to a disclosed document where characters, numerals, and the like, can be read, by means of a printer, or the like, or where the contents thereof are displayed on a TV screen, or the like. In the example described here, a printed document corresponding to FIG. 29 is obtained.

If there is an error in the designation of the set regions as prospective non-disclosed regions within the image data region called up from the server, then the designation of a set region can be cancelled, thereby converting it to a disclosed region. To do this, a setting cancellation command is input from the second input section 282, and the corresponding region number in the <Region> tag name in the index data is specified to cancel the setting.

Description of the Operation of the First Document Management System

Figures 25, 26:
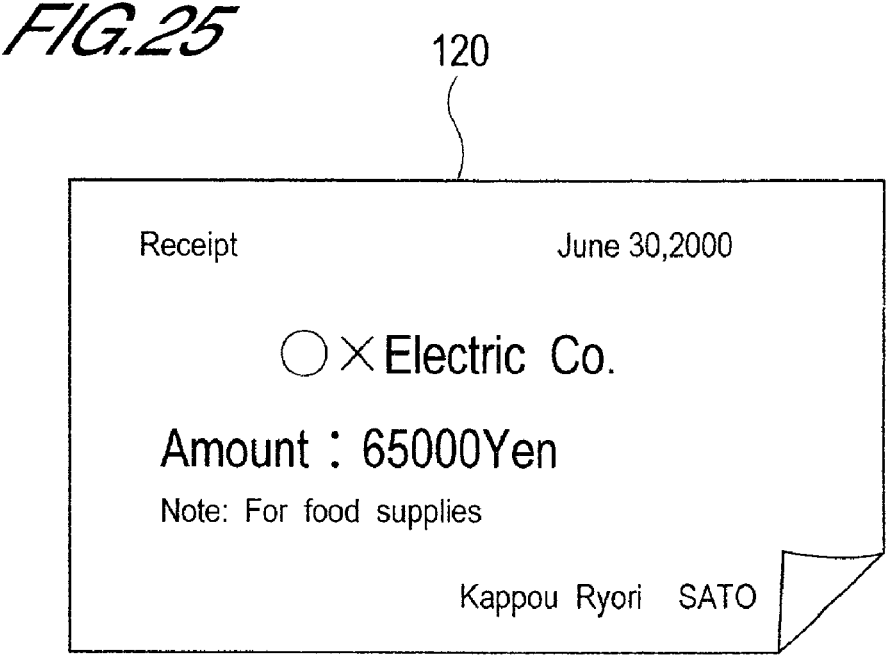
FIG. 25 is a diagram showing one example of disclosure information, in other words, a document (original document) that is to be disclosed, for explaining an image display system for a document management system according to the present invention and to the prior art.
FIG. 26 is a diagram illustrating one example of conventional index data.
Figure 27:
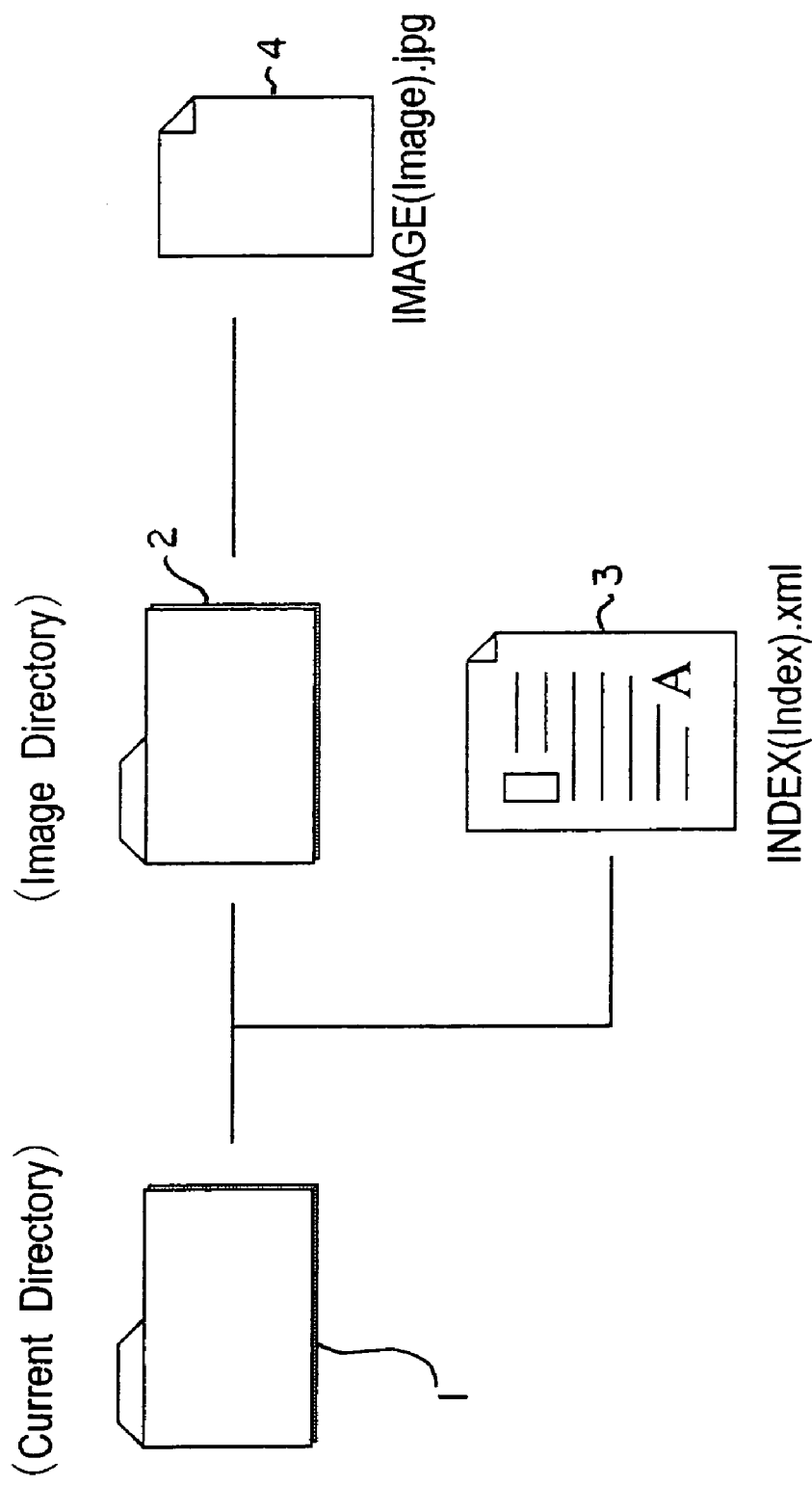
FIG. 27 is a diagram illustrating one example of a file composition representing the index data shown in FIG. 26.
Figure 28:
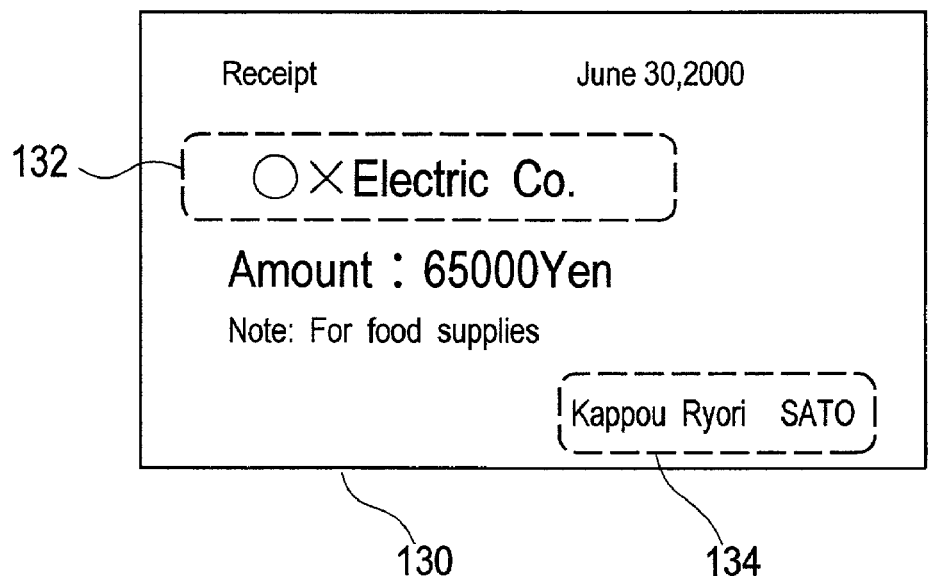
FIG. 28 is a diagram showing a state where image data is displayed on the screen display section of a reading terminal, non-disclosed regions being set within the image data region, with respect to the original document shown in FIG. 25.

Disclosure information similar to that illustrated in FIG. 25 is prepared as a document 120 that it is intended to disclose. The registering party operates the first registration terminal 220 (FIG. 31) and the image reader to perform a two-dimensional scan, thereby obtaining image data for the document. In this case, of the information contents in all of the items printed on the document, the registering party inputs the item names, date and the name of the party providing the document, as index keywords, via the first input section 222. Moreover, the two-dimensional co-ordinate values of the respective information items in the document 120 are also read in by the image reader. The image data, index keywords and two-dimensional co-ordinate values are stored in the first memory 226. Moreover, the image data is input to the region analysing section 234 of the prospective non-disclosed region setting device 232, and furthermore, the image data is displayed as an image on the first screen display section 240.

Thereupon, when the registering party inputs a region analysis command from the first input section 222, in response, the region analysing section 234 detects the region information for all the items, in other words, the region information relating to position and size for regions which have been set as prospective non-disclosed regions, as index data. When this index data is detected, in response, the setting display, such as frame lines, or the like, is read out from the first memory 226 and is synthesized with the image data. Consequently, as shown in FIG. 32, the regions 244, 246, 248, 250, 252, 254 are displayed on the first screen display section 226, surrounded by frame lines within the image data region. At this stage, all of the regions surrounded by the frame lines are prospective non-disclosed regions.

From all of the prospective non-disclosed regions in the image data region, amendments are made in order to select regions which are not ultimately to be disclosed. This information is determined by means of the first region deciding section 236. Here, region information corresponding to regions which may be disclosed is deleted by means of designation commands made via the first input section 222, thereby removing the non-disclosure designation from the regions which may be disclosed without obstacle. Moreover, if necessary, it is also possible to amend the position and size of the set regions.

As a result of these amendments, the image on the first screen display section 240 changes, and image data containing the set regions 262 and 264 is displayed as illustrated in FIG. 33.

In response to the designation of the set regions 262 and 264, the index creating section 238 creates index data having region numbers corresponding to the set regions, and these region numbers and index data for the previously detected position and size are combined and stored in the first memory 226 as setting data relating to the regions. The index data can be found by using the two-dimensional co-ordinates previously stored in the first memory. Moreover, index data relating to the image data is also created and stored together with the index data relating to the regions. This index data is illustrated in FIG. 34. In this example, the co-ordinate values for the first region are "x = '10'" and "y = '30'", the region width is "width = '150'" and the height is "hight = '15'". The co-ordinate values for the second region are "x = '100'" and "y = '100'", the region width is "width = '80'" and the region height is "hight = '15'".

The data pair consisting of the image data and setting data is registered in the server 204 in accordance with a registration output command input by the registering party by means of the first input section 222.

In the first reading terminal device 280, the party disclosing the information operates the first reading terminal 280 in accordance with an application from an applicant seeking disclosure of the information. A command for accessing the server 204 is input from the second input section 282. Thereupon, a read-out command is output from the second input section to the server 204, the image data that the applicant wishes to disclose, and the associated setting data, are read out, and this data is stored in the second memory 286 by means of the CPU 284.

In response to reading of the image data and setting data, the region deciding (or setting) section 292 operates and reads out reading authorization setting data from the second memory 286, displaying same on the second screen display section 290. In this example, the reading authorization setting data contains a first selection information set value: "Display all (A)" 13c, and a second selection information set value: "Limit display (L)" 13d. FIG. 36 shows the reading authorization setting image 13a displayed on the screen.

Observing this reading authorization setting image 13a, the disclosing party selects "Display all (A)" 13c, by inputting a confirmation command to the region deciding (or setting) section 292 by means of the second input section 282. In response to this selection, the image data and setting data are synthesized, in accordance with the relationship between the index data 272 and 274, and the image data is displayed on the second screen display section 290. The image data display here is image data wherein the set regions 262 and 264 are identified to be prospective non-disclosed regions. In the current example, the designation of these set regions is displayed by surrounding the regions by means of frame lines.

The disclosing party confirms whether the set regions 262 and 264 displayed in this manner should be disclosed regions or non-disclosed regions.

Upon confirming that the information contents of the set regions 262 and 264 are contents that are not to be disclosed to the applicant, the disclosing party inputs a readable/non-readable command to the disclosure data creating section 294, by means of the second input section 282. In response to this command, the disclosure data creating section 294 again displays the reading authorization setting image 13a on the second screen display section 290.

Observing this display, the disclosing party selects the set value: "Limit display (L)" 13d which is the second selection information. In response to this selection, the disclosure data creating section 294 reads out data that is to be made unreadable from the second memory 286 and synthesizes this data with the index data of the set regions, thereby converting the set regions 262 and 264 to blacked-out regions, for example. The image data wherein the set regions have been made unreadable by blacking out assumes a similar state to the image data illustrated in FIG. 29. The regions which remain as disclosed regions are in a readable state. The readable and non-readable data constitutes disclosure data, and this disclosure data is stored in the second memory 286.

When a command indicating output of disclosure data is input to the disclosure data creating section 294 by the disclosing party via the second input section 282, in response, the disclosure data creating section 294 reads out the disclosure data from the second memory 286 and transmits this data to the second output section 290, where it is printed by a printer, thereby creating a printed disclosure document. This printed document is printed in such a manner that the non-disclosed regions are blacked out, in accordance with the displayed image illustrated in FIG. 29.

In this way, according to the first document management system, it is possible to avoid the operation of setting disclosed regions and non-disclosed regions within the image data region at the reading terminal, and hence the efficiency of the information disclosing operation can be improved in comparison to the prior art.

Furthermore, according to the first document management system, at the reading terminal side, it is possible simply to confirm regions that have been provided as candidates for non-disclosure, without having to designate non-disclosed regions from the start, and therefore errors in designating non-disclosed regions during operation are eliminated, and hence disclosure documents having a higher reliability than the prior art can be provided.

Seventh Embodiment

In the second document management system relating to the present image display system, a method is adopted whereby the image data is structured, the structured image data being divided up when registered in the server, and in the reading operation, the divided image data elements are displayed individually, thereby facilitating the designation of actual non-disclosed regions which are not to be disclosed.

The second document management system (which, hereinafter, may simply be called "second system",) 200 comprises, as constituent elements, in addition to a server 204 and network 208, a second image registration terminal 320 (FIG. 37) (corresponding to 202 in FIG. 30), and a second reading terminal device 280 (FIG. 35) (corresponding to 206 in FIG. 30). Of the constituent elements of this second document management system, similar labels are applied to constituent elements which are similar to elements of the first document management system, and repeated description thereof is omitted here, except where such description is necessary.

Composition of Second Registration Terminal Device

Figure 37:
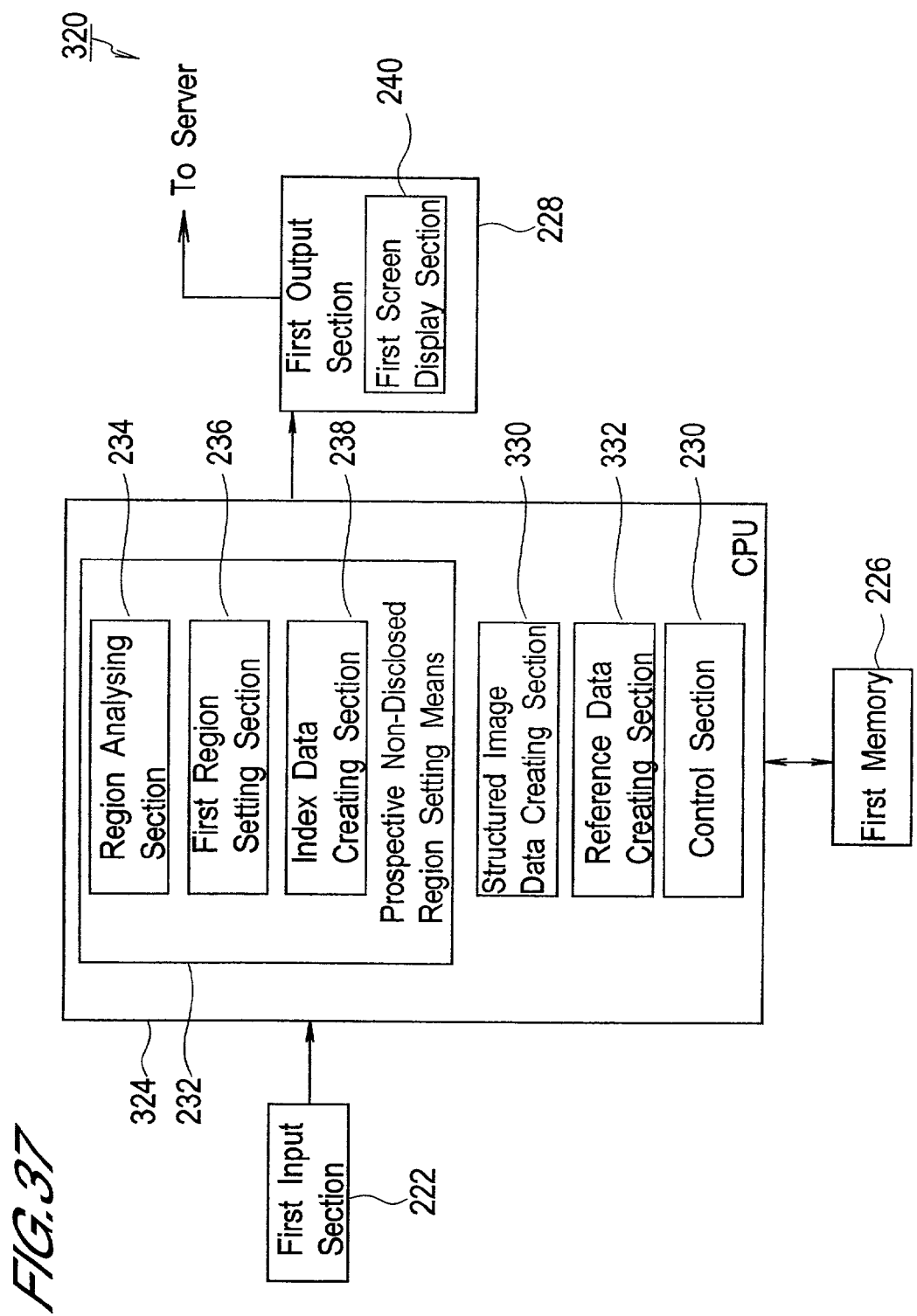
FIG. 37 is a functional block diagram for explaining a second and fourth image registration terminal device according to the present invention.

FIG. 37 is a functional block diagram providing a description of the second registration terminal device 320.

This second registration terminal 320 comprises a first input section 222, CPU 324, a first memory 226 and a first output section 228 (provided with a first screen display section 240). The CPU 324 comprises prospective non-disclosed region setting device 232 which comprises a region analysing section 234, a first region deciding (or setting) section 236, and an index data creating section 238, and a control section 230. In addition, the CPU 324 comprises a structured image data creating section 330 and a reference data creating section 332. A point of difference with respect to the first registration terminal is that additional functional device (structured image data creating section 330 and reference data creating section 332) are provided as functional device using the CPU 324. Therefore, except where necessary, no further description is given with regard to parts having the same function as the first input section 222, first memory 226, first output section 228, first screen display section 240, prospective non-disclosed region setting device 232 (region analysing section 234, first region deciding (or setting) section 236 and index data creating section 238), and the control section 230.

The structured image data creating section 330 converts amended image data (see FIG. 33) created by the prospective non-disclosed region setting device 232 into structured image data, and stores this structured data in the first memory 226. The setting data created by the index data creating section 238, and reference data described hereinafter, are both used also in this conversion operation.

The reference data creating section 332 may be constituted such that it is incorporated in the index data creating section 238, but in this example, it is constituted as a separate element. In either case, the function of the reference data creating section 332 is not changed. The reference data creating section 332 creates reference data which individually identifies the image data sections for set regions 262 and 264 designated as prospective non-disclosed regions within the amended image data (see FIG. 33). Therefore, the reference data is data which references the set regions within the structured image data. As illustrated by FIG. 34, index data relating to the image data and to set region 262 is previously created, as indicated respectively by numerals 274 and 272 in the diagram, and therefore the reference data creating section 332 creates index data referencing the image data sections of the respective set regions, in other words, it creates reference attributes (ref attributes), in a format which is appended to the index data relating to the set regions 262 and 264. This reference data is created on the basis of a structuring command input by the registering party to the reference data creating section 232, by means of the first input section 222. This reference data creating operation can be performed readily by referring to the correlations between the previously created index data 274 for the image data and the index data 272 relating to the regions. The reference data is stored in the first memory 226, along with the structured image data.

FIG. 38 is a diagram illustrating a compositional example of index data for structuring which is created in the foregoing manner. In FIG. 38, numeral 334 denotes the whole structure of the structured index data. Furthermore, the ref attribute index data is indicated by reference numeral 336. Here, the ref attribute relating to the first region 262 is 'ref = "Image/region 1 jpg"' and the ref attribute relating to the second region 264 is 'ref = "Image/region 2 jpg"'.

Upon input of the amended image data illustrated in FIG. 33 and the structured index data illustrated in FIG. 38, the aforementioned structured image data creating section 330 performs synthesis of these two data elements, thereby structuring the amended image data. In this structuring synthesis process, the regional portions of image data corresponding to set regions 262 and 264 are extracted to separate files from the amended image data, by means of the data in the ref attribute index data 336, and furthermore, the regions created by extracting these set regions are converted to non-readable data, for example, blacked-out data. Moreover, instead of converting these regions to blacked-out data, it is also possible to convert them to blank data or to delete the corresponding data.

Figure 39:
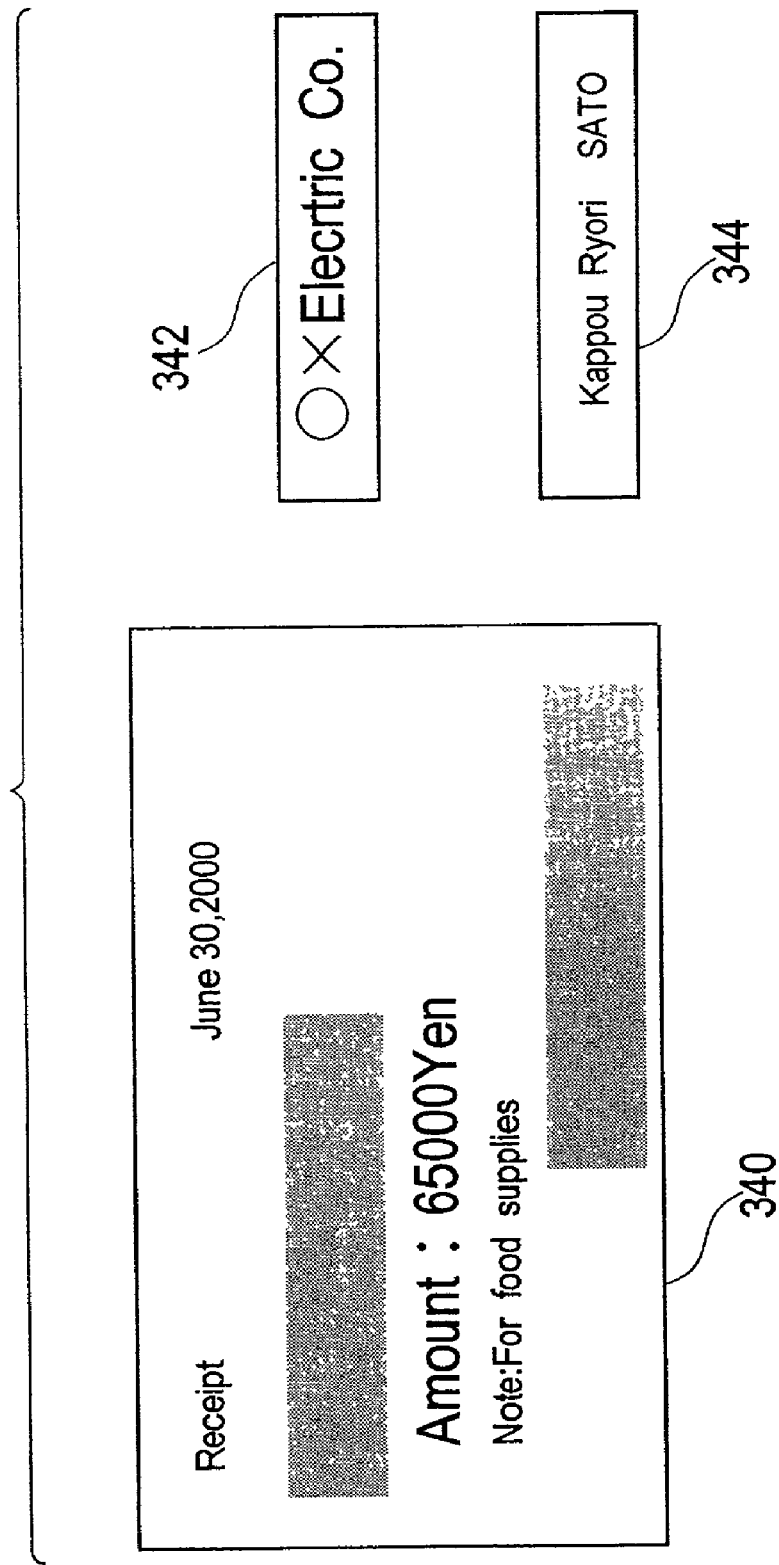
FIG. 39 is a diagram illustrating a display example of structured image data, for explaining an image registration terminal device according to the present invention.

FIG. 39 shows a display example of image data which has been structured in this manner. In FIG. 39, reference numeral 340 denotes image data where, of the structured image data, the portions corresponding to the set regions 262 and 264 in FIG. 33 have been blacked out.

Moreover, of the structured image data, the image data corresponding to the first set region 262 is indicated by reference numeral 342 and the image data corresponding to the second set region 264 is indicated by reference numeral 344, these image data elements 342, 344 being stored in a separate file from the image data 340.

Figure 40:
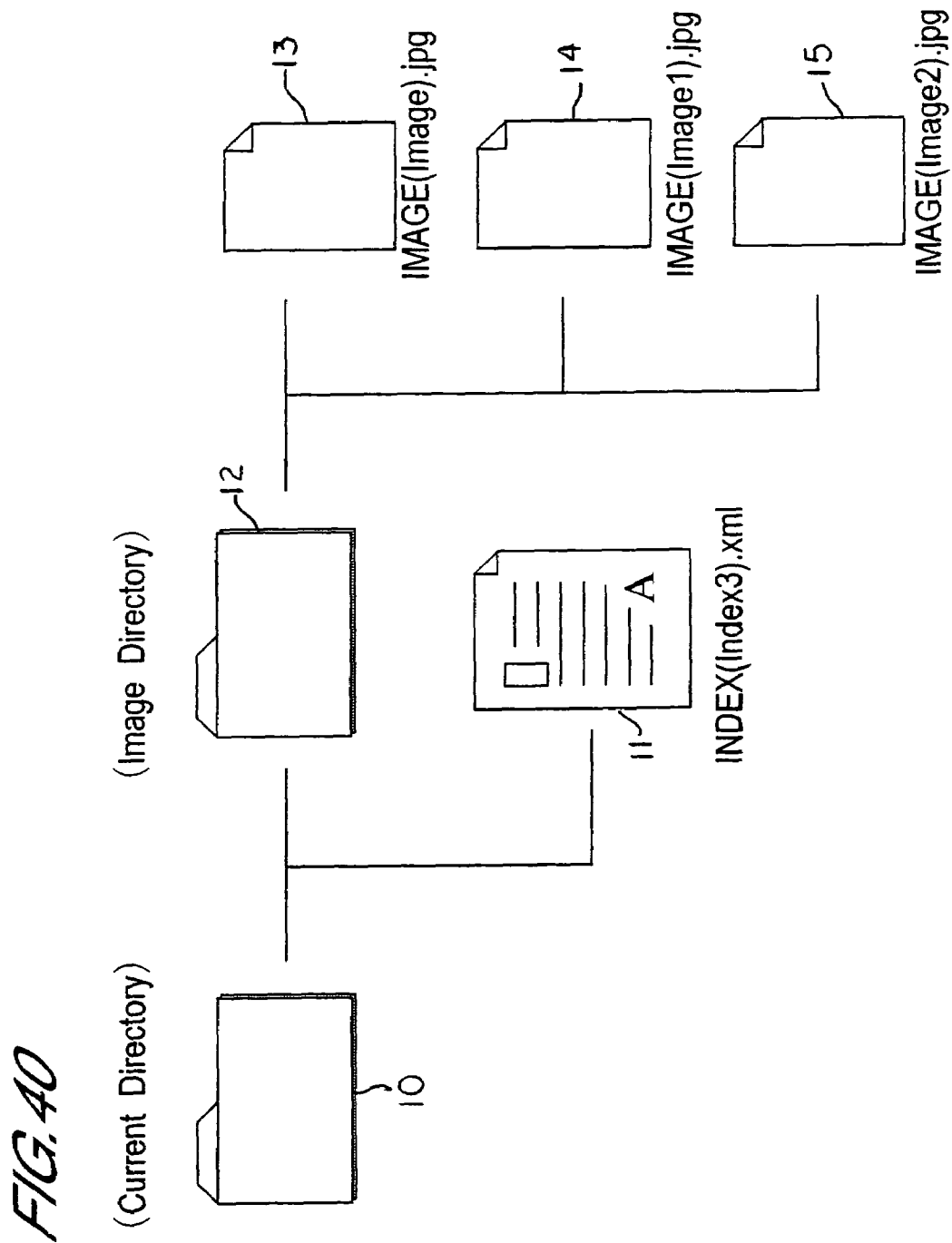
FIG. 40 shows diagrams respectively illustrating a directory structure and file structure corresponding to structured image data, for explaining an image registration terminal device according to the present invention.

Furthermore, FIG. 40 respectively illustrates a directory structure and file structure corresponding to the structured image data. In FIG. 40, the file corresponding to FIG. 33 is depicted in the current directory 10, and at the first layer of the structured image data, the index data (Index3.xml) 11 corresponding to reference numeral 334, and the image data direction (Image directory) 12 corresponding to same are displayed, as in FIG. 15, whilst the second layer contains the respective image data stored in the Image directory, in other words, all of the image data "Image.jpg" 13, the image data "Image1.jpg" 14 corresponding to the first region 262, and the image data "Image2.jpg" 15 corresponding to the second region 264.

In response to registration commands input to the server by the registering party by means of the first input section 222, the second registration terminal device reads out from the first memory 226 the structured image data, setting data identifying the set regions in the structured image data, and the reference data referencing the image data portions corresponding to these set regions, and outputs their data by the first output section 240, via the network 208, to the server 204, where these respective data elements are stored. Accordingly, since structuring of the image data has been achieved, the disclosed information and non-disclosed information are stored separately in the server.

Composition of the Second Reading Terminal Device

The composition of this second reading terminal device is similar to that of the first reading terminal device illustrated in FIG. 35, and therefore further explanation of common composition, functions and actions described with reference to FIG. 35 is omitted here, except in cases where such explanation is necessary. The second reading terminal device 280 comprises a second input section 282, a CPU 284, a second memory 286, and a second output section 288. Furthermore, a region deciding (or setting) section 292, disclosure data creating section 294 and control section 296 are provided as respective functional device relating to the CPU 284. Furthermore, a second screen display section 290 is provided in the second output section 288. In particular, the data supplied respectively to the functional device of the region deciding (or setting) section 292 and disclosure data creating section 294 differ from the case of the first reading terminal device, and hence the processing carried out in these respective sections also differs from the case of the first reading terminal device.

The second input section 282 reads out prescribed data previously registered in the server 204, via the network 208. In this case, it is supposed that this data is the index data, in other words, structured image data 274 corresponding to the image display regions 340, 342 and 344 shown in FIG. 39, and setting data 272 and reference data 336 identifying the prospective non-disclosed regions, as described with reference to FIG. 38. These data elements are stored in the second memory 286 and are also supplied to the region deciding (or setting) section 292.

The second memory 286 previously stores first selection information indicating the display of set regions, in a readable fashion. This first selection information is contained in the reading authorization setting data, as described with reference to FIG. 36.

The disclosing party operates the second input section 282 to supply a confirmation command to the control section 296, and according to the control performed by the control section 296, the first selection information is read out from the second memory 286 and the reading authorization setting image 13a is displayed on the second screen display section 290.

Viewing this first selection information 13a displayed on the screen, display screen 13a, the disclosing party inputs selection commands by means of the second input section 282, to select the set value: "Display all" 13c. In response to the selection command, the region deciding section 292 creates image data by synthesizing the respective data elements.

Now if the set value: "Display all" 13c is selected, then the region deciding (or setting) section 292 reads out the structured image data, setting data and reference data from the second memory 286, and synthesizes the image data for the region identified by the <Region> tag in the index data 272 within the index data 334, with the image data identified by the <Image> tag in the index data 274. Thereupon, in response to this synthesis operation, settings display data is read out from the second memory 286, and a settings display is performed to indicate the set regions within the synthesized image data regions. The image data to which a settings display is applied in this manner is shown on the second screen display section 290, and this display is similar to that shown in FIG. 33. In other words, the image data display regions "OX Electric Co." and "Kappou Ryori SATO" are displayed surrounded by a frame, for instance. The image data having set regions for which a settings display is implemented in this manner is stored in the second memory 286.

In the case of this second reading terminal device, similarly to the first reading terminal device, the disclosing party confirms the contents of the indicated set regions of image data, and judges whether or not these contents should be disclosed to the applicant. If the disclosing party judges that non-disclosure is appropriate, then the set regions become non-disclosure decided regions.

The disclosing party again issues a command to the control section 296 by means of the second input section 282, whereby the reading authorization setting data is read out from the second memory 286 and transmitted to the region deciding (or setting) section 292, whilst the reading authorization setting image 13a is also displayed on the second screen display section 290 (see FIG. 36). Moreover, if the disclosing party inputs a command via the second input section 282 which selects the second selection information, namely, set value: "Limit display" 13d, then the region deciding (or setting) section 292 reads out index data 334 from the second memory 286 in response to this selection. Thereupon, in the image data synthesis operation, the image data portions for the regions identified by the <Region> tag in the index data 334 are not included in data synthesis. Instead, the non-readable information is read out from the second memory 286 and the corresponding regions are converted to a non-readable display, by blacking out, for example. Consequently, a display corresponding to the display illustrated in FIG. 29 or the display illustrated by 340 in FIG. 39 is obtained on the screen of the second screen display section 290. In the present example, the non-disclosure decided regions are displayed as blacked-out regions, but they may also be displayed as blank regions.

Similarly to the case of the first reading terminal device, the disclosing party confirms the resulting display, and then inputs readable/non-readable commands to the disclosure data creating section 294, by means of the second input section 282. In response to this input, the disclosure data creating section 294 converts the data in the non-disclosure decided regions to non-readable data, and it converts the data in the disclosed regions to readable data. The disclosure data obtained in this manner is stored in the second memory 286.

Thereupon, similarly to the case of the first reading terminal device, the disclosing party inputs an output command, via the second input section 282, and the disclosure data is read out from the second memory 286 and transmitted to the second output section 288, where it is converted to a disclosed document by means of a printer, or the like.

In the case of this second reading terminal device, similarly to the case of the first reading terminal device, if the disclosing party judges that the set regions are incorrect, then he or she can remove the designation of a set region, thereby changing the disclosed regions, by selecting and deleting a region number within the <Region> tag name in the index data.

Description of the Operation of the Second Document Management System

At the second registration terminal device 320, a document that is to be disclosed is provided to the registering party and is converted to image data by the image reader in the first input section 222, this image data being stored in the first memory 226 and also being sent to the prospective non-disclosed region creating (or setting) device 232. The subsequent processing is carried out in a similar manner to the first registration terminal device, thereby creating setting data, in other words, index data 274 associated with the image data, and index data 272 associated with the set regions. Moreover, amended image data as illustrated in FIG. 33 is created and displayed on the first screen display section 240.

Furthermore, in the second document management system, the disclosing party further supplies a structuring command, by means of the first input section 222, to the reference data creating section 332 and structured image data creating section 330. In response to this command, index data corresponding to FIG. 33, and index data 274 and 272 are transmitted to the reference data creating section 332, where structuring index data (denoted by 334 in FIG. 38) is created. Thereupon, index data, in other words, 'ref attributes', for referencing the portions of image data relating to the set regions 262 and 264 designated as non-disclosed regions of the image data corresponding to FIG. 33 are created. This index data: 'ref attribute' identifies structured image data in a layered file structure as illustrated in FIG. 39. More specifically, when data is registered in the first memory 226 or registered in the server 204, of the whole image data region creating the display image in FIG. 33, the image data area from which image data portions identified as displaying set regions 262 and 264 have been extracted is stored separately from the individual extracted image data portions, in accordance with the 'ref attributes'. This 'ref attribute' is appended to the end of the index data 272 and hence forms a part of the index data relating to the regions.

The structured image data creating section 330 receives the amended image data and structured index data and performs structuring of the amended image data, thereby creating image data whereby the regions corresponding to the set regions 262 and 264 shown in FIG. 33 are blacked out, for example, whilst at the same time image data corresponding to extracted set regions 262 and 264 are created respectively and individually. FIG. 39 shows a display example of the structured image data, wherein reference numeral 340 denotes an image data display having blacked-out sections, and reference numerals 342 and 344 denote display examples of the portions removed from these blacked-out sections, respectively.

The structured image data and structured index data are stored in the first memory 226.

When sent from the first input section 222 to the control section 230 by the disclosing party, under the control of the control section 230, the structured image data and structured index data are read out from the first memory 226 and transmitted from the first output section 228, via the network 208, to the server 204.

The server 204 stores the structured image data and the structured index data. The index data is divided up when stored in the server.

In the second reading terminal device 280, the reading authorization setting data is previously stored in the second memory 286 as the first and second selection information. In this case, the first selection information is data indicating "Display all (A)" for the structured image data. The second selection information is data indicating "Limit display (L)" of the data sections corresponding to the set regions, in the structured image data. Besides these data elements, control data, such as "Set" and "Cancel" are also included.

When an applicant makes an application for disclosure of the document, the disclosing party operates the second reading terminal 280 to access the server 204 from the second input section 282, and reading authorization setting data and the structured image data and structured index data corresponding to the application are read out from the server.

This reading authorization setting data is sent to the second screen display section 290, where the data is displayed on the screen. The display on the screen is the displayed image 13a corresponding to FIG. 36.

Therefore, the disclosing party, observing this displayed image 13a, selects the set value "Display all (A)" 13c by means of the second input section 282, and then inputs a confirmation command indicating "Set" 13e, in response to which the second screen display section 290 changes the displayed image. The newly displayed image is an image corresponding to the displayed image of amended image data illustrated in FIG. 33, in other words, an image 260 wherein the set regions are marked with frame lines.

If the disclosing party, observing this displayed image 260, judges that the contents thereof are not suitable for disclosure, then he or she outputs a command from the second input section 282 calling up the reading authorization setting data again, thereby causing the reading authorization setting image 13a (image corresponding to FIG. 36) to be displayed again on the second screen display section 290.

Viewing this display, if the disclosing party inputs a command via the second input section 282 to select "Limit display (L)" Set 13d, and then specifies "Set" 13e, then the structured image data, structured index data and the data to be blacked out are read out from the second memory 286 and synthesized, and a display corresponding to that in FIG. 29, wherein the set regions are blacked out, is shown on the second screen display section 290.

The subsequent operations are carried out in a similar manner to the case of the first document management system. In other words, if the disclosing party inputs a readable/non-readable command via the second input section 282, then in response, the disclosure data creating section 294 converts the disclosed regions to readable data and converts the non-disclosed regions (here, blacked-out regions) to non-readable data, and outputs this data as disclosure data. This disclosure data is sent to the second output section 288, where the characters, symbols and numerals, and the like, are converted to a recognizable state to form a disclosure document.

According to this second document management system, the following merits are achieved in addition to the merits of the first document management system described above.

Specifically, when structured image data, setting data and reference data are read out from the server and synthesized at the second reading terminal device, it is possible to display the non-disclosed regions as identified image data on the display screen, and therefore the setting of non-disclosed regions is simple and rapid to perform. Consequently, the processing time required from the application until the final disclosure document is supplied can be shortened (in other words, processing is speeded up).

Moreover, since structuring of the image data is achieved, the non-disclosed information is divided when stored in the server, and therefore, even if illegal external access is made, leaking of information can be avoided as far as possible.

Eighth Embodiment

In the third document management system relating to the image display system, for the respective item names written on an original document, a reading authorization level indicating the range of items to which reading (disclosure) is applicable, and the item names to which reading is applicable are previously registered in the server as reading authorization level correspondence data and item name correspondence data relating to the reading authorization level. In the reading operation, by specifying the reading authorization level, only the image data for the items corresponding to this level are displayed in a readable state, in an independent fashion, whilst the actual non-disclosed regions which are not be disclosed are displayed in a non-readable state, thereby facilitating designation of non-disclosed regions.

Figure 41:
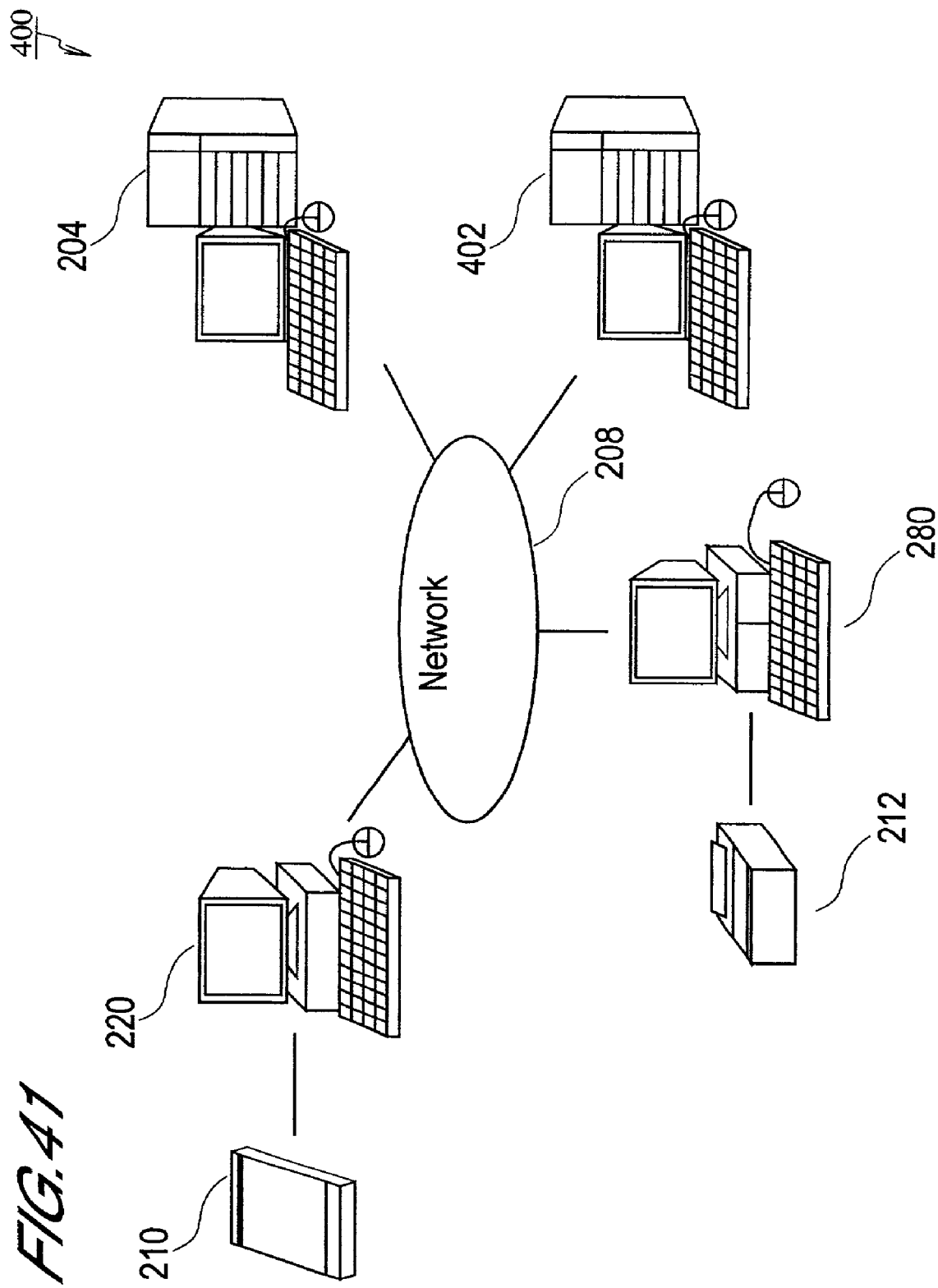
FIG. 41 is a diagram illustrating a composition example of an image display system for a third and fourth document management system according to the present invention.

FIG. 41 is a diagram illustrating a compositional example of the third document management system. The third document management system 400 has a similar composition to that illustrated in FIG. 30, with the exception that it comprises a document storage server 204, and a reading authorization management sever 402. It may also be constituted in such a manner that the reading authorization management server 402 is combined with the document storage server 204.

Consequently, this third document management system 400 comprises, in addition to server 204, 402 and network 208, a third registration terminal device and a third reading terminal device of the same composition as the first image registration terminal and the first reading terminal device. Of the constituent elements of this third document management system, those elements which are the same as elements of the first document management system are labelled with the same numerals, and repeated description thereof is omitted here, except where such description is necessary.

Description of Reading Authorization Management Server

Firstly, a simple description of the reading authorization management server 402 will be given. This server 402 previously stores data required for implementing prescribed processing in the third registration terminal device 220 and the third reading terminal device 280. This data comprises reading authorization level correspondence data, item name correspondence data whereby a reading authorization level can be specified on a one-to-one basis with the reading authorization level, and item name list data. Moreover, depending on the circumstances, it may also comprise reading authorization setting data used when specifying the reading authorization level. The item name list data is stored previously in the corresponding server. Furthermore, the data pair comprising the reading authorization level correspondence data and the item name correspondence data may also be structured data.

Normally, the information contents written in the disclosure information can be divided respectively into information items. Moreover, in the case of a document which it is intended to disclose, it is possible to identify the number of items and document type, and knowing this information beforehand, it is possible to prepare, in advance, data specifying the number of items and types which may be disclosed, for a plurality of items and document types. These items are grouped into a number of items which are applicable for disclosure, and are placed in order from groups having a higher number of items to groups having a smaller number of items. This order is taken as the reading authorization level.

For example, in the case of the disclosure document illustrated in FIG. 25, the number of items is six, namely "Title", "Date", "Addressee", "Amount", "Proviso", and "Issuing party". The list collating these items is an item name list, which is stored, readably, as item name list data, in the server 402.

One example of a method for determining reading authorization level correspondence data and item name correspondence data is now described. If it is supposed that all six of the aforementioned items are applicable for disclosure, for instance, then all of the six item names are taken as one group, and this group is set as reading authorization level "1". Moreover, if the item names of four items are taken as one group, then that group is set as reading authorization level "2". Moreover, if the item names of two items are taken as one group, then that group is set as reading authorization level "3". The data specifying the reading authorization levels "1", "2", "3" in this way is reading authorization level correspondence data. Furthermore, the data specifying the respective item names contained in the group of each reading authorization level is item name correspondence data.

Three groups 25 of item names are shown in FIG. 42. FIG. 42 is a diagram showing a data pair comprising reading authorization level correspondence data and item name correspondence data. In the diagram, the reading authorization level "1", reading authorization level "2" and reading authorization level "3" are shown respectively as "Group Level = '1'", "Group Level = '2'" and "Group Level = '3'". In this way, the reading authorization level specifies the number of items and the item names for which disclosure is applicable.

The data for specifying the reading authorization level is the reading authorization setting data. The data elements "View = 'Display all' ", "View = 'Display part'" and "View = 'Minimize display'" shown after the respective levels illustrated in FIG. 42 are reading authorization setting data elements, which are respectively determined in a one-to-one correspondence with the reading authorization levels.

Figure 43:
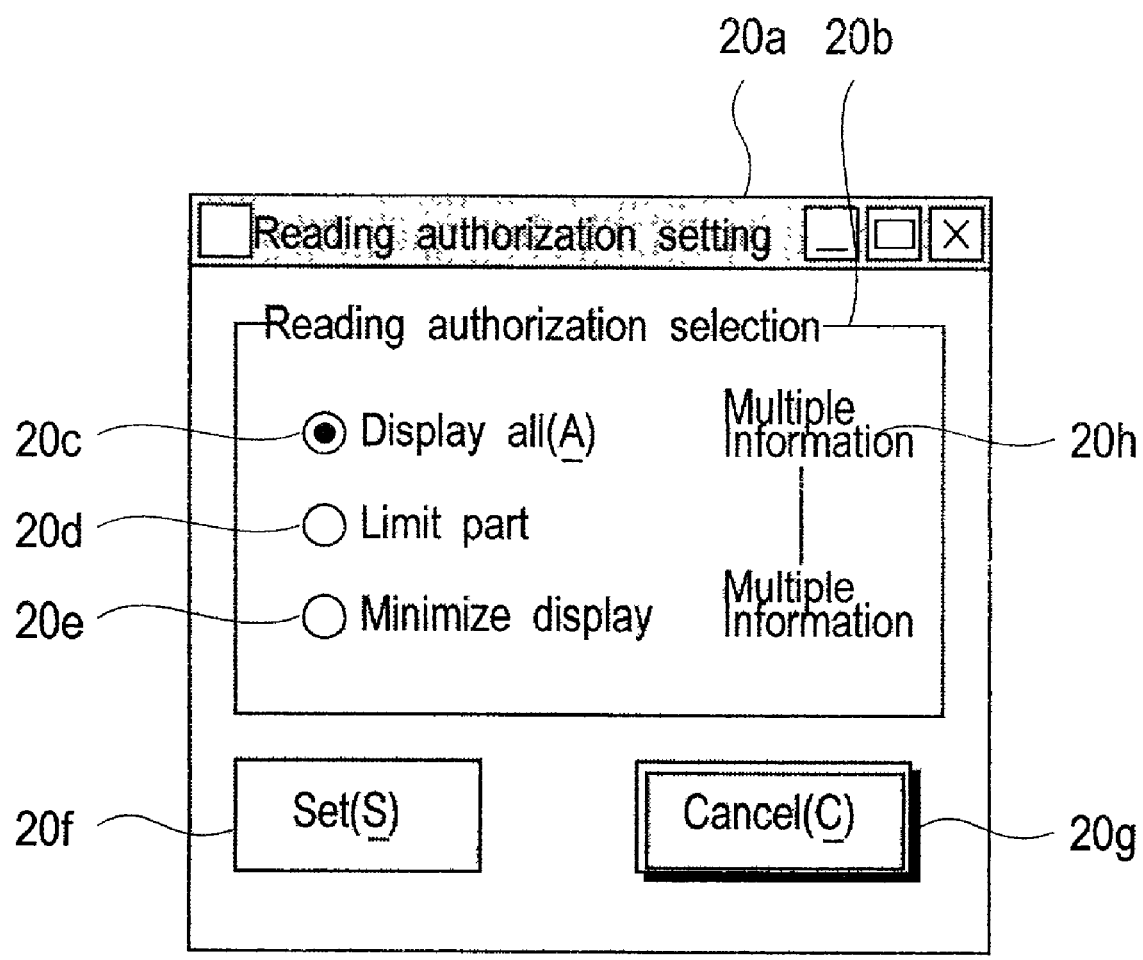
FIG. 43 is a diagram illustrating a state where the contents of the reading authorization setting data are displayed on a screen, for explaining the present invention.

FIG. 43 illustrates a state where the contents of the reading authorization setting data are displayed on a screen, in other words, a reading authorization setting screen. This screen also contains a "Set" data display for setting a selection, and a "Cancel" data display for cancelling settings.

Description of the Composition and Operation of the Third Registration Terminal Device The third image registration terminal device comprising the third document management system (hereinafter, may also be called simply "the third system") has the same composition as the first registration terminal device, and therefore it is described with reference to FIG. 31.

The third registration terminal device 220 comprises a first input section 222, CPU 224, first memory 226 and first output section 228 (which is provided with a first screen display section 240). The CPU 224 comprises a prospective non-disclosed region setting device 232 and control section 230, and the prospective non-disclosed region setting device 232 comprises a region analysing section 234, first region deciding (or setting) section 236 and index data creating section 238. The point of difference with respect to the first registration terminal device is that the functions provided by the functional device using the CPU 224 are partially different. Consequently, except where necessary, here, no further description is given with respect to the portions having the same functions as the first input section 222, first memory 226, first output section 228, first screen display section 240, prospective non-disclosed region setting device 232 (region analysing section 234, first region deciding (or setting) section 236, index data creating section 238), and the control section 230.

Similarly to the case of the first registration terminal device, the third registration terminal device 220 inputs image data for an original document via the first input section 222, according to operations performed by the registering party, and this image data is stored in the first memory 226, whilst also being displayed on the first screen display section 240. In this case, similarly to the case of the first registration terminal device, the image data, indexing keywords and two-dimensional co-ordinate values are also stored in the first memory 226.

Thereupon, the registering party inputs a region analysing command for all the regions corresponding to the respective items in the display image of the image data, by means of the first input section 222. In response to this command, the region analysing section 234 of the prospective non-disclosed region setting device 232 detects index data relating to the regions, indicating their respective positions and size, in a similar manner to the first registration terminal device, and stores this index data in the first memory 226. In response to this detection operation, the previously registered setting display data, such as frame lines, or the like, is read out from the first memory 226 and synthesized with the image data. The image data display obtained by this synthesis operation is an image data display which has undergone regional analysis and where the respective regions are displayed surrounded by frame lines, as shown in FIG. 32.

Next, similarly to the case of the first registration terminal device, the registering party amends the prospective (or candidate) non-disclosed regions by inputting setting commands from the first input section 222 to the first region deciding (or setting) section 236, whilst viewing the displayed image data screen 242 which has undergone region analysis. In this case, the set regions of the prospective non-disclosed regions 244, 252 and 254 on the screen in FIG. 32 are amended.

Figure 44:
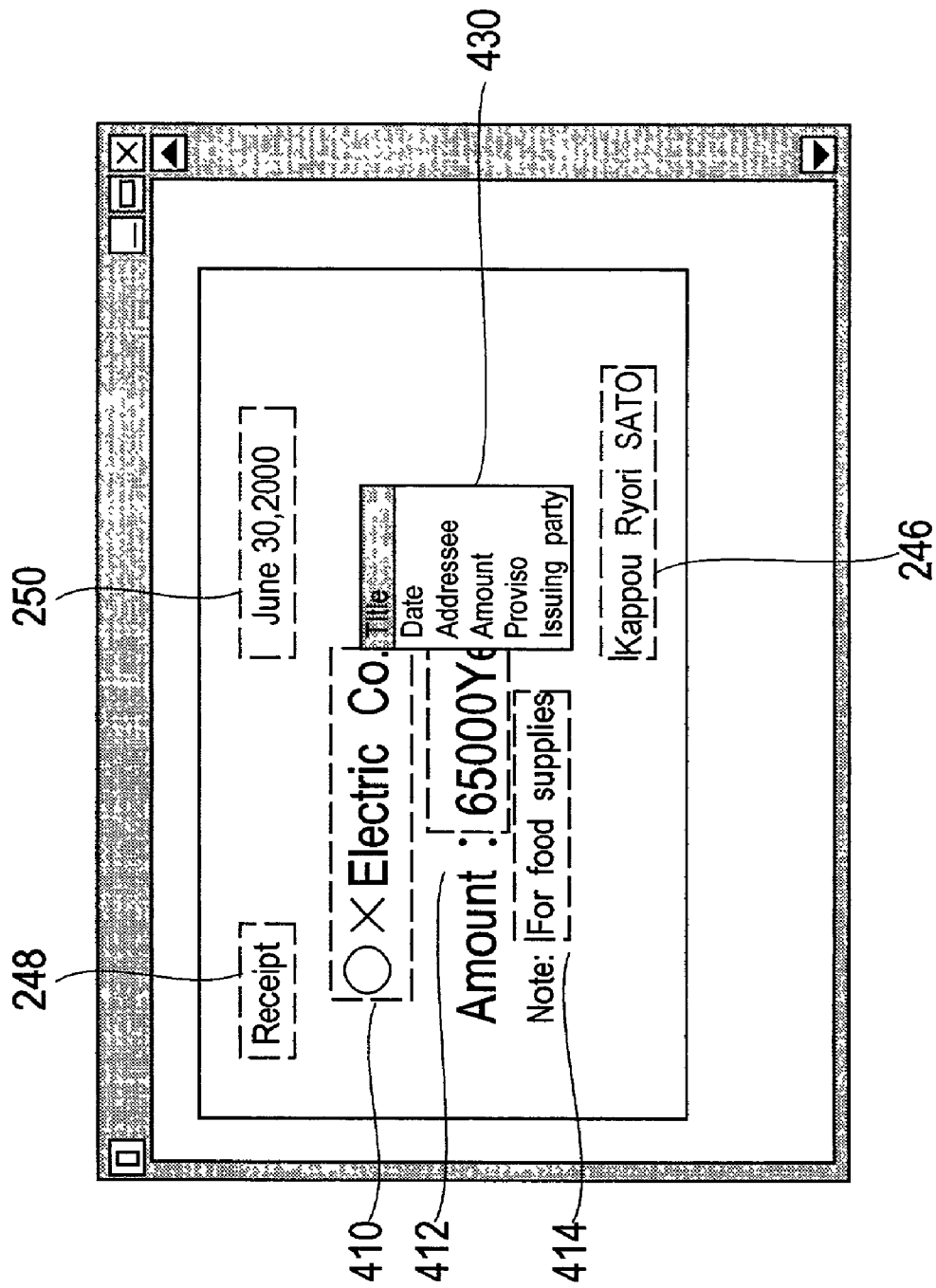
FIG. 44 is a diagram illustrating an example of a display screen of amended index data, for explaining an image registration terminal device according to the present invention.

FIG. 44 shows an amended set region image data display, which is shown on the first screen display section 240. As illustrated in FIG. 44, the amended set regions corresponding to the prospective non-disclosed regions 244, 252 and 254 are denoted by numerals 410, 412 and 414. In the present example, the set regions 246, 248, 250 are not amended and the set regions in FIG. 32 are left unchanged.

Next, the registering party inputs a command for creating index data corresponding to all of the item regions, via the first input section 222. In response to this command, the server 402 is accessed from the first input section 222. The data stored in the server 402 is read out therefrom. In the present example, this data comprises reading authorization level correspondence data, item name correspondence data and reading authorization setting data. This data is stored in the first memory 226 and is also supplied to an index data creating section 238.

The index data creating section 238 creates index data (also called item name index data), for each of the framed regions, 246, 248, 250, 410, 412, 414, which relates to the region number and an attribute specifying the items in each region (here, this attribute is called the 'name attribute').

In this case, there exist six regions which are set as prospective non-disclosed regions, and similarly to the case of the first registration terminal device, for each of these regions, region number index data is set and index data specifying the image data corresponding to the relevant display screen is also set. Moreover, similarly to the case of the first registration terminal device, index data indicating the position and size of each region is determined by means of the two-dimensional co-ordinate values obtained when the original document is scanned in by the image reader of the first input section 222. These various index data elements are synthesized together, as illustrated in FIG. 45.

FIG. 45 is a diagram showing an example of the composition of index data. This diagram depicts index data 420 relating to the image data, along with index data relating to the regions, which is denoted by numeral 422.

In the case of this third registration terminal device 220, it is also necessary to specify index data 424 relating to the name attributes, for identifying the item names.

In the example shown in FIG. 45, the <Region> tags in the index data 422 contain the first to sixth region numbers, positional information and size information. Furthermore, the <Region> tags also contain name attributes, in other words, index data 424 identifying item names, which here comprise, in sequence from "Region no = '1'" to "Region no = '6'", the name attributes: "name = 'Addressee'", "name = 'Issuing party'", "name = 'Title'", "name = 'Date'", "name = 'Amount'", and "name = 'Proviso'".

Next, the method for creating this index data identifying items is described. Specifically, the registering party inputs a command for creating item name list data, by means of the first input section 222. In response to this command, the index data creating section 238 calls up the data pair comprising reading authorization level correspondence data and item name correspondence data from the first memory 226. When data call-up has been completed, data representing a list of potentially settable item names is created from the <List> in "Level = '1'" of the structured data, on the basis of the aforementioned command, and this data is stored in the first memory 226.

Whilst viewing the display screen shown in FIG. 44, the registering party inputs, via the first input section 222, a command for reading out the item name list data, to the index data creating section 238. In response to this command, the index data creating section 238 reads out the item name list data from the first memory 226 and causes this data to be displayed on the first screen display section 240. In FIG. 44, the displayed item name list is denoted by numeral 430.

As respective items on the item name list are designated successively by input of a designation command for each item from the first input section 222, the associated item name correspondence data for all six items is read out successively in response to the designation operation. This data is synthesized with the previously specified index data 422 relating the regions by being appended to the end of the index data 422 as item index data 424. The index data created in this manner is stored in the first memory 226 as setting data.

Thereupon, when the registering party enters an output command from the first input section 222 to the control section 230, in response, the image data and index data (indexing keywords, index data relating to the image, index data relating to the regions, index data relating to the items, and the like) are read out from the first memory 226 and stored via the first output section 228 in the document storage server 204. This index data is setting data wherein prospective non-disclosed regions are specified as set regions within the image area.

Description of the Composition and Operation of the Third Reading Terminal Device The third reading terminal device has a similar composition to the first reading terminal device described in the foregoing, and therefore is explained with reference to FIG. 35. However, the third reading terminal device 280 comprises a second input section 282, a CPU 284, a second memory 286 and a second output section 288 (provided with a second screen display section 290). This CPU 284 comprises a region deciding (or setting) section 242, a disclosure data creating section 294 and a control section 296. The point of difference with respect to the first reading terminal device is that the functions provided by the functional device using the CPU 284 are partially different. Consequently, except where necessary, no further description is given with respect to parts having the same functions in the second input section 282, second memory 286, second output section 288, second screen display section 290 and control section 296.

Similarly to the case of the first reading terminal device, the third reading terminal device 280 outputs a command for accessing the servers 204 and 402, from the second input section 282, in accordance with operations performed by a disclosing party. In response to this command, image data (which has undergone region amendment) and index data (setting data) are read out from the document storage server 204, and the structured data pair (reading authorization level correspondence data and item name correspondence data), item name list data and reading authorization setting data are read out from the reading authorization management server 402.

All of this read out data is stored in a second memory 286 and is also transmitted to the region deciding (or setting) section 292.

In the region deciding (or setting) section 292, similarly to the case of the first reading terminal device, the disclosed regions and non-disclosed regions are designated. For this purpose, in the case of the third reading terminal device 280, the disclosing party issues a command for reading authorization setting data to be displayed, by means of the second input section 282. In response to this display command, the reading authorization setting data is transmitted from the region deciding (or setting) section 292 to the second screen display section 290, where it is displayed as a reading authorization setting image. This reading authorization setting display image 20a is illustrated in FIG. 43.

Next, whilst observing this reading authorization setting image 20a, the disclosing party inputs a reading authorization level selection command (corresponding to the first selection information), via the second input section 282. In this case, for instance, the box "Display all (A)" 20c is selected on the screen, and then "Set" 20f is selected. In response to this reading authorization selection command, the image data, reading authorization level correspondence data and item name correspondence data are synthesized and the displayed image on the screen is switched to display the synthesized image data on the screen. Incidentally, this display image 20a includes a reading authorization selection box 20b. This box 20b contains the selection items "Display all" 20c, "Limit part" 20d, and "Minimize display" 20e. Additionally, the items "Set" 20f, "Cancell" 20g and "Multiple information" 20h are also provided.

In this synthesis process, firstly, in response to "Set" 20f, the item names (<List> tags) identified by the Level attribute "1" in the <Group> tag of the reading authorization level correspondence data and the item name correspondence data illustrated in FIG. 42 are obtained. Furthermore, the image data which is to be displayed is synthesized, on the basis of the name attributes in the <Region> tags of the index data illustrated in FIG. 45, and the image data and <Image> tags for regions where these name attributes match the previously obtained item names.

FIG. 46 is a diagram showing a reading side prospective non-disclosed region image on the screen for image data obtained as a result of the foregoing synthesis process. In this reading side prospective non-disclosed region image 440 on the screen, all of the prospective non-disclosed regions, in other words, all six of the item regions, 'Title', 'Date', 'Addressee', 'Amount', 'Proviso' and 'Issuing party', are displayed as disclosable regions 450, 452, 454, 456, 458 and 460, without being marked by a designation symbol, such as a frame, or the like.

The disclosing party views the reading side prospective non-disclosed region image 440, and judges whether all of the set regions 450, 452, 454, 456, 458 and 460, which are not marked with the designation display (namely, a frame or other designation symbol), are suitable for disclosure to the applicant, or whether it is inappropriate for these regions to be disclosed.

If the disclosing party judges that all of these items are suitable for disclosure, then the prospective non-disclosed region image 440 on the screen is set as a disclosure set region. Similarly to the description relating to the first reading terminal device, the disclosing party inputs a readable/non-readable command to the disclosure data creating section 294, via the second input section 282, and the image data in the disclosure set region is converted to disclosure data and is registered in the second memory 286. Thereupon, as described above with regard to the first reading terminal device, the disclosing party enters an output command via the second input section 282, whereby the disclosure data is transferred from the second memory 286 to the second output section 288, where it is converted into a disclosure document, by a printer, or the like.

On the other hand, if the judgement of the disclosing party is different to the judgement described above, and the disclosing party decides that the regions 454 and 460 corresponding to the addressee item "OX Electric Co." and the issuing party item "Kappou Ryori SATO" should not be disclosed to the applicant, then the following processing is implemented.

Specifically, the disclosing party issues another command for display of the reading authorization setting data, via the second input section 282, thereby causing the reading authorization setting image 20a (see FIG. 43) to be displayed on the second screen display section 290. Thereupon, he or she selects the item 20d "Limit part" corresponding to reading authorization level "2" and then selects "Set" 20f. By making this selection, the item names (<List> tags) identified by the Level attribute "2" in the <Group> tags of the reading authorization level correspondence data and item name correspondence data illustrated in FIG. 42 are retrieved. Moreover, the image data which is to be displayed is synthesized, on the basis of the name attributes in the <Region> tags of the index data illustrated in FIG. 45, and the image data and <Image> tags for regions where these name attributes match the previously obtained item names.

Figure 47:
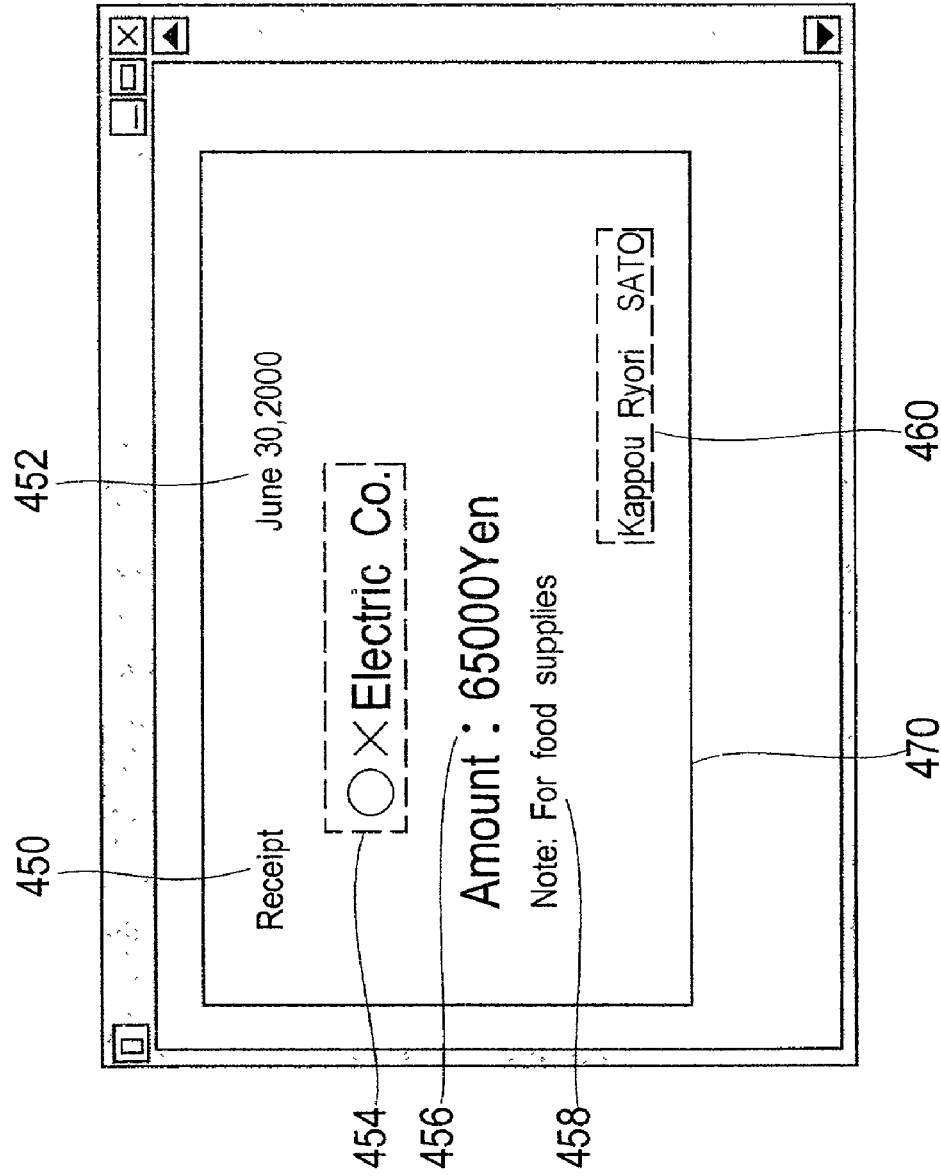
FIG. 47 is a diagram illustrating a partially limited reading side prospective non-disclosed region screen, for explaining a reading terminal according to the present invention.

FIG. 47 is a diagram showing a partially limited reading side prospective non-disclosed region screen 470 for the image data obtained by the foregoing synthesis operation. On this reading side prospective non-disclosed region screen 470, of the six item regions, 'Title', 'Date', 'Addressee', 'Amount', 'Proviso' and 'Issuing party', two regions, namely, the region 454 corresponding to the addressee item and the region 460 corresponding to the issuing party item, are marked with the designation display symbol. Therefore, these two regions are prospective non-disclosed regions. The remaining four regions, 450, 452, 456 and 458, are displayed as regions specified for disclosure, without being marked by the designation display symbol, such as a frame, or the like.

The disclosing party views the partially limited reading side prospective non-disclosed region image 470 on the screen, and again judges whether both of the set regions 454 and 460 marked by the designation display (frame lines or other display symbol) are suitable for disclosure to the applicant, or whether they not suitable for disclosure to the applicant.

If the disclosing party judges that these items are not suitable for disclosure, then the prospective non-disclosed region image 440 is set as the non-disclosure decided region. As described with regard to the first reading terminal device above, the disclosing party inputs a command for converting data to a non-readable state, from the second input section 282 to the disclosure data creating section 294, in the form of second selection information, whereby the disclosure set regions 454 and 460 are blacked out, blanked out, deleted, or the like, in order to convert them to a non-readable state, and furthermore, the image data for these disclosure set regions 454 and 460 is converted to disclosure data and registered in the second memory 286.

FIG. 48 is a diagram showing a final display screen, i.e., an image finally displayed on the screen comprising non-disclosure set regions which have been changed to a non-readable state. In the diagram, the final display screen is denoted by reference numeral 480, and the non-disclosure set regions are denoted by 482 and 484.

Thereupon, similarly to the foregoing description of the first reading terminal device, the disclosing party enters a readable/non-readable command via the second input section 282, and the disclosure data is transferred from the second memory 286 to the second output section 288, where it is converted to a disclosure document by means of a printer, or the like.

According to this third document management system, it is possible to achieve similar beneficial effects to those provided by the first and second document management systems described above.

Moreover, according to this third document management system, reading authorization level correspondence data determining the range of information disclosure and related item name correspondence data are set and previously registered in a server. On the reading terminal side, the reading authorization level correspondence data and item name correspondence data read out from the server are synthesized selectively according to each individual applicant seeking disclosure of information, and hence the non-disclosed information contents can be specified precisely. Consequently, it is possible to provide a disclosure document containing an amount of information which corresponds to the applicant.

Ninth Embodiment

A fourth document management system relating to the present image display system relates to an example where the image data and index data in the third document management system are replaced by structured image data and structured index data as described in the second document management system. Consequently, in this fourth document management system the actual non-disclosed regions which are not to be disclosed are easily designated during registration, in the same way as in the second and third document management systems.

Moreover, this fourth document management system has a similar composition to that of the third document management system described with reference to FIG. 41, but the fourth registration terminal device and the fourth reading terminal device constituting this system are equivalent to the registration terminal device illustrated in FIG. 37 and the registration terminal device illustrated in FIG. 35.

Consequently, similarly to the third document management system illustrated in FIG. 41, this fourth document management system comprises, in addition to the servers 204, 402 and network 208, a fourth registration terminal device and a fourth reading terminal device having the same composition, respectively, as the second image registration terminal device and the second reading terminal device. Of the constituent elements of the fourth document management system, those elements which are the same as elements of the second and third document management system are similarly labelled, and repeated description thereof is omitted here, except where such description is necessary.

In the following description, this fourth document management system is indicated by numeral 400, similarly to the document management system illustrated in FIG. 41. Moreover, the fourth registration terminal device indicated by 220 in FIG. 41 is denoted by reference numeral 320 similarly to the registration terminal device in FIG. 37, and the fourth reading terminal device indicated by reference numeral 280 in FIG. 41 is denoted by reference numeral 280 similarly to the reading terminal device in FIG. 35.

Description of Reading Authorization Management Server

Firstly, the data previously registered in the reading authorization management server 402 is data required for implementing prescribed processing in the fourth registration terminal device 320 and the fourth reading terminal device 280. This data comprises reading authorization level correspondence data, item name correspondence data whereby a reading authorization level can be specified, on a one-to-one basis with the aforementioned reading authorization levels, and item name list data. Furthermore, depending on the circumstances, it may also comprise reading authorization setting data to be used when specifying reading authorization levels. These respective data elements have the same contents as the data described previously in relation to the third embodiment, and hence further description thereof is omitted here.

Description of the Composition and Operation of the Fourth Registration Terminal Device The fourth document management system, (which may simply be called the "fourth system" hereinafter,) comprises a fourth image registration terminal and a fourth reading terminal device, as constituent elements.

FIG. 37 is a functional block diagram giving an illustration of the fourth registration terminal device 320.

This fourth registration terminal device 320 has a similar composition to the second registration terminal device described previously in relation to the second embodiment, and therefore description of the respective constituent parts thereof is omitted here, except where such description is required.

Firstly, similarly to the second registration terminal device, the fourth registration terminal device 320 is provided with a first input section 222, a CPU 324, a first memory 226, and a first output section 228 (comprises a first screen display section 240). Furthermore, the CPU 324 comprises prospective non-disclosed region setting device 232, a structured image data creating section 330, reference data creating section 332, and a control section 230. The prospective non-disclosed region setting device 232 comprises a region analysing section 234, a first region deciding (or setting) section 236, and an index data creating section 238.

The point of difference with respect to the second registration terminal device is that the functions provided by the functional device using the CPU 324 differ partially in this fourth registration terminal device 320. Therefore, except where necessary, no further description is given with respect to the portions having the same functions as the first input section 222, first memory 226, first output section 228, first screen display section 240, prospective non-disclosed region setting device 232 (region analysing section 234, first region deciding (or setting) section 236, index data creating section 238), structured image data creating device 330, reference data creating section 332 and the control section 230.

Similarly to the second registration terminal device, this fourth registration terminal device 320 inputs image data for an original document from the first input section 222, in accordance with operations performed by the registering party, and stores this image data in a first memory 226, whilst also displaying the image data on the first screen display section 240. In this case also, similarly to the case of the second registration terminal device, the image data, indexing keywords, and two-dimensional co-ordinate value are stored in the first memory 226.

Thereupon, the registering party enters, via the first input section 222, a region analysis command with respect to all of the regions corresponding to respective items within the displayed image of the image data. In response to this command, the region analysing section 234 of the prospective non-disclosed region setting device 232 detects index data relating to the regions, which indicates the position and size of the respective regions, and stores this data in the first memory 226, similarly to the case of the second registration terminal device. In response to this detection operation, previously registered setting display data, such as frame lines, or the like, is read out from the first memory 226, and this data is synthesized with the image data. The display of the image data obtained by this synthesis operation shows a screen of image data which has undergone region analysis, wherein the respective regions are displayed surrounded by frame lines, as shown in FIG. 32.

Next, again similarly to the case of the second registration terminal device, the registering party views the displayed screen (or displayed image) 242 of region-analysed image data and enters a setting command to the first region deciding (or setting) section 236, by means of the first input section 222, thereby amending the prospective non-disclosed regions. In this case, the set regions of the prospective non-disclosed regions 244, 252 and 254 in the screen in FIG. 32 are amended. The screen of image data after amendment of the set regions is the same as the screen (or displayed image) described previously with reference to FIG. 44.

Next, similarly to the case of the third registration terminal device, the registering party enters a command, via the first input section 222, for creating index data for all the item regions. In response to this, the first input section 222 accesses the server 402 to read out data. The data read out from the server 402, in other words, the reading authorization level correspondence data, item name correspondence data, and reading authorization setting data is stored in the first memory 226, and is also supplied to the index data creating section 238.

Similarly to the case of the third registration terminal device, the index data creating section 238 creates reference numbers and index data (also called item name index data) relating to an attribute identifying the items in each region (here, this attribute is called a 'name attribute'), for each of the framed regions 246, 248, 250, 410, 412, 414.

In this case, since there exist six regions which are set as prospective non-disclosed regions, reference number index data is specified for each of these, similarly to the case of the first registration terminal device, and index data identifying the image data corresponding to the relevant displayed screen is also specified. Furthermore, also similarly to the case of the first registration terminal device, index data relating to the position and size of the respective regions is determined using two-dimensional co-ordinate values obtained when scanning the original document by means of the image reader in the first input section 222.

The respective index data elements 420 and 422 are synthesized as described previously with reference to the compositional example of index data shown in FIG. 45.

In the case of the fourth registration terminal device 320, index data 424 identifying an item and relating to the name attributes is also specified, similarly to the case of the third registration terminal device, and this index data 424 is synthesized with the previously specified index data 422 relating to the regions. Consequently, as illustrated in FIG. 45, the item index data 424 is appended to the end of this index data 422. The index data created in this manner is stored in the first memory 226 and setting data.

In the fourth document management system, similarly to the case of the second document management system, the registering party further supplies a structuring command from the first input section 222 to the reference data creating section 332 and the structured image data creating section 330. In response to this command, the image data corresponding to FIG. 44 (but excluding the item name list 430), and the index data 420 and 422 shown in FIG. 45 are transferred to the reference data creating section 332, where new index data for structuring is created (denoted by 490 in FIG. 49). Thereupon, index data, in other words, a "ref attribute", referencing the image data sections for set regions 246, 248, 250, 410, 412 and 414, which are specified as prospective non-disclosed regions of the image data corresponding to FIG. 44, is created. As stated previously with regard to FIG. 39, this index data "ref attribute" allocates the structured image data to a layered file structure like that shown in FIG. 50. More specifically, by means of the 'ref attributes', when data is registered in the first memory 226 or registered in the server 204, of the whole image data region creating the display image in FIG. 44, the image data area from which image data portions identified as displaying set regions 246, 248, 250, 410, 412 and 414 have been extracted is stored separately from the individual extracted image data portions. The 'ref attribute' index data is appended between the index data elements 422 and 424 shown in FIG. 45 and it forms a part of the index data relating to the regions. In FIG. 49, this index data: 'ref attribute' forming reference data is denoted by 492.

Figure 50:
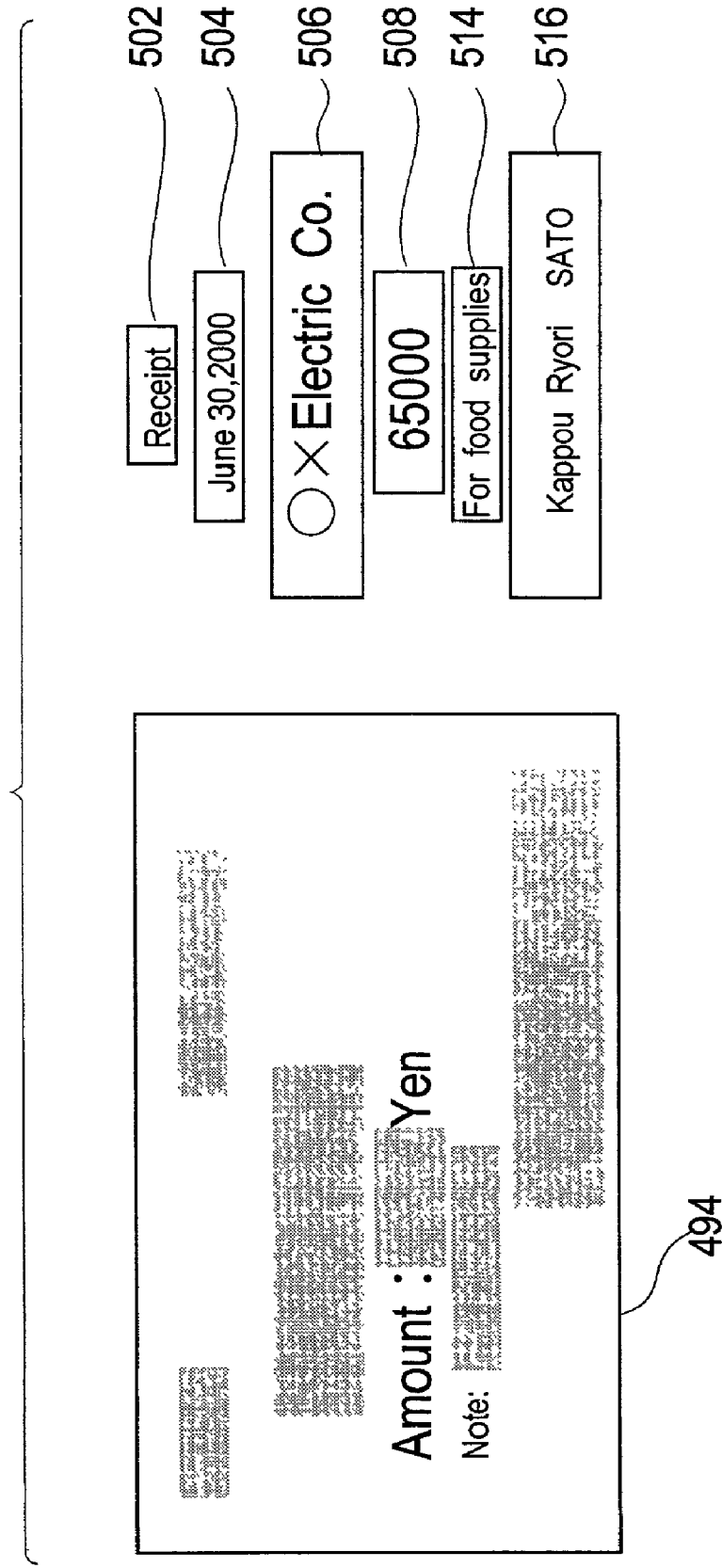
FIG. 50 is a diagram illustrating a display example of structured image data, for explaining an image reading terminal device according to the present invention.

The structured image data creating section 330 receives the amended image data and the structured index data (comprising various index data, namely, indexing keywords, reference numbers, setting data for position and size of regions, and reference data). Thereby, it performs structuring of the amended image data, and creates image data where regions corresponding to the set regions illustrated in FIG. 44, namely, 246 (Issuing party: "Kappou Ryori SATO"), 248 (Title: "receipt"), 250 (Date: "Jun. 30, 2000"), 410 (Addressee: "OX Electric Co."), 412 (Amount: "65000 Yen") and 414 (Proviso: "For food supplies") are blacked out, whilst also respectively creating separate image data elements corresponding to the extracted set regions 246, 248, 250, 410, 412 and 414. FIG. 50 shows a display example of the structured image data, where 494 denotes the image data display having blacked-out sections, whilst the display examples of the extracted sections are denoted respectively by 502 (Title "Receipt"), 504 (Date: "Jun. 30, 2000"), 506 (Addressee: "OX Electric Co."), 508 (Amount: "65000 Yen"), 514 (Proviso: "For food supplies"), and 516 (Issuing party: "Kappou Ryori SATO").

The structured image data and the structured index data are stored in the first memory 226.

When a command is sent to the control section 230 from the first input section 222 by the registering party, under the control of the control section, the structured image data, the structured index data, and the item index data are read out from the first memory 226 and transmitted from the first output section 228, via the network 208, to the document storage server 204.

The document storage server 204 stores this structured image data and structured index data (indexing keywords, index data relating to the image (including reference data) and index data relating to the regions (setting data, item-related index data, and the like)). The structured index data forms setting data for designating prospective non-disclosed regions as set regions within the image region. The image data is divided up when stored in the document storage server.

The aforementioned index data creating section 238 may also be incorporated in the reference data creating section 332 as a portion thereof.

Moreover, the reading authorization level correspondence data and related item name correspondence data are registered previously in the reading authorization management server 402.

Description of the Composition and Operation of the Fourth Reading Terminal Device The fourth reading terminal device has a similar composition to the first to third reading terminal devices described above, and hence it is described with reference to FIG. 35. However, this fourth reading terminal device 280 comprises a second input section 282, a CPU 284, a second memory 286, and a second output section 288 (provided with a second screen display section 290). The CPU 284 comprises a region deciding (or setting) section 292, disclosure data creating section 294 and control section 296. The point of difference between the fourth reading terminal device and the third reading terminal device lies in the fact that the data read out from the document storage server 204 is structured image data and structured index data. Therefore, the processing of this structured image data and structured index data is the same as that performed in the second reading terminal device, and moreover, the processing relating to the item index data, reading authorization level correspondence data, item name correspondence data, item name list data and reading authorization setting data is the same that that performed in the case of the third reading terminal device. Accordingly, except where necessary, no further description is given here with respect to parts having similar functions to the second input section 282, second memory 286, second output section 288, second screen display section 290 and control section 296.

As in the case of the third reading terminal device, with the fourth reading terminal device 280, the disclosing party issues a command for accessing the servers 204 and 402 by operating the second input section 282. In response to this command, structured image data (region-amended image data) and structured index data (setting data) are read out from the document storage server 204 and the structured data pair (reading authorization level correspondence data and item name correspondence data), item name list data and reading authorization setting data are read out from the reading authorization management server 402.

All the data elements thus read out are stored in the second memory 286 and transmitted to the region deciding (or setting) section 292.

In the region deciding (or setting) section 292, similarly to the case of the third reading terminal device, the disclosed regions and non-disclosed regions are designated. For this purpose, in the case of the fourth reading terminal device 280, the disclosing party issues a command for reading authorization setting data to be displayed, by means of the second input section 282. In response to this display command, the reading authorization setting data is transmitted from the region deciding (or setting) section 292 to the second screen display section 290, where it is displayed as a reading authorization setting screen. This reading authorization setting display screen (or displayed image) 20a is illustrated in FIG. 43.

Next, whilst observing this reading authorization setting displayed image 20a, the disclosing party inputs a reading authorization level selection command (corresponding to the first selection information), via the second input section 282. In this case, for instance, the box "Display all (A)" 20c is selected on the screen, and then "Set" 20f is selected. In response to this reading authorization selection command, the structured image data, reading authorization level correspondence data and item name correspondence data are synthesized and the displayed screen is switched to display the synthesized image data screen.

In this synthesis process, firstly, in response to "Set" 20f, the item names (<List> tags) identified by the Level attribute "1" in the <Group> tag of the reading authorization level correspondence data and the item name correspondence data illustrated in FIG. 42 are obtained. Furthermore, the image data which is to be displayed is synthesized, on the basis of the name attributes in the <Region> tags of the structured index data illustrated in FIG. 49, and the image data and <Image> tags for regions where these name attributes match the previously obtained item names.

The image data obtained as a result of the foregoing synthesis process forms a reading side prospective non-disclosed region image 440 on the screen, similarly to the case of the third reading terminal device. In this displayed screen 440 of the reading side prospective non-disclosed region image, all of the prospective non-disclosed regions, in other words, all six of the item regions, 'Title', 'Date', 'Addressee', 'Amount', 'Proviso' and 'Issing party', are displayed as disclosable regions 450, 452, 454, 456, 458 and 460, without being marked by a designation symbol, such as a frame, or the like.

Similarly to the case of the third reading terminal device, the disclosing party views the reading side prospective non-disclosed region screen 440 and judges whether all of the set regions 450, 452, 454, 456, 458 and 460, which are not marked with the designation display (namely, a frame or other designation symbol), are suitable for disclosure to the applicant, or whether it is inappropriate for these regions to be disclosed.

If the disclosing party judges that all of these items are suitable for disclosure, then the prospective non-disclosed region displayed screen 440 is set as a disclosure set region. Similarly to the description relating to the second reading terminal device, the disclosing party inputs a readable/non-readable command to the disclosure data creating section 294, via the second input section 282, and the image data in the disclosure set region is converted to disclosure data and is registered in the second memory 286. Thereupon, as described above with regard to the second reading terminal device, the disclosing party enters an output command via the second input section 282, whereby the disclosure data is transferred from the second memory 286 to the second output section 288, where it is converted into a disclosure document, by means of a printer, or the like.

On the other hand, if the judgement of the disclosing party is different to the judgement described above, and the disclosing party decides that the regions 454 and 460 corresponding to the addressee item "OX Electric Co." and the issuing party item "Kappou Ryori SATO" should not be disclosed to the applicant, then the following processing is implemented.

Specifically, in a similar manner to the third reading terminal device, the disclosing party issues another command for displaying the reading authorization setting data, via the second input section 282, thereby causing the reading authorization setting screen (displayed image) 20*a* (see FIG. 43) to be displayed on the second screen display section 290. Thereupon, he or she selects the item 20*d* "Display part" corresponding to reading authorization level "2" and then selects "Set" 20*f*. By making this selection, the item names (<List> tags) identified by the Level attribute "2" in the <Group> tags of the reading authorization level correspondence data and item name correspondence data illustrated in FIG. 42 are retrieved. Moreover, the image data which is to be displayed is synthesized, on the basis of the name attributes in the <Region> tags of the structured index data illustrated in FIG. 49, and the image data and <Image> tags for regions where these name attributes match the previously obtained item names.

Similarly to the case of the third reading terminal device, the image data obtained by the foregoing synthesis operation forms the partially limited reading side prospective non-disclosed region displayed image 470 on the screen as illustrated in FIG. 47. On this reading side prospective non-disclosed region displayed screen 470, of the six item regions, title, date, addressee, amount, proviso and issuing party, two regions, namely, the region 454 corresponding to the addressee item and the region 460 corresponding to the issuing party item, are marked with the designation display symbol. Therefore, these two regions are prospective non-disclosed regions. The remaining four regions, 450, 452, 456 and 458, are displayed as regions specified for disclosure, without being marked by the designation display symbol, such as a frame, or the like.

The disclosing party views the partially limited reading side prospective non-disclosed region displayed screen 470, and again judges whether both of the set regions 454 and 460 marked by the designation display (frame lines or other display symbol) are suitable for disclosure to the applicant, or whether they not suitable for disclosure to the applicant.

If the disclosing party judges that these items are not suitable for disclosure, then the prospective non-disclosed region screen 440 is set as the non-disclosure decided region. As described with regard to the second reading terminal device above, the disclosing party inputs a command for converting data to a non-readable state, to the disclosure data creating section 294 from the second input section 282, in the form of second selection information, whereby the non-disclosure set regions 454 and 460 are read out from the second memory 286 as non-readable information, and these disclosure set regions 454 and 460 are converted to a blacked-out state, for example, as illustrated in FIG. 48, whilst at the same time, the image data for these disclosure set regions 454 and 460 is converted to disclosure data and registered in the second memory 286. Instead of blacking out the data, it is possible to convert the data to a non-readable state, by blanking out, deletion, or the like.

FIG. 48 is a diagram showing a final display screen comprising non-disclosure set regions which have been changed to a non-readable state. In the diagram, the final display screen (or the finally displayed image) is denoted by numeral 480, and the non-disclosure set regions are denoted by 482 and 484.

Thereupon, similarly to the foregoing description of the first reading terminal device, the disclosing party enters a readable/non-readable command via the second input section 282, and the disclosure data is transferred from the second memory 286 to the second output section 288, where it is converted to a disclosure document by means of a printer, or the like.

According to this fourth document management system, it is possible to achieve similar beneficial effects to those provided by the first and second document management systems described above.

Moreover, according to this fourth document management system, reading authorization level correspondence data determining the range of information disclosure and related item name correspondence data are set and previously registered in a server. On the reading terminal side, the reading authorization level correspondence data and item name correspondence data read out from the server are synthesized selectively according to each individual applicant seeking disclosure of information, and hence the non-disclosed information contents can be specified precisely. Consequently, it is possible to provide a disclosure document containing an amount of information which corresponds to the applicant.

Tenth Embodiment

In a fifth document management system relating to the present image display system, the respective reading terminal devices in the first to fourth document management systems described above are composed in such a manner that once a reader level has been determined, the non-disclosed regions can be determined directly in accordance with that level.

Figure 51:
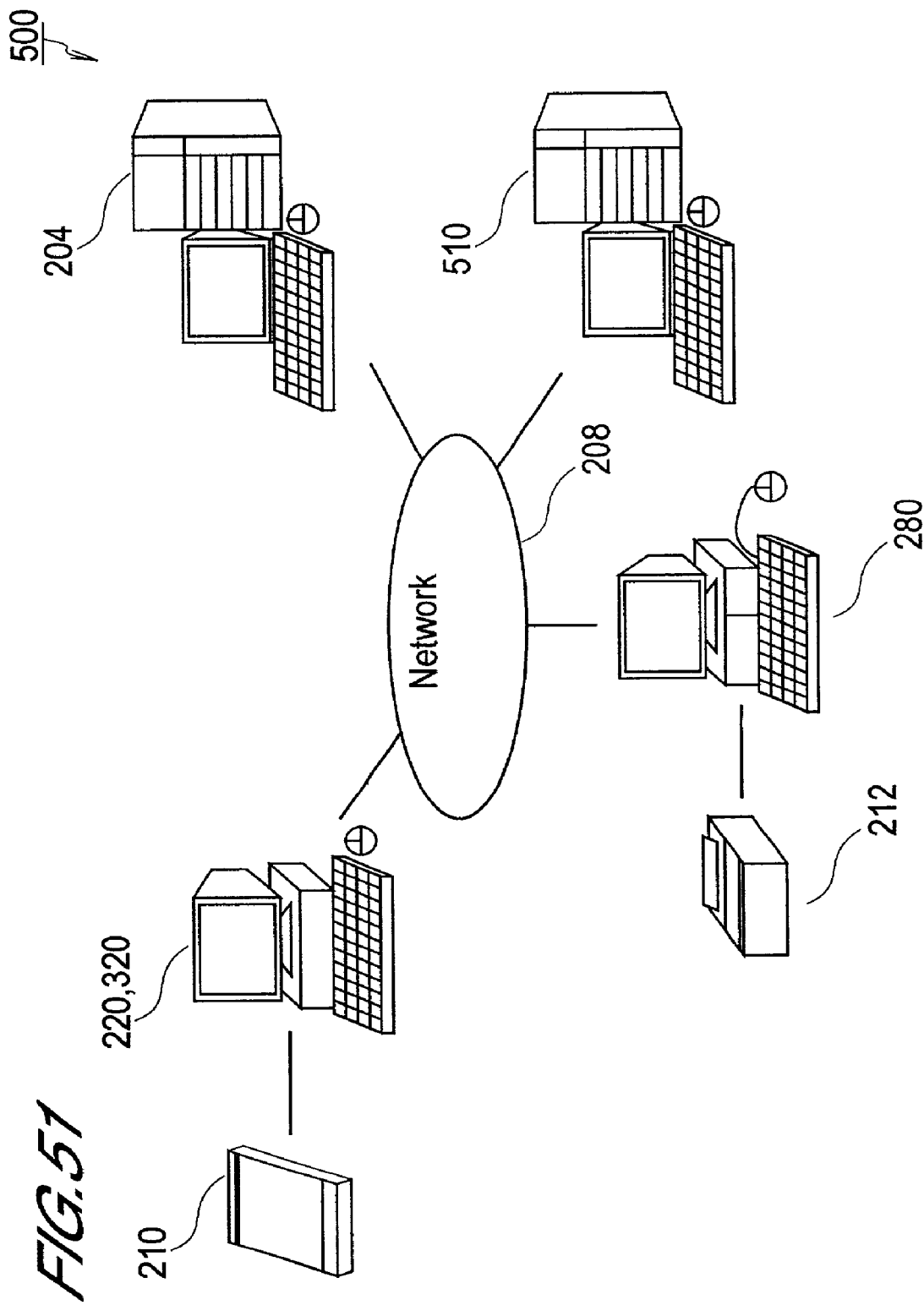
FIG. 51 is a diagram illustrating a composition example of image display system for a fifth and sixth document management system according to the present invention.

FIG. 51 is a diagram showing a compositional example of the fifth document management system, which is denoted by the numeral 500. This system 500 comprises a fifth registration terminal device 220 or 320 (including an image reader 210 as a peripheral device), a fifth reading terminal device 280 (including a printer 212 as a peripheral device), a document storage server 204 and a reading authorization management server 510, all mutually linked by a network 208. The servers 204 and 510 may also be provided as a single server combining both server functions, instead of independent servers.

Except where necessary, no further description is given here with regard to those constituent elements and functions of the fifth registration terminal device (220 or 320) and the fifth reading terminal device 280 constituting this fifth document management system 500 which are the same as the respective registration and reading terminal device in the first to fourth document management systems 200 or 400. In particular, the characteristics of the fifth document management system 500 relate to the data previously stored in the reading management server 510 and to the functions of the fifth reading terminal device 280, and hence the following description will focus principally on the fifth reading terminal device 280.

Description of the Composition and Operation of the Fifth Reading Terminal Device In the fifth document management system 500, in addition to previously storing reading authorization setting data, at the least, reader level data is also registered for specifying a reader level in relation to particular data of the setting data.

Figure 52:
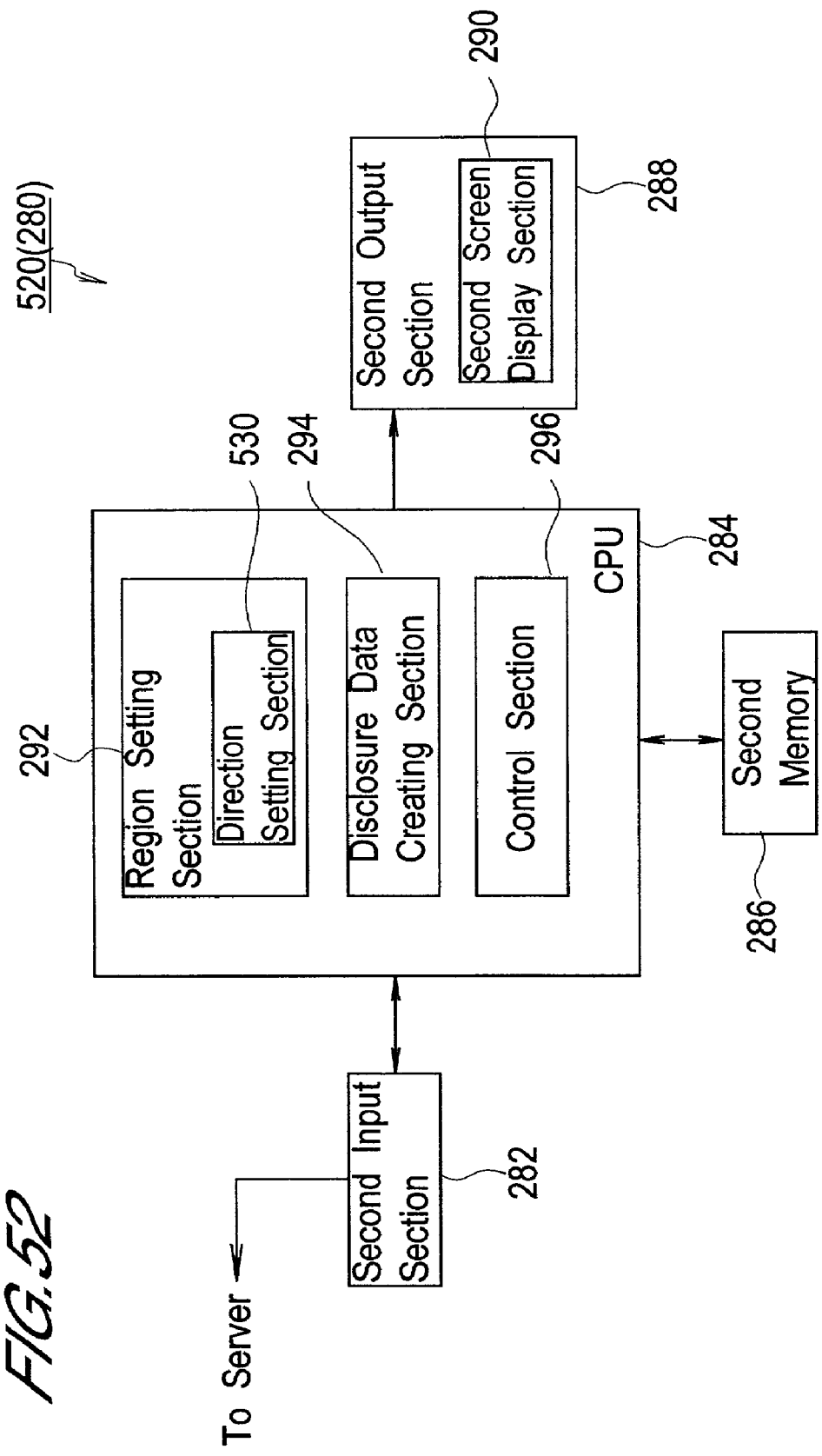
FIG. 52 is a functional block diagram showing a fifth reading terminal device of an image display system for a fifth document management system according to the present invention.

FIG. 52 is a functional block diagram showing a fifth reading terminal device 520 (corresponding to 280 in FIG. 51) of the fifth document management system 500. The region deciding (or setting) section 292 of this fifth reading terminal device 520 comprises a direction setting section 530. This direction setting section 530 has the function of directly setting the disclosed regions and non-disclosed regions in the image data region, by means of a reader level in the reader level data read out from the server 510 being specified via the second input section 282.

In this compositional example, this reader level data is structured with respect to the reader level, reader, and reader attribute name.

Figure 53A:
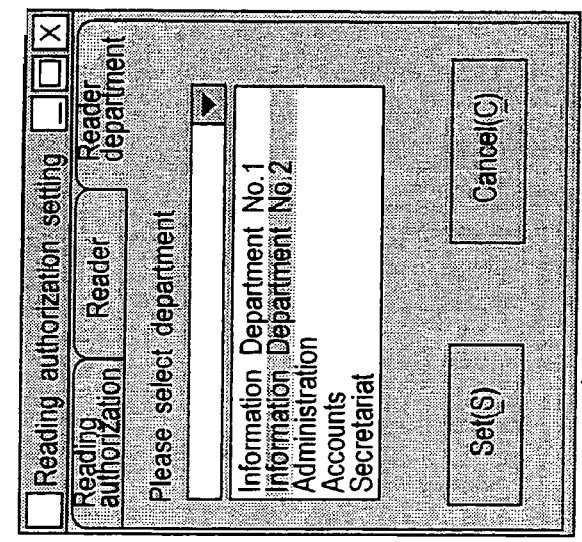
FIG. 53 (A)
FIG. 53(B) and FIG. 53(C) are diagrams illustrating examples of reading authorization setting screens, for explaining reading authorization level setting in the image display system for the fifth document management system according to the present invention.
Figure 53B:
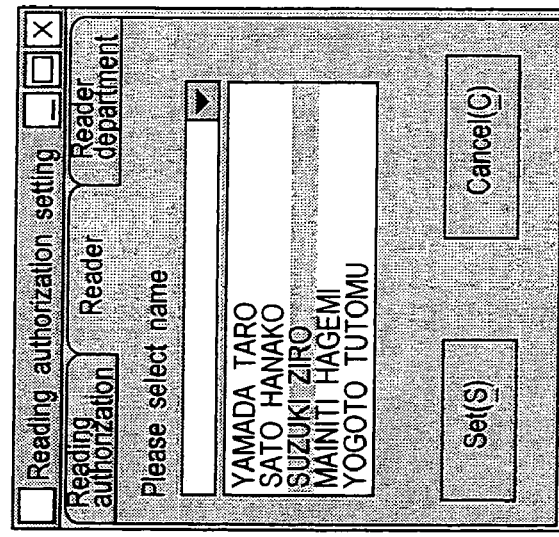
Figure 53C:
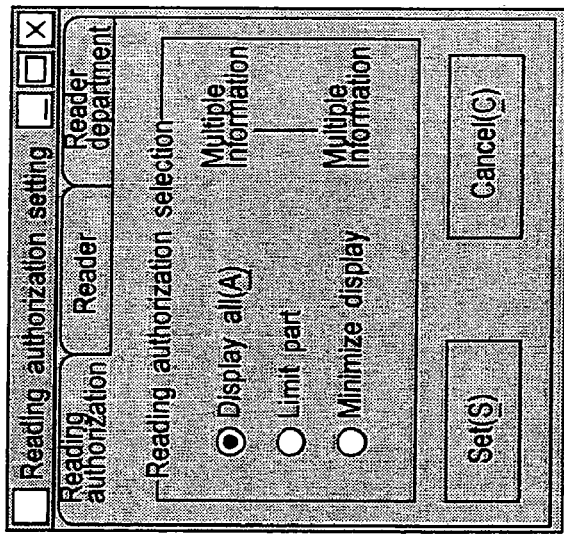

FIGS. 53(A), 53(B) and 53(C) are diagrams giving an illustration of reading authorization settings in the fifth document management system 500, respectively showing display screens 30, 31, and 32 where aforementioned data elements are depicted on the second screen display section 290. The display screen 30 shown in FIG. 53(A) is a reading authorization setting data screen corresponding to FIG. 43. The display screen 31 shown in FIG. 53(B) is a data screen for identifying the reader, and previously registered names can be selected on this screen. The display screen 32 shown in FIG. 53(C) is a data screen for specifying an attribute name, in other words, a department to which the reader belongs, and on this screen, it is possible to select previously registered department titles. This reader specification data (FIG. 53(B)) and the department title specification data (FIG. 53(C)) are obtained from the reader level data.

FIG. 54 is a diagram illustrating an example of reader level data 40. This reader level data is structured data containing names, attributes and reader levels. In this example, the reader levels are specified for respective reader's names, in the form of name <Person> tag data, for instance: '<Person Level = "3"> YAMADA TARO', '<Person Level = "3"> SATO HANAKO', '<Person Level = "1"> SUZUKI ZIRO', '<Person Level = "1"> MAINITI HAGEMI', '<Person Level = "1"> YOGOTO TUTOMU', and the like.

Moreover, in a similar manner, reader levels are specified for respective departments, in the form of group <Group> tag data, for instance: '<Sections Level: = "3"> Information Department No. 1', '<Sections Level: = "3"> Information Department No. 2', '<Sections Level: = "2"> Administration', '<Sections Level: = "1"> Accounts', '<Sections Level: = "3"> Secretariat', and the like. These reader levels have a one-to-one correspondence with the reading authorization levels. For example, in FIG. 54, the reader level "3" (<Person Level = "3">) is associated with the group level <Group Level = "3"> in the reading level correspondence data and item name correspondence data illustrated in FIG. 42. Similarly, the reader level "2" (<Person Level = "2">) is associated with the group level <Group Level: = "3"> in the reading level correspondence data and item name correspondence data illustrated in FIG. 42, and the reader level "1" (<Person Level = "1">) is associated with the group level <Group Level = "1"> in the reading level correspondence data and item name correspondence data illustrated in FIG. 42. The department titles are also associated with the reading authorization levels, in a similar manner. Therefore the <Sections Level:= "3"> relating to "Information Department No. 2" in FIG. 54 is associated with the reading authorization level <Group Level:= "3"> in FIG. 42.

In this way, it is possible to specify, automatically, by means of the reader level data such as reader level data 40, which range of items are to be disclosed, in other words, which items are not suitable for disclosure, according to the name and/or the department title of the registering party.

In the document management system 500 in FIG. 51, as described with reference to the first to fourth document management systems, structured image data, structured index data, and other required data elements are stored in the document storage server 204, and moreover, reading authorization level correspondence data, item name correspondence data, reader level data, and other required data elements are stored in the reading authorization management server 510.

When the party disclosing the information enters a command accessing the servers 204 and 510 from the second input section 282 of the reading terminal device 520 (see FIG. 52), in accordance with an application from an applicant, the structured image data and structured index data to be disclosed is read out from the document storage server 204, and moreover, the reading authorization level correspondence data, item name correspondence data and reader level data is read out from the reading authorization management server 510, and stored in the second memory 286.

If the disclosing party then enters a command, via the second input section 282, causing the region deciding (or setting) section 292 to display the reading authorization level data on the screen, then in response, the direction setting section 530 reads out the reading authorization level data from the second memory 286 and sends this data to the second output section 288, whilst also displaying it on the second screen display section 290. This display is a reading authorization setting display as illustrated in FIG. 53, and is achieved by superimposing the screen in FIG. 53(A), FIG. 53(B) and FIG. 53(C), and any one of these screens can be called up as the topmost screen by mans of a command from the second input section 282. Here, it is supposed that the reading authorization level screen in FIG. 53(A) is displayed.

If the disclosing party inputs a command specifying the set value "Display all" as the reading authorization level, from the second input section 282 to the direction setting section 530, then in response, the direction setting section 530 reads out and synthesizes the structured image data, structured index data, reader level data and reading authorization level data corresponding to the set value, from the second memory 286. In this synthesizing process, firstly, for example, the item names (<List> tags) specified by the Level attribute '1' in the <Group> tag of the reading authorization level correspondence data and item name correspondence data illustrated in FIG. 42. Thereupon, the image data of the obtained item names which coincide with the name attributes 424 in the <Region> tag in the index data (shown in FIG. 49) is synthesized, and this image data is displayed on the second screen display section 290. In this display screen, all the items are switched to the reading side prospective non-disclosed region screen, as illustrated in FIG. 46.

Here, it is assumed that the disclosing party is able to identify the name or the department of the applicant, and the disclosing party enters a command from the second input section 282 to the direction setting section 530, thereby switching to the screen in FIG. 53(B) or FIG. 53(C), where the applicant name is input as a selection command to the direction setting section 530, for example, "SUZUKI ZIRO" is selected. By making this selection, the <Person Level = "1"> in FIG. 54 is selected, and if the <Group Level = "1"> in FIG. 42 is selected at the same time, then as already described with respect to the fourth reading terminal device, a reading side prospective non-disclosed region screen 440 similar to that shown in FIG. 46 is displayed.

If, on the other hand, "Information Department No. 2" is selected, for example, then by making this selection, the item <Person Level = "3"> is selected, and if the item <Group Level = "3"> in FIG. 42 is selected at the same time, then a partially limited reading side prospective non-disclosed region displayed screen 470 as illustrated in FIG. 47 is displayed.

The respective data obtained in this manner are stored in the second memory 286. The subsequent processing is performed in a similar manner to the fourth reading terminal device, and the data is output in readable form from the second output section 288.

If the applicant cannot be identified, then the disclosing party issues a command to the direction setting section 530 via the second input section 282, to call up the screen in FIG. 53(A). Thereupon, a similar operation to that already described in relation to the fourth reading terminal device is performed.

In this way, according to the fifth document management system, when the reader can be identified, the selection of information to be disclosed can be specified automatically, thereby improving the efficiency of the operation for issuing disclosure information, whilst also making it possible to enhance the reliability of the disclosure information.

Eleventh Embodiment

The sixth document management system relating to the present image display system is an example where the applicant him or herself is able to operate the reading terminal device in the fifth document management system described above, in addition to which the reader level can only be specified with respect to readers for whom a registered user name and registered password have been previously registered.

Therefore, here, the processing implemented in a case where a registered user name and registered password are used will be described, and since in other respects, the composition and operation of this system are similar to those in the fifth document management system, further description thereof is omitted here, except where especially necessary.

The sixth document management system has a similar composition to that of the fifth document management system and this sixth document management system is denoted by numeral 500 in FIG. 51.

In this case also, a document storage server 204 and a reading authorization management server 510 are provided. These servers 204 and 510 may be provided as a single servers combining the functions of each, rather than as separate servers. The characteristics of the sixth document management system 500 relate to the data previously stored in the reading management server 510 and to the functions of the sixth reading terminal device 280, and hence the following description will focus principally on the sixth reading terminal device 280 and the processing associated with the aforementioned data.

Description of the Composition and Operation of the Sixth Reading Terminal Device In the sixth document management system 500, in addition to the data stored in the case of the fifth document storage system, registered user names and registered passwords are previously stored in the reading authorization management server 510.

FIG. 55 is a functional block diagram showing a sixth reading terminal device 540 (corresponding to 280 in FIG. 51) of the sixth document management system 500 as illustrated in FIG. 52. The region deciding (or setting) section 292 of this sixth reading terminal device 540 comprises a direction setting section 530 and a comparing section 542. As described with regard to the fifth reading terminal device, this direction setting section 530 has the function of directly setting the disclosed regions and non-disclosed regions in the image data region, by means of a reader level in the reader level data read out from the server 510 being specified via the second input section 282.

Moreover, the comparing section 542 compares the registered user names and registered passwords read out from the reading authorization management server with a user name and password input by the reader. In other words, the reader is authenticated by means of a login name and password.

This comparison process is described below. As stated previously, user names and passwords which may be used in the sixth reading terminal device are stored in the reading authorization management server 510, respectively, as registered user names and registered passwords. Moreover, in this sixth reading terminal device, it is supposed that the reader level data stored previously in the reading authorization management server 510 is data obtained by appending a password attribute to the reader level data illustrated in FIG. 54.

FIG. 56 shows reader level data used in the sixth reader terminal device. Within the reader level data shown in FIG. 56, the password attribute 560 is appended in the form 'Password = "123456"', or the like, after the 'Person Level = "3"' in <Person Level = "3">, for example, in the case of a level relating to the applicant's name. Other password attributes might be 'Password = "abcdef"', 'Password = "0a1b2c"', 'Password = "tgbnhyujm"', 'Password = "aaaaaa"', or the like. Moreover, in the case of a department name, the password attribute 560 is appended in the form "Password = '111111'", or the like, after the 'Sections Level = "3"' in <Sections Level = "3">, for example. Other password attributes 560 might be 'Password = "987654"', 'Password = "qazwsx"', 'Password = "a!b"c#d$"', 'Password = "zzzzzz"', or the like.

Figure 57:
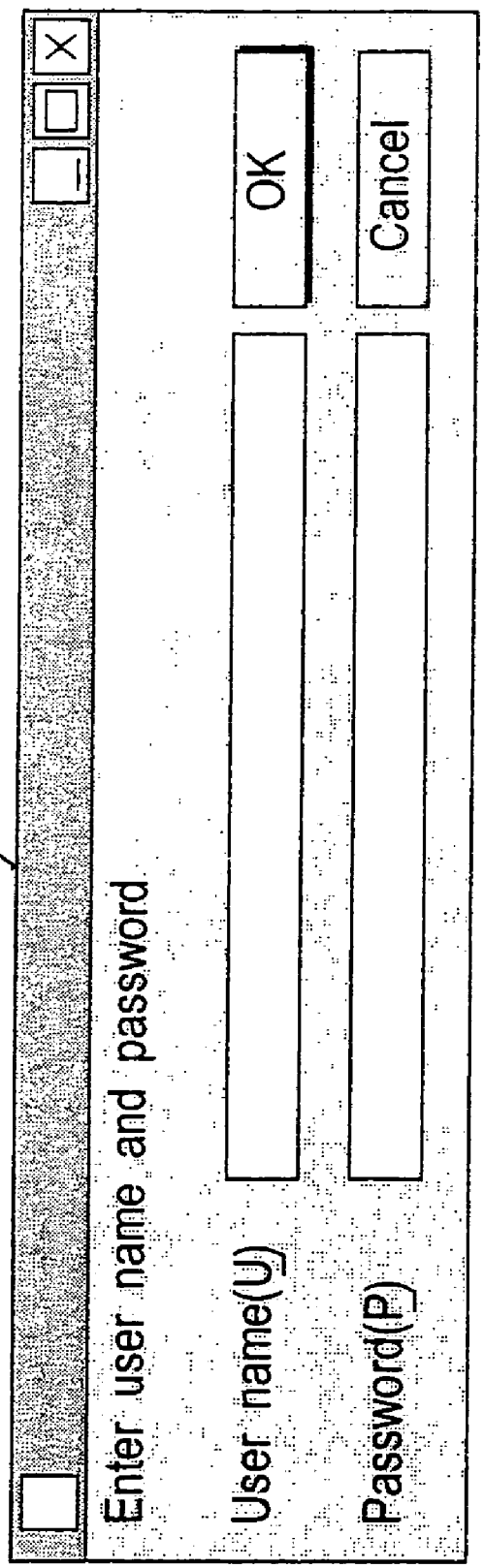
FIG. 57 is a diagram illustrating a login setting data display screen, for explaining a sixth reading terminal device according to the present invention.

Moreover, login setting data required in order to perform login is stored in the second memory 286 of the sixth reading terminal device 540. FIG. 57 illustrates a screen display 50 of this login setting data, in other words, a login screen.

Here, it is assumed that the applicant is operating the sixth reading terminal device 540 himself or herself. When the applicant enters a command calling up the login setting data to the comparing section 542 of the region deciding section 292, by means of the second input section 282, the login setting data is read out from the second memory 286 and supplied to the second screen display section 290 in the second output section 288, where it is displayed as a login screen as illustrated in FIG. 57. The applicant then inputs a user name and password to identify him or herself to the comparing section 542 from the second input section 282, by writing the user name and password to prescribed locations on the screen.

In response to the input signal, the reader level data is obtained from the second memory 286 by the comparing section 542, which then compares the registered user name and registered password in the reader level data with the input user name and password.

If the comparison is judged to be positive, then the direction setting section 530 of the region deciding (or setting) section 292 is activated by a signal indicating the judgement result, and the display screen in FIG. 46 is displayed. The subsequent operations are performed similarly to the case of the fifth reading terminal device, and disclosed information is thereby issued to the applicant.

If the comparison is not judged to be positive, then the login setting data is output from the comparing section 542, in accordance with the judgement signal, and the login screen shown in FIG. 57 is displayed once again on the second screen display section 290. Consequently, the applicant for whom the comparison result was judged not to be positive is not able to issue disclosure information on the sixth reading terminal device 540.

In this way, by means of the sixth document management system, it is not necessary specifically to employ an operator on the disclosing side of the reading terminal device, and an applicant can themselves obtain disclosure information by operating the reading terminal device, without the mediation of an information disclosing party, thereby improving the efficiency of the information disclosing operation.

OTHER MODIFICATIONS

In the respective the sixth to eleventh embodiments described above, the image data reading method was limited to an image scanner, but the image data reading method is not restricted to this. For example, previously registered image data, or image data obtained by other device, for example, image data obtained by electronic mail of by a removable media, or the like, can be handled similarly by the image display system for a document management system according to the present invention. Similarly, in the sixth to eleventh embodiments described above, the final disclosure document which can be read is formed by an output section incorporated in the document management system of the present invention, but the invention is not limited to this. For example, the output section may be coupled to the image display system of the document management system according to the present invention by a wired system, radio system, fibre-optics, or other desired method, or it may comprise an output section capable of reproducing information by means of a desired recording medium.

In the sixth to eleventh embodiments described above, the index data, reading authorization level correspondence data, item name correspondence data, and reader level data were described using XML, but similar results can be obtained even if these respective data elements are described using a data format other than XML.

Moreover, in the seventh embodiment, item names were set for each region, but any other information capable of identifying a region may be used.

In the eighth to eleventh embodiments described above, the document storage server and reading authorization management server were described as separate hardware items, but similar results can be obtained if both functions are constituted by a single hardware device.

Moreover, in the eleventh embodiment described above, the verification of the reader was performed using a login name and password, but similar results are obtained if using hardware, such as IC cards, fingerprint identification, iris identification, or the like, and the corresponding control software.

As clearly revealed in the foregoing description, by means of the image display system relating to a first document management system according to the present invention, at the reading terminal side, it is possible to avoid the operation of setting disclosed regions and non-disclosed regions within the image data region, and hence the efficiency of the information disclosure operation can be improved compared to the prior art.

Moreover, according to the image display system relating to a first document management system according to the present invention, it is possible simply to confirm regions that have been provided as candidates for non-disclosure, without having to designate non-disclosed regions from the start, and therefore errors in designating non-disclosed regions during operation are eliminated, and hence disclosure documents having a higher reliability than the prior art can be provided.

Moreover, according to the image display system relating to a second document management system according to the present invention, in addition to the merits of the first document management system as described above, the following additional merits are obtained.

Namely, at the second reading terminal device, when the structured image data, setting data and reference data are read out from the server and synthesized, image data wherein the non-disclosed regions are identified can be displayed on the display screen, and hence the process of setting non-disclosed regions is simple and quick to perform. Consequently, the processing time taken from application until provision of the final disclosure document is shortened (in other words, the process is speeded up).

Moreover, since structuring of image data is achieved, the non-disclosed information is stored separately in the server, and therefore even if illegal external access is made, it is possible to avoid leaking of information, as far as possible.

According to the image display system relating to a third and fourth document management system according to the present invention, it is possible to obtain similar merits to those associated with the first and second image display systems relating to document management systems described above.

Moreover, according to the image display system relating to the third document management system relating to the present invention, reading authorization level correspondence data determining the range of information disclosure and related item name correspondence data are set and previously registered in a server. On the reading terminal side, the reading authorization level correspondence data and item name correspondence data read out from the server are synthesized selectively according to each individual applicant seeking disclosure of information, and hence the non-disclosed information contents can be specified precisely. Consequently, it is possible to provide a disclosure document containing an amount of information which corresponds to the applicant.

Moreover, according to the image display system relating to a fourth document management system, similarly to the image display system relating to the second document management system, the processing time taken from application until provision of the final disclosure document is shortened (in other words, the process is speeded up).

Moreover, since structuring of image data is achieved, the non-disclosed information is stored separately in the server, and therefore even if illegal external access is made, it is possible to avoid leaking of information, as far as possible.

According to this image display system relating to a fifth document management system, if a reader can be identified, then the selection of disclosed information is automatically specified, and hence the efficiency of the operation for issuing disclosed information is improved and the reliability of the disclosed information is enhanced.

According to the image display system relating to a sixth document management system, a composition is adopted whereby reading is only possible when a previously registered user name and password are matched, and hence it is not necessary to employ a party for disclosing the information, but rather the applicant becomes able to operate and use the system him or herself.

In addition, the functions of each of the terminal devices as mentioned above may be performed on a base of software installed in a personal computer belonging to each of the terminal devices.

What is claimed is:

1. An image display system comprising:
an original image holding device for holding first image data;
a computer communicating with said original image holding device, said computer comprising an image display device; and a storing device for storing second image data corresponding to said first image data and suitable for display by said image display device;
wherein said computer reads out said second image data from said storing device, displays on said image display device the second image data read out from said storing device, and detects alterations to said second image data read out from said storing device;
wherein, if an alternation to said second image data read out from said storing device is detected, said computer additionally requests said original image holding device to transfer first image data;
wherein said original image holding device transfers said first image data to said computer, in accordance with an original image data transfer request from said computer;
wherein said image display device displays the first image data transferred to said computer;
wherein said first image data comprises a plurality of regions;
wherein said computer detects alterations to the first image data for each of said regions, and if an alteration to the first image data is detected, then it sends alteration information relating to the region where the alteration was detected to said original image storing device, along with said original image data transfer request;
wherein said original image storing device sends first image data for the corresponding region to said computer, on the basis of said alteration information; and
wherein said image display device synthesizes the transferred first image data for said region with the second image data for the other regions.

2. An image display system according to claim 1, wherein said image display device displays an indication that first image data has been obtained since there has been an alteration to the second image data, along with displaying said first image data transferred thereto.

3. An image display system according to claim 1, wherein said computer detects alterations to the second image data by means of the presence or absence of an electronic watermark.

4. An image display system according to claim 3, wherein said plurality of regions are blocks obtained by uniform division of the second image data; and said computer detects alterations for each of said blocks.

5. An image display system according to claim 3, wherein said plurality of regions are description regions based on a document format database.

6. An image display system according to claim 5, wherein said computer sends co-ordinates information for said first image data stored in said storing device, as said alteration information, to said original image storing device; and said original image storing device reads out first image data for the corresponding region on the basis of said co-ordinates information, and transfers the read-out first image data to said computer.

* * * * *